United States Patent [19]
Hodgson et al.

[11] Patent Number: 6,084,233
[45] Date of Patent: Jul. 4, 2000

[54] OPTICAL SENSOR ARRAY HAVING MULTIPLE RUNGS BETWEEN DISTRIBUTION AND RETURN BUSES AND HAVING AMPLIFIERS IN THE BUSES TO EQUALIZE RETURN SIGNALS

[75] Inventors: Craig W. Hodgson, Thousand Oaks, Calif.; Jefferson L. Wagener, Charlottesville, Va.; Michel J. F. Digonnet, Palo Alto; H. John Shaw, Stanford, both of Calif.

[73] Assignee: The Board of Trustees of Leland Stanford Junior University

[21] Appl. No.: 08/891,287

[22] Filed: Jul. 10, 1997

Related U.S. Application Data

[63] Continuation-in-part of application No. 08/814,548, Mar. 11, 1997, Pat. No. 5,866,898.
[60] Provisional application No. 60/021,699, Jul. 12, 1996, provisional application No. 60/034,804, Jan. 2, 1997, and provisional application No. 60/036,114, Jan. 17, 1997.

[51] Int. Cl.[7] .................................................... G01J 1/104
[52] U.S. Cl. ............................. 250/227.14; 250/227.19
[58] Field of Search .................... 250/227.14, 227.17, 250/227.18, 227.19, 227.23, 227.27; 356/345; 385/10, 12, 28, 32

[56] References Cited

U.S. PATENT DOCUMENTS

| 4,768,850 | 9/1988 | Moslehi et al. ............................. 385/15 |
| 5,173,743 | 12/1992 | Kim ................................. 250/227.19 |
| 5,866,898 | 2/1999 | Hodgson et al. .................... 250/227.14 |

OTHER PUBLICATIONS

Review of Interferometric Optical Fibre Hydrophone Technology, P. Nash, *IEE Proceedings—Radar, Sonar and Navigation*, vol. 143, Jun. 1996, pp. 204–209.

A Review of Recent Developments in Fiber Optic Sensor Technology, Alan D. Kersey, *Optical Fiber Technology*, vol. 2, Jul. 1996, pp. 291–317.

64–Element Time–Division Multiplexed Interferometric Sensor Array with EDFA Telemetry, A. D. Kersey, et al., *OFC '96*, vol. 2, 1996, OSA Technical Digest Series, paper THP5, PP. 270–271 (Month Unknown).

Time–Domain Addressing of Remote Fiber–Optic Interferometric Sensor Arrays, J.L. Brooks, et al., *Journal of Lightwave Technology*, vol. LT–5, Jul. 1987, pp. 1014–1023.

(List continued on next page.)

*Primary Examiner*—Que T. Le
*Attorney, Agent, or Firm*—Knobbe, Martens, Olson & Bear, LLP

[57] ABSTRACT

The present invention significantly improves the signal to noise ratio (SNR) in a passive optical array comprising sensors located in rungs between a distribution bus and a return bus. Erbium-doped optical fiber amplifiers are included in the buses proximate to each rung coupling to offset the coupler splitting losses. The gains of the amplifiers are selected to offset losses due to the couplings. The overall SNR can be maintained without significant degradation even for large numbers of sensors. In one aspect of the present invention, the amplifiers are located along the distribution and return buses directly after the couplers, except for the last coupler. In a second aspect, the amplifiers are located directly before each coupler. The optical amplifiers preferably are made of short lengths of erbium-doped fiber spliced into the distribution and return buses. Improvements can be made to the SNR when the distribution bus coupling ratios are set at optimal values. The value of the optimal coupling ratio depends upon the amplifier configuration, the excess loss and other configuration parameters. In preferred embodiments, sensors are grouped into parallel configurations in the rungs between the distribution and return buses to increase the number of sensors without a corresponding increase in the number of amplifiers and with an improvement in system performance. The number of sensors per rung is optimized to provide a low noise figure (NF) or a high SNR for each sensor in the array within a reasonable pump power budget.

40 Claims, 33 Drawing Sheets

OTHER PUBLICATIONS

Cayman–Jamaica Fiber System: The Longest 2.5 Gbit/s Repeaterless Submarine Link Installed, E. Brandon, et al. *OFC '97,* vol. 6, 1997, OSA Technical Digest Series, paper TuL1. (Month Unknown).

Erbium–Doped Fiber Splicing and Splice Loss Estimation, Wenxin Zheng, et al., *Journal of Lightwave Technology,* vol. 12, Mar.1994, 430–435.

Single–Mode Fiber Optics, Luc B. Jeunhomme, 2nd ed., Marcel Dekker, New York, 1990, p. 101. (Month Unknown).

High–Power 1.48 μm Cascaded Raman Laser in Germanosilicate Fibers, S.G. Grubb, et al., *Technical Digest Optical Amplifiers and Their Applications,* 1995, pp. 197–199, Paper SaA4, Davos, Switzerland. (Month Unknown).

Fiber–Optic Delay–Line Signal Processors, K.P. Jackson, et al., *Optical Signal Processing,* J.L. Horner, ed., Academic Press, San Diego, CA, 1987, pp. 431–476 (Month Unknown).

Noise Performance of Multiplexed Fiber–Optic Sensor Systems with Optical Amplifiers, Joar Saether, et al., *Optical Review,* vol. 4, No. 1A (1997) 138–144 (Jan.–Feb. Issue). (Month Unknown).

Joar Saether, et al., "Optical Amplifiers in Multiplexed Sensor Systems–Theoretical Prediction of Noise Performance," *Proceedings 11th Optical Fibre Sensor Conference,* Sapporo, May 21–24, 1996, pp. 518–521.

(PASSIVE ARRAY)

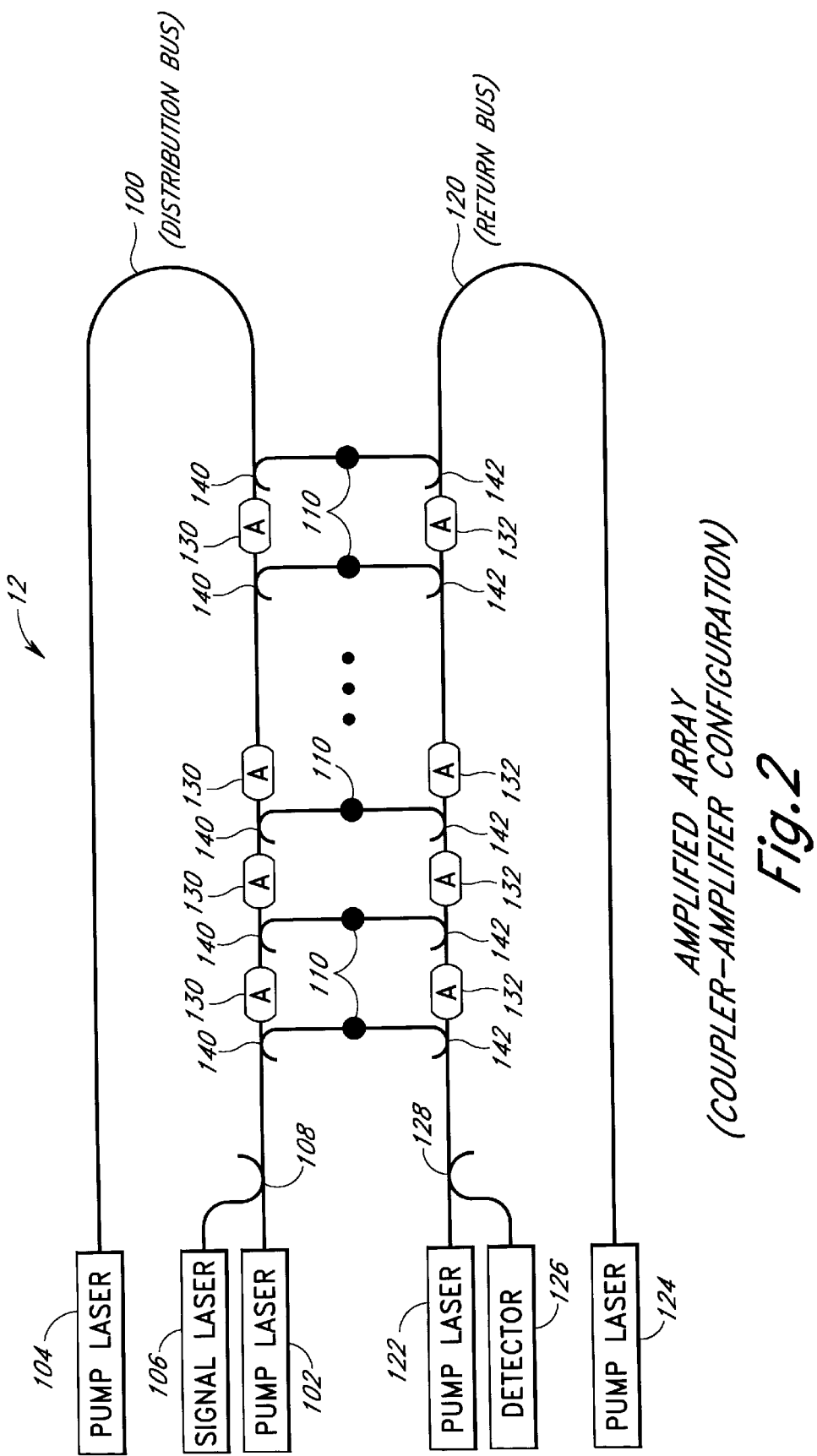

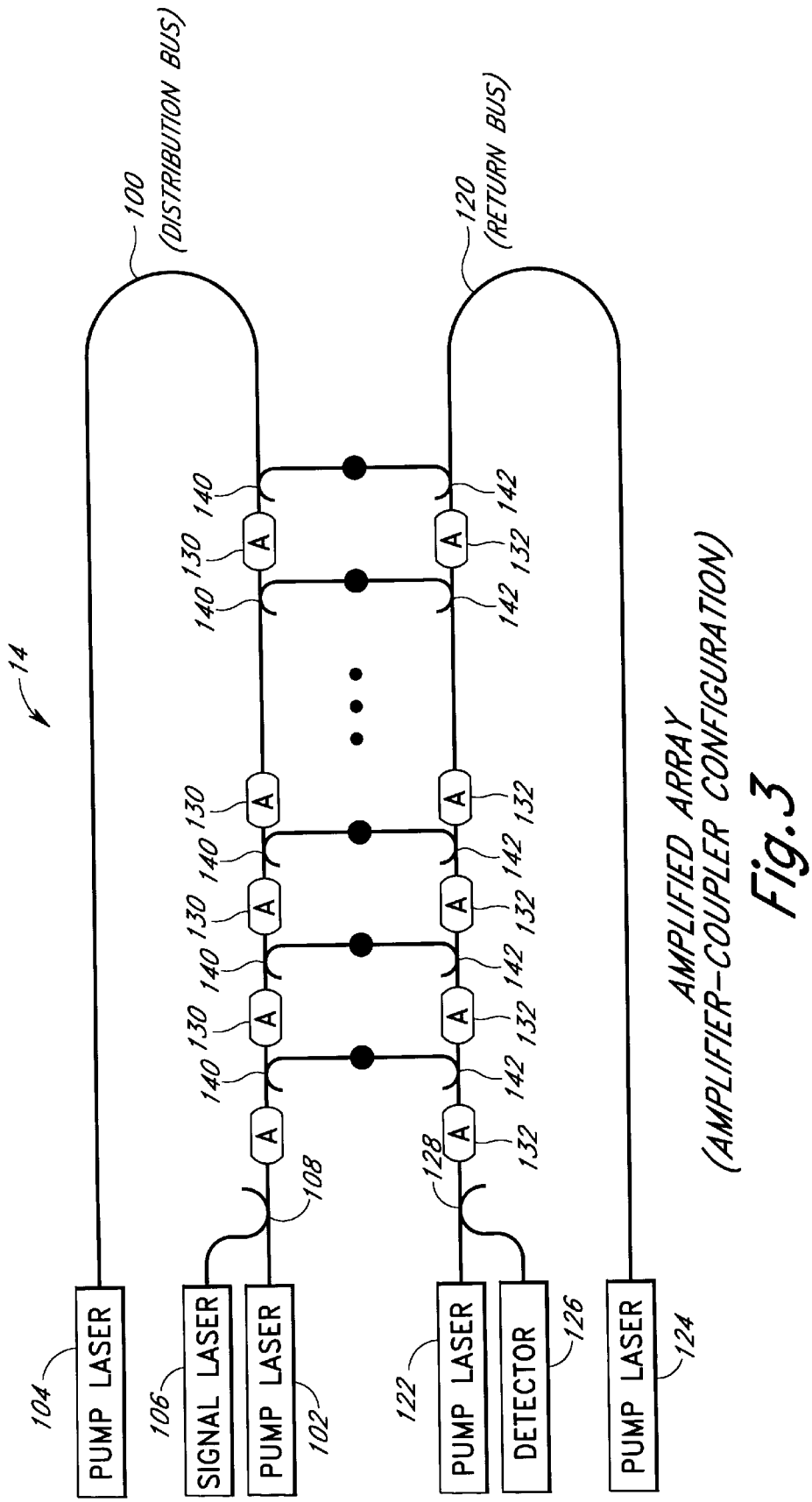

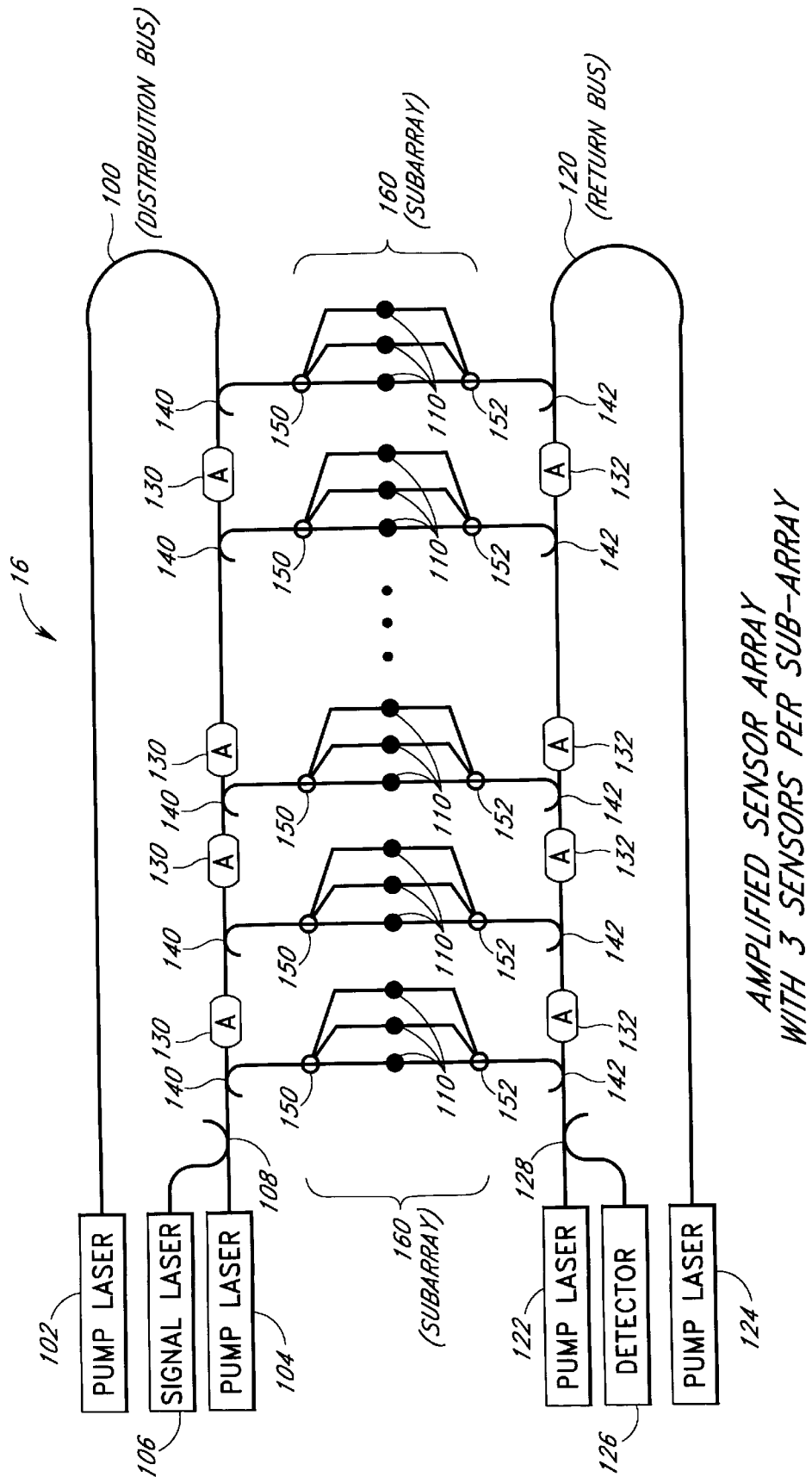

AMPLIFIED SENSOR ARRAY WITH 3 SENSORS PER SUB-ARRAY

TIMING DIAGRAM

OPTICAL SENSOR ARRAY HAVING MULTIPLE RUNGS BETWEEN DISTRIBUTION AND RETURN BUSES AND HAVING AMPLIFIERS IN THE BUSES TO EQUALIZE RETURN SIGNALS

Related Applications

The present application is a continuation-in-part application of U.S. patent application Ser. No. 08/814,548 filed on Mar. 11, 1997, now U.S. Pat. No. 5,866,898, which claims priority from U.S. Provisional Application No. 60/021,699 filed on Jul. 12, 1996, U.S. Provisional Application No. 60/034,804 filed on Jan. 2, 1997, and U.S. Provisional Application No. 60/036,114 filed on Jan. 17, 1997.

FIELD OF THE INVENTION

The present invention relates to arrays of fiber optic interferometric sensors and mechanisms for maximizing the signal to noise ratio in amplified sensor arrays that are time domain multiplexed.

BACKGROUND OF THE INVENTION

Arrays of fiber optic interferometric sensors show promise in applications where size, electrical interference, and electromagnetic detection make electronic sensors impractical. Such interferometric sensors are capable of measuring a parameter (i.e., a measurand) with a very high dynamic range (e.g., 120 dB). Optical sensor arrays are formed by connecting a series of sensors using fiber optic lines. If each sensor in an array requires a dedicated fiber to carry the detection signal, the large number of fibers required quickly becomes unwieldy as the number of sensors increases. Thus, as the number of sensors in an optical array increases, time domain multiplexing (TDM) becomes necessary to maintain a low fiber count. Electrical and optical frequency domain multiplexing have been attempted, but they are unmanageable for arrays comprising hundreds of sensors. As a result, large sensor arrays are organized into long strings of sensors which perform TDM by returning information from sensors placed at discrete intervals. A typical passive sensor array using TDM is constructed in a ladder type configuration. This design has only a few fiber lines and permits a small deployment size. It is desirable to provide a multiplexing scheme which includes a large number of interferometric sensors in an array while preserving the high dynamic range of the sensors and maintains a high signal to noise ratio (SNR).

As shown in FIG. 1, a conventional passive optical array 10 using TDM is formed by using a splitter coupler 140 to couple a distribution bus 100 to a first end of an optical sensor 110. A second splitter coupler 142 couples a return bus 120 to a second end of the optical sensor 110. A detection signal is sent from a source (not shown) which is then partially coupled into the first sensor 110 in an array of n sensors. The remainder of the detection signal continues along the distribution bus to subsequent couplers, each coupling a fraction of the detection signal into successive sensors.

Each sensor modifies the optical signal coupled into it from the distribution bus 100 based on external (e.g., acoustic) perturbations to be detected. The perturbed signal is then coupled onto the return bus 120 by coupler 142. The return bus then transmits the perturbed signals out of the array for processing.

The basic principle of TDM is as follows. The length of the path that the optical signal takes from the source, along the distribution bus 100, through the coupler 140, the sensor 110, the coupler 142 and back along the return bus 120 is different for each sensor. Therefore, the return signals arrive at the detector at different time intervals depending on the path length. Sensors closer to the signal source have a shorter path than sensors near the end of the array. Thus, sensors near the source place the return signals on the return bus slightly earlier than sensors farther down the array. This assumes that the time delay through each of the sensors is relatively equal. The signals are then transmitted outside the array to be sequentially processed by other hardware to extract the sensed information. Because each of the return signals has different time delay based upon differing distances between the sensor and the source, it is possible to use optical signals in a pulsed form. Based on the foregoing, each sensor 110 returns a signal pulse which is slightly delayed from the signal pulse returned by the previous sensor, and therefore enables the various signal pulses to be temporally separated at the detector. To avoid overlap of the returned signals on the return bus 120 and at the detector, the pulse length and frequency of the optical signals are selected so that the return signals do not overlap on the return bus.

FIG. 8 illustrates a timing diagram for a sensor array employing TDM to multiplex the return signals onto the return bus for detection and processing. In time period 1, the signal source outputs a detection pulse of length $\tau$. The signal source then waits a period of $T_{System}$ before resetting itself and repeating the detection pulse (shown as time period 1'). Once the detection pulse has been issued from the signal source, it is split into each sensor. The signal from each sensor returns at a different time depending on each sensor's respective distance from the signal source. The path lengths are chosen carefully so that the return signals are placed on the return bus at successive intervals with only a short intervening guard band ($T_{Guardband}$) between the return signals to prevent signal overlap. Once the last sensor has returned a signal N to the detector, the system waits a reset period ($T_{Reset}$) and then restarts the process. The period $T_{Reset}$ is selected to assure that the return pulse N from the last sensor arrives at the detector before the return pulse 1' from the first sensor arrives in response to the second detection pulse. An exemplary period for $T_{Reset}$ is approximately equal to $T_{Guardband}$ Thus, the repetition period for $T_{Reset}$ is approximately $N \times (\tau + T_{Guardband})$. For example, for a system having a path difference of approximately 8.2 meters between adjacent sensors, $\tau$ is selected to be approximately 40 nanoseconds and $T_{Guardband}$ is selected to be approximately 1 nanosecond. When the array is configured to include 300 sensors (i.e., N=300), then $T_{System}$ is approximately 12.3 microseconds. For this exemplary configuration, a repetition rate of approximately 80 kHz assures that the last return signal in response to a detection pulse does not overlap with the first return signal in response to the next detection pulse. Note that in FIG. 8 the time offset between the detection pulse and the first return pulse is not shown because the offset varies in accordance with the optical path length from the source to the first sensor, through the first sensor and back to the detector.

The advantage of TDM is that it allows simple interrogation techniques. No switching hardware is necessary, allowing a reduction in the cost and the size of the array. However, one of the problems with TDM is that it reduces the time each sensor is available for detection. If each sensor were given a dedicated fiber to report the result of its detections, it could provide a continuous stream of information. However, when TDM is implemented to reduce the number of fibers, no such continuous reporting is possible.

The amount of time any one sensor is sampled is reduced to 1/N of a continuously sampled sensor. As the number of sensors grows, the amount of time and the frequency that any one sensor is sampled is further reduced.

The limited sampling time increases the significance of the signal to noise ratio (SNR). Since under TDM, a short sample is extrapolated to represent a much longer period (N times longer than its actual sample time), it is much more essential that each sample be interpreted correctly by the detector. Noise is a significant source of interpretation errors and therefore the SNR must be kept as high as possible with as little degradation of the SNR along the sensor array as possible. A high SNR reduces the number of interpretation errors by the detection system.

The detection signal experiences a significant loss as it propagates through the passive array. The sources of loss include, for example, (1) fiber loss, splice losses, and coupler insertion loss, (2) sensor loss, and (3) power splitting at each coupler on the distribution and return busses.

Simple splitting (loss item (3)), which is the method used to couple the optical sensor to the distribution and return buses, results in large losses and a severe degradation in the SNR. The amount of light in the detection signal coupled from the distribution bus into the sensor depends on the coupling ratio of the coupler. The coupling ratio approximately represents the fraction of light that is split into the sensors and approximately one minus the coupling ratio is the fraction of light that is passed down the distribution bus to the next coupler. A high coupling ratio results in more power being delivered to each sensor from the distribution bus, but also results in a smaller amount of power being available to downstream sensors. A low coupling ratio increases the power delivered downstream, but limits the power available to each sensor. Consequently, there is a value of the coupling ratio that maximizes the return power from the farthest sensors, as discussed below.

In an array containing N sensors, the power returning from the mth sensor decreases as m increases (where sensor m=1 is the closest sensor to the source). The exception is the signal from the last sensor number N, which does not experience a splitting loss since there is no coupling and the entire remainder of the signal passes through it. In the passive array shown in FIG. 1, the return signal is therefore the weakest for sensor number N−1. To achieve the best output signal-to-noise ratio in a passive optical array, the signal at the detector (1) should carry as much power as permitted by nonlinear effects in the fiber busses, and (2) should be shot noise limited (a condition in which quantum noise originating at the source of the signal dominates the noise characteristic of the signal).

Without specifying particular optical powers, integration times, pulse widths, repetition rates, and the optical filtering needed to determine an absolute output SNR, the following equations define a system noise figure component which can be used to compare different array configurations. The noise figure of interest is the input source SNR divided by the output SNR for the worst sensor in the array (the N−1st sensor). The system noise figure (NF) is defined as:

$$NF_{system} = \frac{SNR_{intoarray}}{SNR_{outworstsensor}} \qquad (1)$$

This definition is consistent with the classical definition of amplifier noise, but is used here to describe the whole system as an amplification-loss transformation.

In order to determine the noise figure of the system, the losses associated with the various elements of the system (e.g., splicing losses, splitting losses, coupler losses, etc.) must be calculated. These losses (L) are considered in dB's (negative dB's in particular). The losses can also be considered in terms of transmissions. For example, a −3 dB loss is a 50% transmission, and a −10 dB loss is a 10% transmission. It is assumed that each sensor imparts the same loss $L_S$ to the signal, and the excess loss due to splices and coupler insertion is the same for all coupler segments and is equal to $L_x$. When all couplers exhibit the same coupling ratio C, it can then be shown that the power returning to the detector from sensor number m is:

$$P_m = P_{into\ array}(1-C)^{2m-2}L_x^{2m-2}C^2L_s \text{ for } m<N \qquad (2)$$

For the embodiment shown in FIG. 1, the sensor N receives more optical power than the sensor N−1 because the sensor N is connected directly to the distribution fiber rather than being coupled. The power for the sensor N is:

$$P_N = P_{into\ array}(1-C)^{2N-2}L_x^{2N-2}L_s \qquad (3)$$

Thus the returning power is lowest for sensor number N−1. From Equation 2, this power depends on the coupling ratio C and is at a maximum when:

$$C = \frac{1}{N-1} \qquad (4)$$

Using Equations 1 and 2, and assuming an optimized coupling ratio (Equation 4), the noise figure for the worst sensor is:

$$NF_{passive} = \frac{(N-1)^{2N-2}}{L_s L_x^{2N-4}(N-2)^{2N-4}} \qquad (5)$$

FIG. 4b shows the noise figure for the optimized passive array (solid curve) as the number of sensors increases. The sensor loss is assumed to be $L_s$=6 dB, and is consistent with current sensor technology. The excess loss is assumed to be $L_x$=0.2 dB per coupler segment. FIG. 4b shows that the noise figure level rises rapidly as the number of sensors is increased, revealing the limitations of the passive array configuration.

In order to obtain longer sensor arrays, a passive optical array must accept a reduction in the power available to each individual sensor, and therefore a degradation in the SNR results. With these constraints in mind, maximizing the SNR in TDM sensor arrays has been difficult. One solution is to increase the power in the optical source, which will, under shot-noise limited conditions, increase the SNR of all return signals. However, the maximum power the distribution bus can transmit is limited by nonlinear effects in the optical fiber. A passive array design is therefore limited in its ability to compensate for the low power coupled into each sensor by raising the initial power of the optical source.

SUMMARY OF THE INVENTION

Since the SNR is a large factor in the performance of a TDM optical sensor array, if the levels of noise in the resulting detection signal are high, the limits of current sensor technology cannot be approached and the benefits of highly sensitive sensors can never be exploited. For this reason, the architecture and design parameters of sensor arrays must be selected to minimize the SNR degradation due to splitting, other fiber losses and the presence of other noise. The present invention significantly improves the SNR in a passive optical array by adding optical amplifiers between the couplers to compensate for the coupler splitting losses.

In one advantageous embodiment of the present invention, optical amplifiers are inserted between the couplers along the signal path. The gain of the amplifiers is designed to compensate for the losses due to the previous coupler and other fiber losses. In this way, the overall SNR can be maintained without significant degradation as the number of sensors in the array increases. In a first aspect of the present invention, the amplifiers are located along the distribution and return buses directly after the couplers (except for the last sensor). In a second aspect of the present invention, the amplifiers are located directly before the couplers.

In one embodiment, the optical amplifiers comprise short lengths of erbium-doped fiber spliced into the distribution and return buses. Inexpensive pump sources can be used to pump the amplifiers from one or both ends of the array at 1480 nm or 980 nm for Er-doped fiber and at 1060 nm for Er/Yb-doped fiber.

Improvements can be made to the SNR when the distribution bus coupling ratios are set at optimal values. The value of the optimal coupling ratio depends upon the amplifier configuration, the excess loss and other configuration parameters.

Additional benefits can be achieved by grouping sensors into parallel configurations along the distribution and return buses. In this way, the number of sensors can be increased significantly without a corresponding increase in the number of amplifiers required. The parallel grouping of multiple sensors can increase the sensor density without a corresponding increase in the number of amplifiers or couplers. This design can improve the SNR by reducing the overall number of amplifiers and couplers, thereby reducing amplifier spontaneous emission noise and coupling losses. Also, the pump power requirements are reduced. This aspect of the present invention also permits smaller sized arrays for an equivalent number of sensors.

One aspect of the present invention is an optical sensor architecture which comprises a plurality of sensors which receive an optical signal and which output perturbed optical signals. A distribution bus is coupled to each sensor to distribute the optical signal to each sensor. A return bus is coupled to each sensor to receive the perturbed optical signal from each sensor to be included as a portion of the return signal. A plurality of first optical amplifiers are distributed at selected positions along the length of the distribution bus to maintain the power of the distributed optical signal at a selected level. A plurality of second optical amplifiers are distributed at selected positions along the length of the return bus to maintain the power of the perturbed optical signals in the return signal.

Another aspect of the present invention is an optical sensor architecture which comprises a plurality of sensor groups. Each sensor group comprises at least one sensor which receives an optical signal and which outputs a perturbed optical signal. A distribution bus is coupled to each sensor group to distribute the optical signal to each sensor group. A return bus is coupled to each sensor group to receive the perturbed optical signal from each sensor group. A plurality of first optical amplifiers are distributed at selected positions along the length of the distribution bus to maintain the power of the optical signal at an adequate level for each sensor group. A plurality of second optical amplifiers are distributed at selected positions along the length of the return bus to maintain the power of the perturbed optical signals on the return bus.

A further aspect of the present invention is an optical sensor architecture which comprises a plurality of means for sensing a parameter; means for distributing a first optical signal to each of the means for sensing; means for returning a second optical signal from each of the means for sensing; a plurality of means for amplifying the first optical signal spaced along the means for distributing; and a plurality of means for amplifying the second optical signal spaced along the means for returning.

A further aspect of the present invention is a method for reducing a noise figure level in a signal returning from a sensor architecture to generate an optical output. The method uses a plurality of sensors to generate output signals. An optical signal is transmitted through a distribution bus coupled to each sensor. The output signal from each sensor is coupled into a return signal carried via a return bus coupled to each sensor. The optical and return signals are amplified at multiple stages along the distribution and the return buses to increase a signal to noise ratio within the sensor architecture.

A further aspect of the present invention is a method for optimizing an array of optical sensors. The method provides an array of optical sensors positioned between a distribution fiber which propagates an input optical signal from a source and a return fiber which returns perturbed optical signals to a detector. Each optical sensor is coupled to the distribution fiber by a respective input coupler and coupled to the return fiber by a respective output coupler. A plurality of amplifiers are interposed at selected locations on the input distribution fiber and the return fiber. The amplifiers compensate for losses in the array. Coupling ratios are selected for the couplers and gains are selected for the amplifiers to optimize a system noise figure. The system noise figure is the ratio of a signal to noise ratio of the input optical signal to a signal to noise ratio of an optical signal in a sensor having a lowest signal to noise ratio.

A still further aspect of the present invention is a method for optimizing an array of optical sensors. The method provides an array of optical sensors coupled to an optical fiber by a plurality of couplers. An optical signal propagating in the optical fiber is amplified by a plurality of amplifiers to compensate for losses in the array. Coupling ratios are selected for the couplers and gains are selected for the amplifiers to optimize a system noise figure. The system noise figure is the ratio of a signal to noise ratio of the input optical signal to a signal to noise ratio of an optical signal in a sensor having a lowest signal to noise ratio.

A still further aspect of the present invention is an optical sensor architecture. The architecture comprises a plurality of sensors which receive an input optical signal and which output perturbed optical signals in response to a sensed parameter. At least one optical fiber distributes an optical signal to each sensor and returns a perturbed optical signal from each sensor. A plurality of optical amplifiers distributed at selected positions along the length of the at least one optical fiber to maintain the power of the distributed optical signal and returned perturbed optical signals at selected levels.

Another aspect of the present invention is an optical sensor array architecture which comprises a distribution bus which receives and distributes an optical input signal. The distribution bus propagates a distribution bus pump signal. A return bus receives a plurality of optical return signals and provides the optical return signals as output signals. The return bus propagates a return bus pump signal. A plurality of rungs are coupled between the distribution bus and the return bus. Each of the rungs comprises at least one sensor which receives a respective portion of the optical input signal and which generates one of the optical return signals. A plurality of input optical amplifiers in the distribution bus are responsive to the distribution bus pump signal. The input optical amplifiers amplify the optical input signal and have gains which maintain the optical input signal at a selected signal level for each of the rungs. A plurality of output optical amplifiers in the return bus are responsive to the return bus pump signal. The output optical amplifiers amplify the return signals generated by the sensors in the rungs and have gains which substantially equalize the magnitudes of the optical return signals. The gains of the amplifiers are typically greater when pumped by greater pump energy. Also preferably, the distribution bus pump signal and the return bus pump signal enter respective ends of the distribution bus and the return bus. The distribution pump signal may cause unequal pumping of the input optical amplifiers and differences in the respective gains of the input optical amplifiers. The return bus pump signal may cause unequal pumping of the output optical amplifiers and differences in the respective gains of the output optical amplifiers. The input optical amplifiers, the output optical amplifiers and the rungs are located such that the architecture defines a plurality of optical paths which include different combinations of the input optical amplifiers and the output optical amplifiers which have respective cumulative gains. The input optical amplifiers and the output optical amplifiers have gains selected such that differences in the cumulative gains between the optical paths are reduced, thereby reducing the noise figure of the architecture. The amplifiers are preferably positioned along the buses such that the optical paths include an equal number of amplifiers. The respective gains of the amplifiers are preferably adjusted to compensate for losses within the optical sensor architecture to maintain near unity transmission along the buses.

Another aspect of the present invention is a method of reducing the noise figure of an optical sensor architecture. The method comprises providing distribution and return buses through which pump energy propagates. The pump energy provides gain to optical amplifiers positioned along the distribution and return buses. The method further includes providing a plurality of rungs and a plurality of couplers. The couplers connect each of the rungs to the distribution and return buses. Each of the rungs comprises at least one sensor which receives a respective portion of an optical input signal launched into the distribution bus. The sensors generate respective optical return signals which enter the return bus. The method further comprises selecting the number of the rungs and the number of sensors in each rung to provide a total number of the sensors approximately equal to a desired number of total sensors. The number of rungs and the numbers of sensors in the rungs are selected to reduce the noise figure of the optical sensor architecture. In certain embodiments according to the method, the number of the rungs and the numbers of the sensors in the rungs are selected to reduce, but not minimize, the noise figure, so that the distribution and return pump power requirements are also reduced. Also, in certain embodiments, the fraction of the optical input signal coupled into the rungs by the couplers in the distribution bus is selected to reduce the noise figure of the optical sensor architecture for certain levels of optical input signal and distribution and return pump signals.

Another aspect of the present invention is a method of reducing the noise figure of an optical sensor architecture. The method comprises providing distribution and return buses through which pump energy propagates. The pump energy provides gain to optical amplifiers positioned along the distribution and return buses. The method further comprises providing a plurality of rungs and a plurality of couplers. The couplers connect each of the rungs to the distribution and return buses. Each of the rungs comprises at least one sensor which receives a respective portion of an optical input signal launched into the distribution bus. The sensors generate respective optical return signals which enter the return bus. The method further comprises selecting respective fractions of the optical input signal coupled into the rungs by the couplers in the distribution bus and respective fractions of the optical return signals coupled into the return bus by the couplers in the return bus to reduce the noise figure of the optical sensor architecture for a total number of the sensors approximately equal to a desired number of total sensors.

Another aspect of the present invention is an optical sensor architecture which comprises a distribution bus and a return bus, both of which propagate pump energy. The pump energy provides gain to optical amplifiers positioned along the distribution and return buses. The architecture includes a plurality of rungs and a plurality of couplers. The couplers connect each of the rungs to the distribution and return buses. Each of the rungs comprises at least one sensor which receives a respective portion of an optical input signal launched into the distribution bus. The sensors generate respective optical return signals which enter the return bus. The number of the rungs and the number of sensors in each rung provide a total number of the sensors approximately equal to a desired number of total sensors. The number of rungs and the numbers of sensors in the rungs are selected to reduce the noise figure of the optical sensor architecture.

Another aspect of the present invention is an optical sensor architecture which comprises a distribution bus and a return bus, both of which propagate pump energy. The pump energy provides gain to optical amplifiers positioned along the distribution and return buses. A plurality of rungs and a plurality of couplers connect each of the rungs to the distribution and return buses. Each of the rungs comprises at least one sensor which receives a respective portion of an optical input signal launched into the distribution bus. The sensors generate respective optical return signals which enter the return bus. The respective fractions of the optical input signal coupled into the rungs by the couplers in the distribution bus and the respective fractions of the optical return signals coupled into the return bus by the couplers in the return bus are selected to reduce the noise figure of the optical sensor architecture for a total number of the sensors approximately equal to a desired number of total sensors.

BRIEF DESCRIPTION OF THE DRAWINGS

FIG. 2 illustrates an amplified array in a coupler-amplifier configuration as a first aspect of the present invention.

FIG. 3 illustrates an amplified array in an amplifier-coupler configuration as described in a second aspect of the present invention.

FIG. 5a illustrates an amplified array in accordance with a third aspect of the present invention with multiple sensors in a sub-array and in a coupler-amplifier configuration using star fiber couplers to distribute signals within each sub-array.

DETAILED DESCRIPTION OF THE PREFERRED EMBODIMENTS

Figure 1:
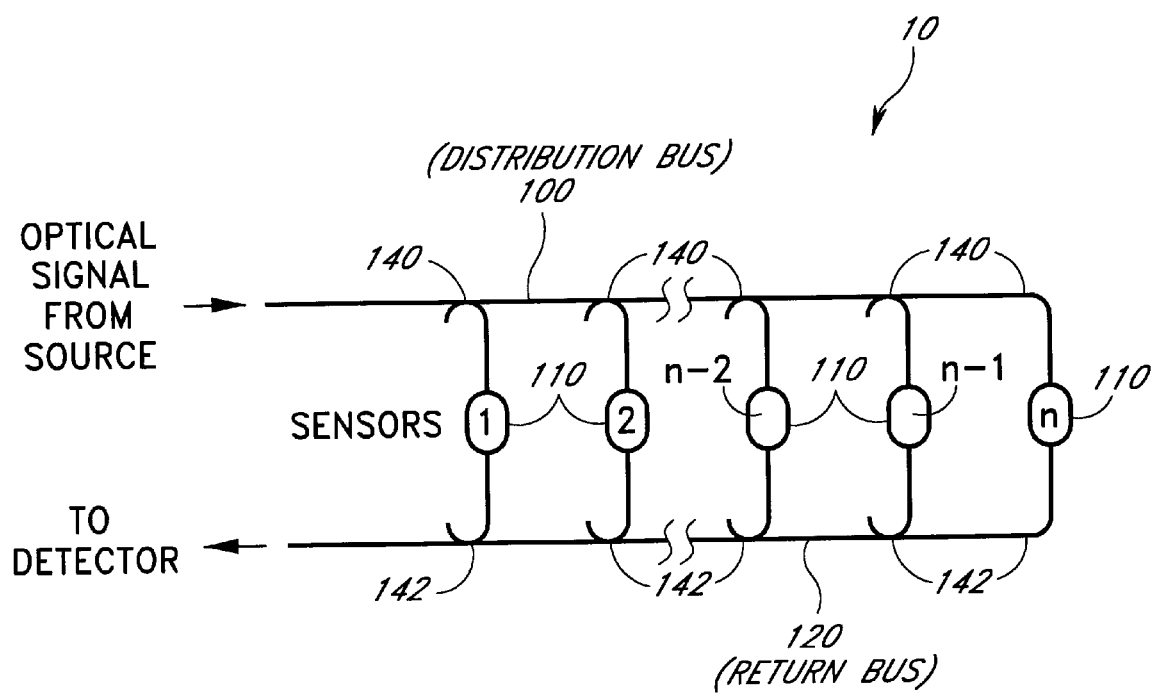
FIG. 1 illustrates a passive array of sensors without amplification.

Passive arrays can be designed to perform time division multiplexing (TDM) of signals by configuring the passive array 10 in the manner shown in FIG. 1. A distribution bus 100 carries a detection signal from a known source along its length. The distribution bus 100 is connected to a number of couplers 140 which couple the detection signal from the distribution bus 100 to a number of sensors 110 located at fixed intervals along the length of the distribution bus 100. Each coupler 140 partially couples the detection signal from the distribution bus 100 into a first end of each sensor 110. Each sensor 110 then modifies the detection signal based on external perturbations (not shown) such as, for example, acoustic signals detected in a seismic exploration activity. A second end of each sensor 110 is connected to a return bus 120 via a coupler 142. The return bus 120 thus receives the modified signal from the optical sensor 110 and transmits it to a detector external to the array (not shown). Because of the ladder-like shape of the array 10, each path from the distribution bus 100 through a sensor 110 to the return bus 120 is often referred to as a rung.

Since the distance the signal must travel through the array depends on which sensor the signal is coupled into, the modified signal output from the sensors 110 is placed on the return bus 120 at different time intervals depending on the distance between the sensor 110 and the source. Sensors closer to the source return the modified signal to the processor at an earlier time than those sensors located farther along the distribution bus 100. In this way, the signals from the optical sensors are time division multiplexed onto the return bus 120. The detector receives the modified signals sequentially at time intervals determined by the length of the source pulse, the repetition rate of the pulse and the optical distance between each of the sensors.

In a passive array, the SNR experiences a significant degradation as the number of sensors in the array grows. FIG. 4b shows that the noise figure level increases monotonically with the number of sensors in the array for passive arrays. This is because each successive sensor coupler weakens the source signal before it travels to the next coupling. If the coupling ratio is 0.1, then 10% of the source signal is coupled into the first sensor, and 90% of the signal is passed along to the next sensor. The second coupler in the series couples 10% of the remaining signal into the second sensor, which is only 9% of the original signal, and pass 90% of the remaining signal on to the next sensor which is only 81% of the original signal. Thus, the power provided to sensors in later stages of the sensor array is significantly degraded from its original strength. Thus, if the coupling ratio was 0.1, then the 100th sensor would receive a detection signal that is only $0.9^{99} \times 0.1$ (i.e., 0.0003%) of the detection signal's original strength. Furthermore, the power returned to the detector is only $(0.9^{99} \times 0.1)^2$ (i.e., 0.0000000009% ) of the detection signal's original strength (assuming no loss in the sensor).

FIG. 2 shows a first aspect of the present invention as an array 12 in a coupler-amplifier configuration in which degradation of the SNR is prevented through the use of erbium-doped fiber amplifiers (EDFA) 130, 132. The EDFAs 130, 132 regenerate the optical signals periodically as they progress through the array. The EDFAs 130, 132 are formed by splicing a section of Er-doped fiber into the distribution and return buses. By using amplifier pump lasers, the Er-doped fiber can function as an optical amplifier. Any number of different types of fiber waveguide optical amplifiers can also be used. Yb:Er:glass fiber and Nd-doped LiNbO$_3$ waveguides are among many different types of optical amplifiers that can be used advantageously with the present invention in the place of the Er-doped fiber amplifiers.

Ideally, the Er-doped fiber should be pumped from both ends of each bus (i.e., the distribution bus 100 and the return bus 120), at a wavelength of 1480 nm. This reduces the overall pump power required to ensure that every amplifier is sufficiently pumped. In particular, a first pump laser 102 is coupled to a first end of the distribution bus 100 such that substantially all of the pump light is coupled into the distribution bus 100 to propagate in a forward direction along the distribution bus 100. A second pump laser 104 is coupled to the opposite end of the distribution bus 100 such that the pump light from the second pump laser 104 propagates in the opposite direction through the distribution bus 100. The distribution bus 100 carries an optical signal coupled from a signal source 106 along its length. The signal source 106 is coupled to the distribution bus via a wavelength division multiplexer 108. In the embodiment shown, the wavelength division multiplexer 108 is selected to couple substantially all the signal light from the signal source 106 to the distribution bus 100. As is well known in the art, substantially none of the light from the pump source 102 is coupled by the wavelength division multiplexer 108 such that the pump light remains in the distribution bus 100.

The distribution bus 100 is connected to the couplers 140 which couple the distribution bus 100 to a number of sensors 110 located at fixed intervals along the length of the distribution bus 100. The distribution bus is also connected to a number of the erbium-doped fiber amplifiers 130 which are located along the distribution bus 100 and are placed directly after each of the couplers 140. Each coupler 140 partially couples the detection signal from the distribution bus 100 into a first end of each sensor 110. The coupling ratios are typically much larger for an optimized practical amplified array than for an optimized practical passive array. Each sensor 110 then modifies the signal based on an external input (e.g., acoustic signals, not shown).

Each of the couplers 142 couples a second end of each sensor 110 to the return bus 120 which receives the modified signal from the sensor 110 and returns it to a detector 126 external to the sensor array. The return bus signals are amplified by amplifiers 132 to compensate for the signal splitting by the return couplers 142. The amplifiers 132 receive pump power from a third pump laser 122 which couples pump light to a first end of the return bus 120 to propagate in a first direction in the return bus 120 and from a fourth pump laser 124 which couples light to the opposite end of the return bus 120 to propagate in the opposite direction of the light from the third pump source 124. The detector 126 is coupled to the return bus 120 proximate to the first end by a wavelength division multiplexer 128 which couples light at the signal wavelength from the return bus 120 to the detector 126 but which does not couple light at the pump wavelength.

In one advantageous embodiment of the present invention, the signal couplers 140, 142 which couple the optical signal to and from the respective sensors are wavelength division multiplexers. Wavelength division multiplexers are constructed to couple only preselected wavelengths into the sensors. Light having a wavelength which is not of one of the preselected wavelengths is not coupled and is passed through the wavelength division multiplexer. By preselecting the signal wavelength as the wavelength to be coupled, the present invention is able to couple only the optical signal into the sensors, allowing the amplifier pump light to pass through the multiplexer uncoupled. This prevents a significant degradation of the amplifier pump light as it progresses along the distribution bus.

Once the source signal passes through the first coupler 140 to the first optical sensor 110, the signal remaining on the distribution bus 100 is amplified by one of the EDFAs 130 which has a gain selected to increase the power of the optical signal back to the approximate power (e.g., 90–110 percent) of the original optical signal. The gain of the EDFA 130 is selected to substantially compensate for the signal power loss caused by the immediately preceding coupling and external losses. The signal is successively coupled and amplified by alternating couplers 140 and optical amplifiers 130 as the signal continues to travel down the length of the distribution bus 100. In this way, the input pulse travels along the distribution bus 100 gaining and losing power at every stage while experiencing minimal overall gain or loss. A similar configuration is provided on the return bus. This configuration, shown in FIG. 2, is referred to as the coupler-amplifier configuration.

The present invention avoids the signal degradation problem prevalent in the passive array of FIG. 1. Each sensor 110 receives a source signal having substantially the same power, even though the sensor 110 may be far along the distribution bus 100 and the signal may have undergone many previous sensor couplings. The present invention is also able to keep the power level of the optical signal at a manageable level to thereby avoid nonlinearity effects in the fiber which occur as optical powers in the fiber increase.

A second aspect of the present invention is an array 14 as shown in FIG. 3. In this embodiment, the EDFAs 130 are inserted along the length of the distribution bus 100 as in FIG. 2, but are placed before the couplers 140 so that the source signal is amplified before the coupling losses are incurred. The gain of each amplifier 130 is set to compensate for the expected signal power loss in the coupler 140 that follows the amplifier 130. In this configuration, the optical signal experiences a gain before the loss, which changes the noise characteristics and the optimum values for the coupling ratio. This configuration is referred to as the amplifier-coupler configuration.

Figure 4A:
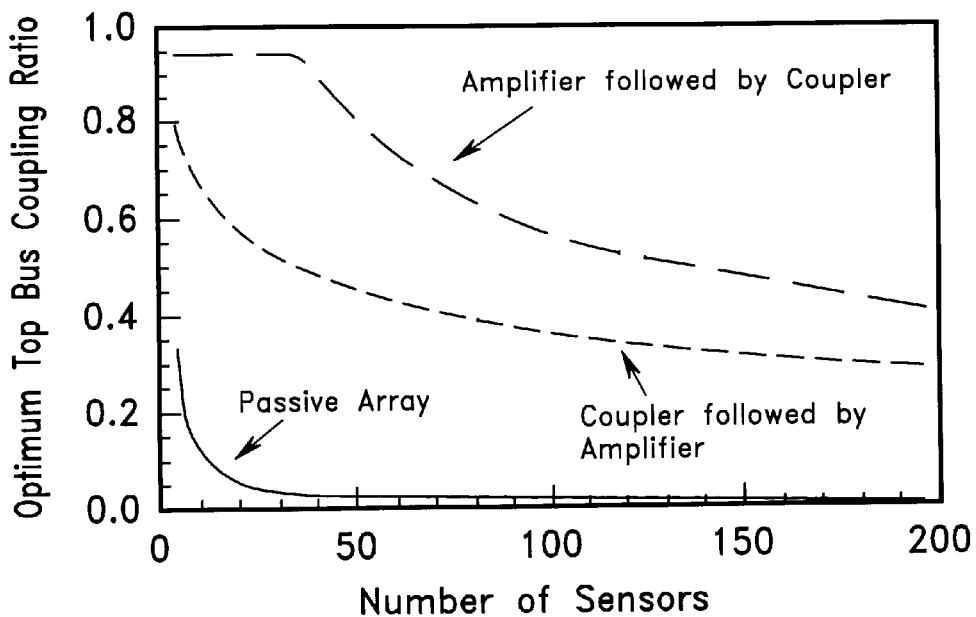
FIG. 4a illustrates the optimal distribution bus coupling ratios for a passive array and amplified arrays for both the coupler-amplifier and the amplifier-coupler configurations, for one sensor per rung.
Figure 4B:
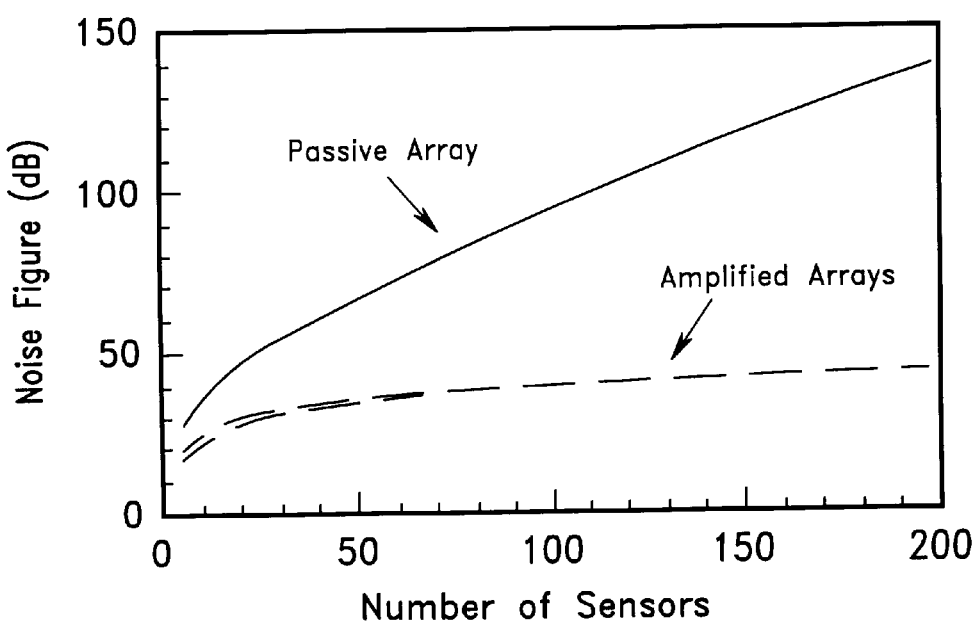
FIG. 4b illustrates the noise figure of the worst sensor as the number of sensors increases for both passive and amplified arrays, wherein, for the amplified array, all the sensors have nominally the same noise figures.

FIG. 4a shows the optimum distribution bus coupling ratios for the passive and the amplified arrays in both the coupler-amplifier and the amplifier-coupler configurations for one sensor per rung and 100 rungs per array (i.e., a total of 100 sensors in the array). The arrays shown in FIG. 4a have a loss $L_x$=0.2 dB and a sensor loss $L_s$=6 dB. The amplified array uses a distribution bus coupling ratio optimized to reduce the noise figure, and a return bus coupling ratio of 3 dB. FIG. 4a shows that for the amplified arrays shown in FIGS. 2 and 3, an optimum coupling ratio does exist for the couplers on the distribution bus and that as the number of sensors increases, the optimum distribution bus coupling is reduced for both the coupler-amplifier and the amplifier-coupler configurations.

FIG. 4b shows that both amplified array configurations exhibit the same noise figure dependence, quickly increasing to noise figures of 30 dB, then slowly growing from there, reaching only 44 dB when N is equal to 200 sensors. In comparison, the passive array noise figure (plotted from Equation 5) grows far more quickly throughout the range of interest, resulting in a prohibitively high noise figure level of 140 dB at 200 sensors. For large sensor arrays (100 or more sensors), an amplified array provides a large improvement in the SNR over a standard passive array. If a noise figure of no more than, say 40 dB is acceptable, the optimized passive array can have only about 12 sensors, whereas the amplified arrays can accommodate as many as 100 sensors, i.e., nearly ten times as many as in the passive array for the same noise figure.

In a third aspect of the present invention, the single sensor 110 between each pair of couplers 140, 142 shown in FIGS. 2 and 3 is replaced by a sub-array of sensors as shown in an array 16 in FIG. 5a. As described above, a distribution bus 100 receives a signal from the external source and carries it along its length. A portion of the signal is split by the coupler 140 as in the above configurations. However, a star fiber coupler 150 then couples an approximately equal fraction of the signal into each sensor 110 of a sub-array 160 which is a passive array comprising a small number of the sensors 110. The star fiber coupler 150 splits the detection signal equally among the sensors in the sub-array. The signals split by the star fiber coupler 150 propagate through respective ones of the sensors 110 and are coupled back onto the return bus 120 by another star fiber coupler 152 and the coupler 142. By choosing a different length for each of the fibers in the sub-array 160, the length of each signal path through the sub-array 160 is unique. This prevents the pulses from each of the sensors 110 in the sub-array 160 from overlapping in time on the return bus 120 as time division multiplexing is used. In addition, the total path length from the last sensor in a sub-array must be smaller than the total path length of the first sensor in the next sub-array. This will prevent two sensors from having the same overall path length and overlapping in time on the return bus.

Once on the return bus 120, the perturbed signals progress through the gain-loss cycle until they reach the detector and a processing apparatus (not shown). This aspect of the present invention has the advantage of reducing the number of amplifiers needed in the array. Additional advantages include lower pump power requirements and better signal to noise ratio (SNR) to a certain point, and the capability of supporting arrays of up to 400 sensors.

Figure 5B:
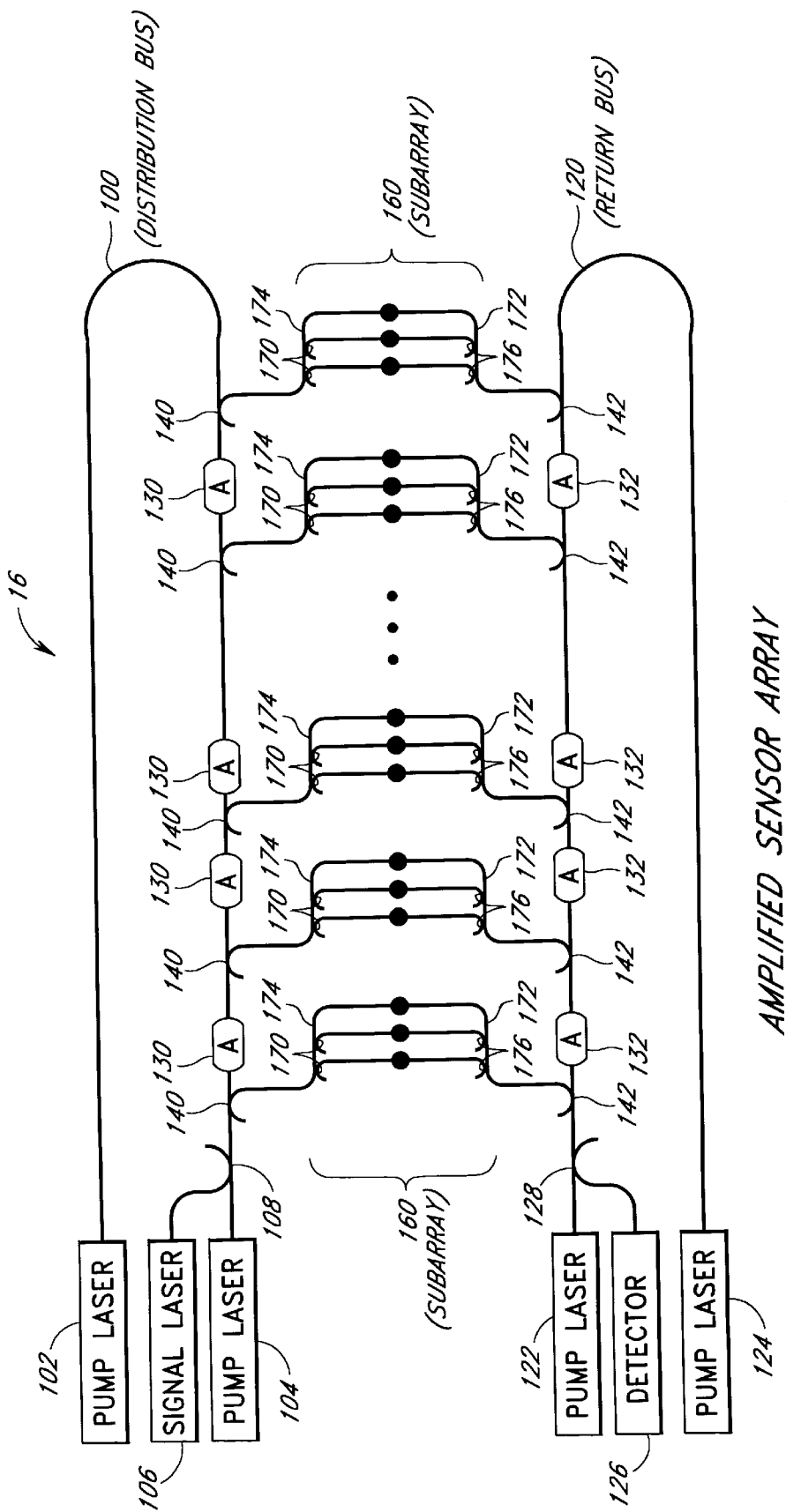
FIG. 5b illustrates an amplified array similar to FIG. 5a wherein a distribution bus and a return bus is provided within each sub-array.

FIG. 5b illustrates an alternative embodiment to FIG. 5a in which the fiber star couplers 150, 152 are replaced by distribution bus 170 and a return bus 172 in each sub-array which are coupled to the sensors 110 via respective distribution couplers 174 and return couplers 176. It should be understood that combinations of star couplers and a return bus, or a distribution bus and star couplers can also be used to couple to and from the sensors in the sub-arrays.

Figure 6A:
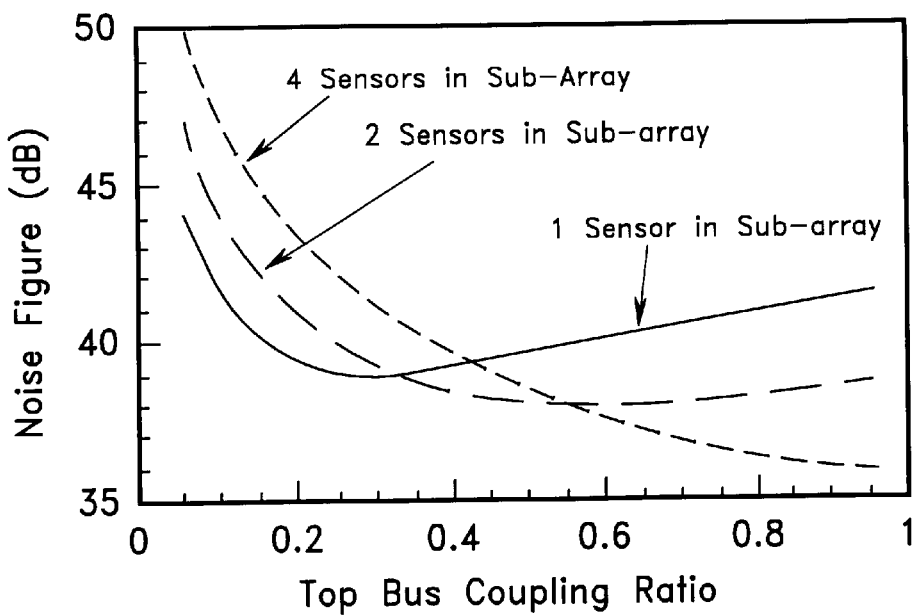
FIG. 6a illustrates the noise figure for the worst sensor for the sensor array shown in FIG. 5a for various distribution bus coupling ratios and for various numbers of sensors in the sensor sub-array in an amplifier-coupler configuration 100 sensors long, wherein all the sensors have nominally the same noise figures.

FIG. 6a illustrates the effect of changing the coupling ratio and the number of sensors in each sub-array in the amplifier-coupler configuration on the system noise figure for an array having a total of 100 sensors. For 1 and 2 sensors per sub-array, there is an optimum coupling ratio that minimizes the noise figure. For 1 sensor per sub-array, the minimum noise figure is 39 dB at a coupling ratio of 0.28. Where there are 2 or 4 sensors per sub-array, the noise figure is lower. In a configuration with 2 sensors, the noise figure is at a minimum of 38 dB when the coupling ratio is 0.55. This result shows that by using 2 sensors per sub-array instead of 1, the same noise figure level can be obtained in a system that requires half as many amplifiers for the same total number of sensors. The reason for this reduction in noise figure is a reduction in the overall amplified spontaneous emission (ASE) noise due to a reduction in the number of amplifiers for an equivalent number of sensors.

When signal-ASE beat noise limits the SNR instead of shot noise, reducing detected power does not have a strong effect on the output SNR. While 2 sensors per sub-array does result in lower detected powers (by one quarter), it also reduces the amount of signal-ASE beat noise, yielding slightly better performance. FIG. 6a shows that with 4 sensors per sub-array, the noise figure continues to improve as the coupling ratio approaches unity. With a high coupling ratio of 0.95, the system noise figure can be dropped to 36 dB. Thus, by doubling the number of sensors in the sub-array, and halving the number of bus amplifiers and couplers, both the total number of components and the total pump power requirements can be decreased while maintaining the SNR system performance.

Figure 6B:
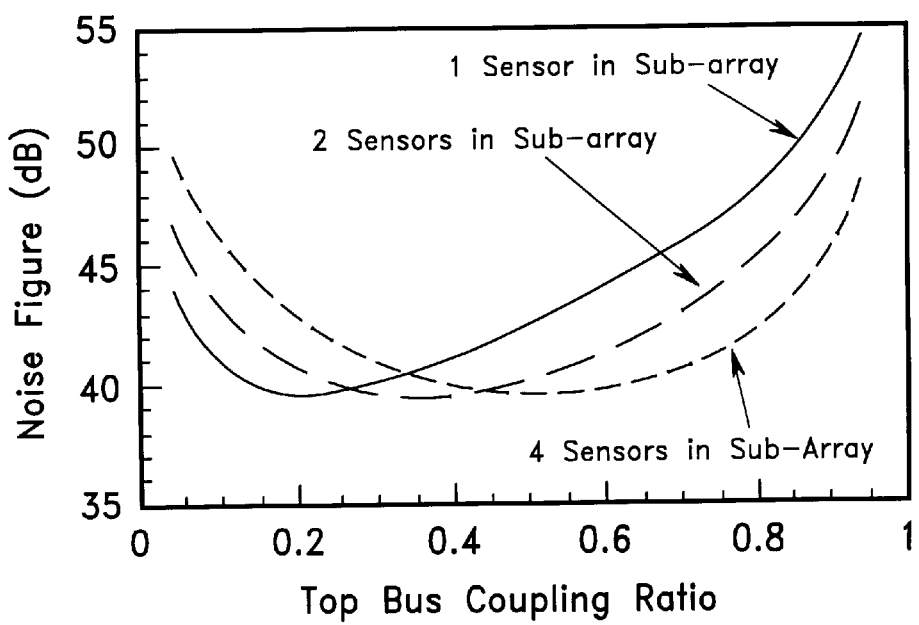
FIG. 6b illustrates the noise figure for the worst sensor for the sensor array shown in FIG. 5a for various distribution bus coupling ratios and for various numbers of sensors in the sensor sub-array and in a coupler-amplifier configuration 100 sensors long, wherein all the sensors have nominally the same noise figures.

FIG. 6b shows the same analysis for the coupler-amplifier configuration. As above, the value of the optimum coupling ratio depends on the number of sensors in the sub-array, but the noise figure does not. FIG. 6b shows that as the number of sensors in the sub-array increases from 1 to 2 to 4, the value of the optimal coupling ratio changes from 0.2 to 0.35 to 0.55 while the noise figure remains constant at just under 40 dB.

Figure 6C:
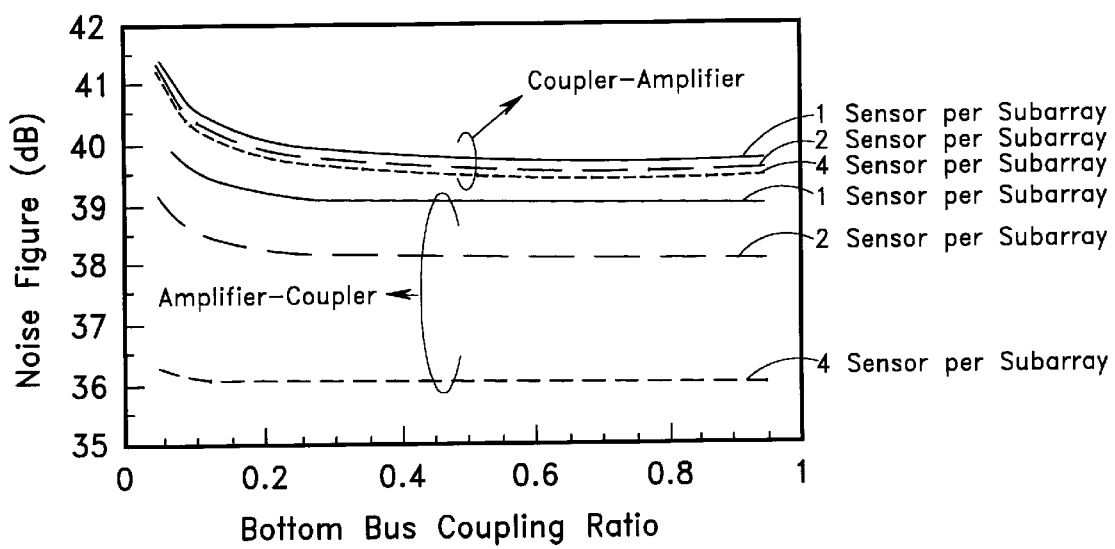
FIG. 6c illustrates the noise figure for the worst sensor for the sensor array for various return bus coupling ratios and for various numbers of sensors in the sub-array.

The return bus couplers 142 do not have an optimum coupling ratio, but give better results with higher coupling, as illustrated in FIG. 6c. The noise figure level is shown for both amplifier-coupler and coupler-amplifier configurations and for different sizes of the sub-array. For all configurations, the distribution bus coupling ratio is optimized and the total number of sensors is 100. As the return bus coupling ratio is increased from 0.2 to 0.95, the noise figure level degradation for either configuration shown in FIG. 6c and for 1, 2 or 4 sensors per sub-array is less than 1 dB. The return bus coupling can therefore be freely selected based on amplifier pump considerations (a lower coupling ratio means a lower pump power requirement). The spread in noise figure levels for different array configurations is a result of selecting the optimum distribution bus coupling ratio as shown in FIG. 6a.

The following defines the system parameters:

n=number of sub-arrays
j=number of sensors per sub-array
nj=total number of sensors
$C_d$=coupling ratio for the distribution bus (couplers 140)
$C_r$=coupling ratio for the return bus (couplers 142)
$L_x$=splice and insertion loss in each coupler segment
$L_s$=2 sensor loss
$n_{sp}$=amplifier inversion parameter Because of the presence of the optical amplifiers 130 and 132, which add amplified spontaneous emission (ASE) to the signal, the output of the amplified array is no longer shot noise limited as in the passive array, but shot noise and signal-ASE beat noise are the dominant terms. To obtain the noise figure for the worst sensor, the noise figure calculation must now account for the ASE from all the amplifiers.

It is assumed that each amplifier 130 on the distribution bus is identical and has the same gain. Likewise, it is assumed that the amplifiers 132 on the return bus have identical gain, along with an inversion parameter equal to that of the amplifiers on the distribution bus. While remote pumping of the amplifiers 130, 132 from each bus end allows the system to approach this condition, in practice the amplifiers are slightly different due to manufacturing tolerances and nonuniform pump and signal powers. The gain is set equal to the loss on the bus, resulting in a gain of:

$$G_d = \frac{1}{L_x(1-C_d)} \quad (6)$$

for the distribution bus amplifiers 130, and a gain of:

$$G_r = \frac{1}{L_x(1-C_r)} \quad (7)$$

for amplifiers 132 on the return bus. The input signal is assumed to be pulsed, and the pump to be on continuously, resulting in continuous ASE. Thus, although the path length for every sensor 110 is different, the ASE that traveled through one sensor 110 can effect the noise characteristics of a signal from a different sensor 110.

Because of the strong signal powers, the ASE-ASE beat noise and the ASE shot noise can be neglected in system design. For the configuration shown in FIG. 3, where an amplifier 130, 132 is placed before the first coupler on both busses 100, 120, the noise figure level is:

$$NF_{amplifier\text{-}coupler} = \frac{j^2 L_x^2(1-C_r)(1-C_d)}{C_d C_r L_s} + \quad (8)$$

$$j[1-(1-C_d)L_x]n(n+1)n_{sp} + \frac{2j^2 L_x n(1-C_d)[1-(1-C_r)L_x]n_{sp}}{C_d C_r L_s}$$

Note that this expression is the same for every sensor 110, unlike that of the passive array configuration. The response of every sensor is affected by signal-ASE beat noise equally.

Equation 8 can be advantageously used to select an optimum combination of number of rungs and number of sensors per rung for a required number of sensors. In particular, integer values of n (number of sub-arrays or rungs) and j (number of sensors per sub-array) having a product close to or equal to the required number of sensors are substituted into Equation 8 and the value of the noise figure level calculated for each combination. The combination which produces the lowest noise figure level is then selected as the optimum combination for the required number of sensors.

Using the same approach as for Equation 8, it can be shown that the noise figure level for the coupler-amplifier system is now:

$$NF_{coupler\text{-}amplifier} = \frac{j^2}{C_d C_r L_s} + \quad (9)$$

$$\frac{j[1-(1-C_d)L_x]n(n-1)n_{sp}}{(1-C_d)L_x} + \frac{2j^2(n-1)[1-(1-C_r)L_x]n_{sp}}{C_d C_r L_s}$$

To optimize the amplified array performance, it is necessary to examine the effect of the distribution and return bus coupling ratios on the system noise figure level as was done for the passive array. Equations 8 and 9 show that there is no optimum coupling ratio for the return bus 120. The system is largely insensitive to the choice of $C_r$. There does exist an optimum coupling ratio for the couplers 140 on the distribution bus, as shown in FIG. 4a. The excess loss was chosen to be 0.2 dB, the sensor loss was chosen to be 6 dB, and the amplifier inversion parameter $n_{sp}$ was chosen as 1.5. 3 dB couplers are used on the return bus 120, with two sensors 110 in each sub-array. As the number of sensors 110 in the array increases, the optimum distribution bus coupling $C_d$ drops for both configurations. In can be shown that for large numbers of sensors, with one sensor per rung (one amplifier per bus per sensor), the optimum coupling ratio approaches:

$$C_{d(amplifier\text{-}coupler)} = \frac{\sqrt{2j[1-(1-C_r)L_s]}}{\sqrt{nC_r L_s}} \quad (10)$$

for the amplifier-coupler configuration and $$C_{d(coupler-amplifier)} = \frac{\sqrt{2j[1-(1-C_r)L_x]L_x}}{\sqrt{nC_rL_s}} \qquad (11)$$

for the coupler-amplifier configuration. In both configurations the optimum value for $C_d$ depends not only on the number of sensors 110 in the system, but also on the sensor loss, excess loss, number of sensors in a sub-array, and the amplifier inversion. Both optimum coupling ratios fall off as $1/n^{1/2}$, compared to approximately $1/N$ for the passive array of FIG. 1. The amplifier-coupler configuration requires higher optimum coupling ratios, approaching 1 for low numbers of sensors. In the following analysis, at the values of n where the optimum value of $C_d$ is predicted to be close to unity, it has actually been limited to 0.95, since a $C_d$ too close to 1 would require an distribution amplifier 130 with an unrealistically high gain. Similarly, a $C_r$ too close to 1 would require a return amplifier 132 with an unrealistically high gain.

Figure 7A:
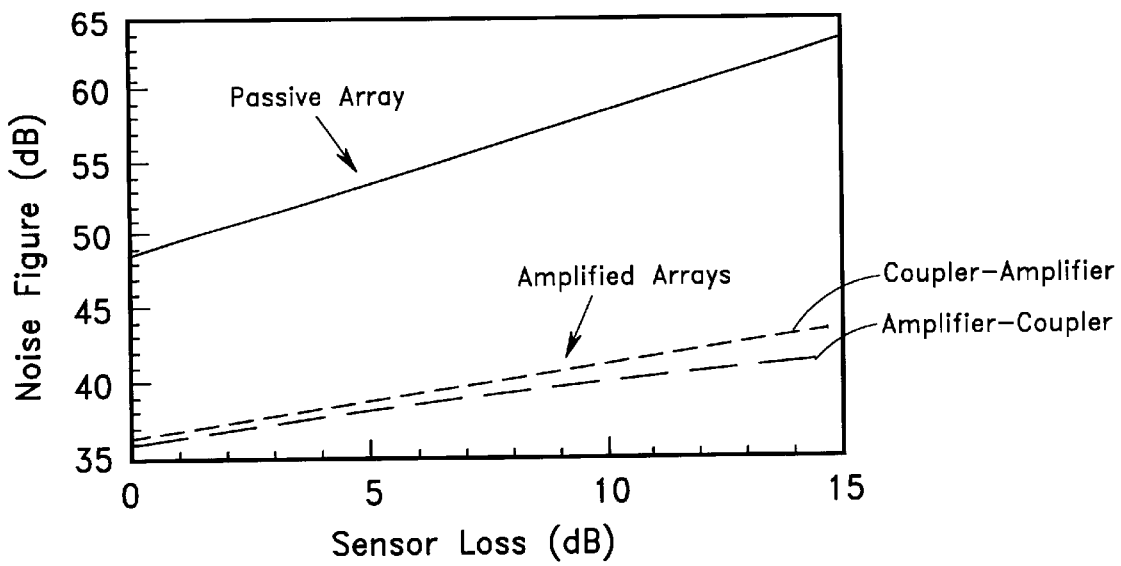
FIG. 7a illustrates the effect of sensor loss on system noise figures for passive and amplified arrays of 100 sensors with 1 sensor per sub-array and a return bus coupling ratio of 0.5.

The sensor loss figures also affect the optimal coupling ratios. In the above situation, the sensor loss was assumed to be 6 dB. This was chosen to account for a 3 dB loss in an unbalanced Mach-Zehnder sensor and a 3 dB fiber bending loss in a coiled sensor. FIG. 7a demonstrates the effect of different sensor losses on the noise figure of the worst sensor in the array with 100 sensors for both passive and amplified arrays. Both passive and amplified arrays experience noise figure degradation of the signal as sensor losses increase. Over a sensor loss range of 0 to 15 dB, the amplified arrays degrade at most 8 dB, while the passive array degrades 15 dB. There is also an advantage to the amplifier-coupler array configuration over the coupler-amplifier configuration as shown in FIG. 7a. The two configurations begin only 0.3 dB apart when the sensor loss is at zero. However, at a 15 dB sensor loss, the amplifier-coupler configuration has a noise figure level almost 2 dB below the coupler-amplifier configuration.

Figure 7B:
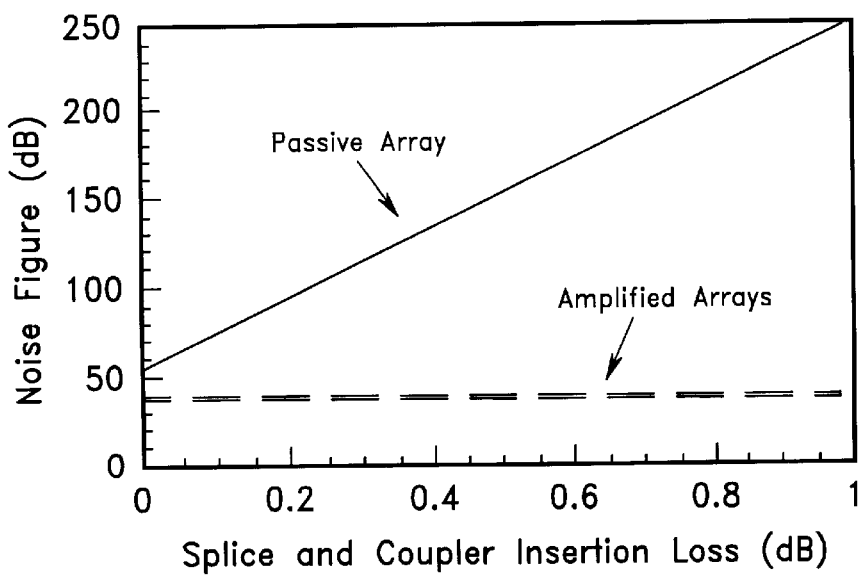
FIG. 7b illustrates the effect of splice and coupler insertion loss on system noise figure for passive and amplified arrays of 100 sensors.
Figure 8:
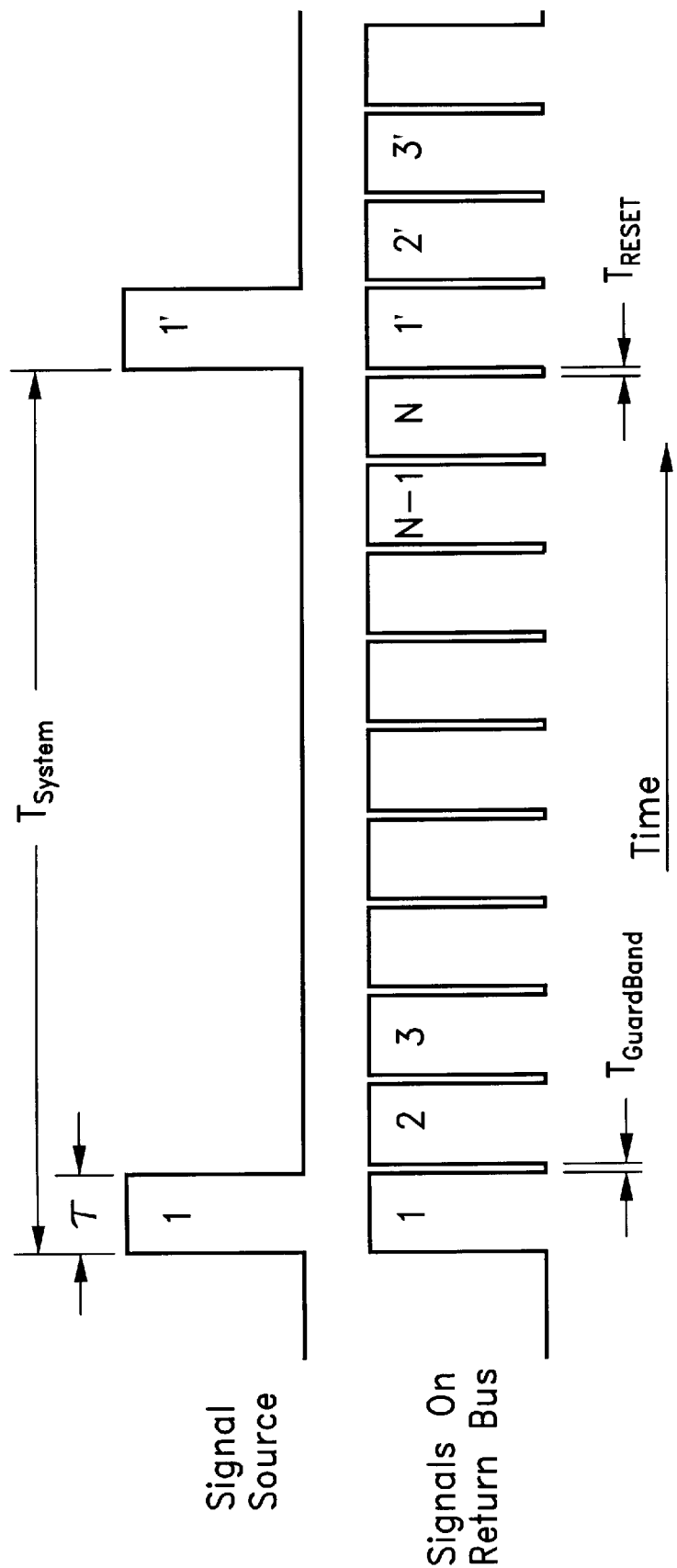
FIG. 8 illustrates a timing diagram of the detection signal and the return signals using time division multiplexing.

FIG. 7b demonstrates the effect of excess loss on both the passive and amplified arrays in a 100 sensor array with one sensor per sub-array. As the excess loss on the busses increases from 0 to 1 dB per coupler segment, the amplified arrays experience only a 2 dB noise figure level degradation. Preferably, in the amplified arrays, extra gain is added as extra loss is encountered such that the gain is always equal to the loss. The passive array noise figure level increases from 55 dB with no excess loss to as much as 255 dB at a 1 dB splice and coupler loss. This demonstrates the extreme sensitivity of the passive array to component losses, while the amplified arrays remain fairly stable as component losses increase, as long as these losses are known in advance and sufficient gain is included to compensate for higher insertion losses. Typical splice and insertion losses are about 0.2 dB, giving a passive array a 40 dB increase in noise figure and leaving the amplified array relatively unchanged.

Amplified arrays clearly outperform standard passive arrays, resulting in a lower system noise figure and improved SNR at the detector when coupling ratios are optimized. For realistic splice and insertion loss levels, the amplified arrays are shown to have equivalent SNR characteristics for arrays having a number of sensors an order of magnitude larger than the number of sensors in passive arrays. The optimum coupling ratio depends on array configuration and the number of sensors in the array, and provides the preferred design parameters to maximize the SNR for amplified sensor arrays. In all cases, the amplifier-coupler configuration has been shown to outperform the coupler-amplifier configuration, demonstrating slightly lower noise figure levels across all relevant parameters. For large scale sensor deployment where fiber count and system complexity are of concern, amplified TDM arrays show significant promise over conventional passive TDM arrays.

Figure 9:
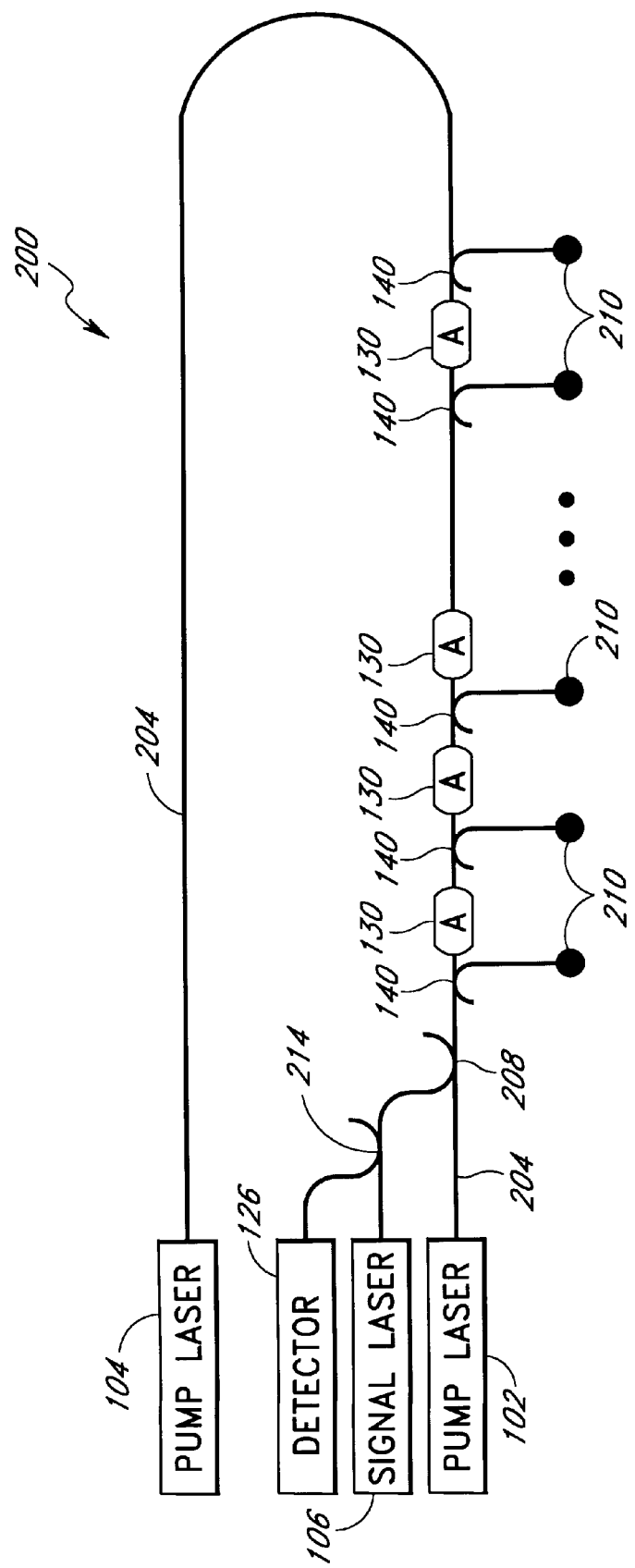
FIG. 9 illustrates an array having bidirectional sensors and a bidirectional bus which functions both as the distribution bus and the return bus.

Although described above in connection with sensor arrays wherein each sensor has an input and an output and wherein the sensor array comprises a distribution bus and a return bus, it should be understood that the sensor can operate with bidirectional sensors and with a bidirectional bus which functions both as the distribution bus and the return bus. Such an array 200 is illustrated in FIG. 9. The array 200 comprises a single optical bus 204 (e.g., an optical fiber) which extends between a pump laser source 102 and a pump laser source 104, as described above in connection with FIG. 2. The outputs of the signal source 106, also described above, and the pump laser source 104 are coupled to the optical bus 204 via a wavelength division multiplexer 208 which is similar to the wavelength division multiplexer 108 in FIG. 2. The detector 126, described above, is also coupled to the optical bus 204 via a coupler 214 and the wavelength division multiplexer 208. Alternatively, the coupler 214 may be replaced by a conventional optical circulator (not shown) which couples the light from the signal laser 106 onto the optical bus 204 via the wavelength division multiplexer 208. The optical circulator also couples light received from the optical bus 204 via the wavelength division multiplexer 208 to the detector 126.

As illustrated in FIG. 9, the optical bus 204 is coupled to a plurality of sensors 210 via a corresponding plurality of the couplers 140. The amplifiers 130 between adjacent couplers operate to amplify the distribution signal, as described above in connection with FIG. 2. Unlike the sensors 110 in the array 12 in FIG. 2, the sensors 210 are bidirectional because they only have a single input/output port. Light which enters the input/output port of a sensor is perturbed by a parameter such as, for example, an acoustic signal, and the light exits by the same input/output port propagating in the opposite direction. The couplers 140 are bidirectional and couple the light from the sensors 210 back to the optical bus 204 but propagating in the opposite direction toward the wavelength division multiplexer 208. The amplifiers 130 are also bidirectional and amplify the return signals in the same manner as the return bus amplifiers 132 in FIG. 2. It can thus be seen that the array 200 in FIG. 9 operates in a similar manner as the array 12 in FIG. 2 but with only a single optical bus 204.

In like manner, the array 14 in FIG. 3 and the array 16 in FIG. 5a can be converted to bidirectional arrays (not shown) using sensors having single input/output ports.

The following discussion is directed to the optimization of the signal-to-noise ratio of large-scale fiber sensor arrays employing erbium-doped fiber amplifier telemetry with respect to the number of sensors per rung, the number of amplifiers per array, and the coupling ratio between the fiber buses and the rungs. Broad optimum regions are found, providing design flexibility to minimize pump power requirements. Simulations predict that 300 sensors can be multiplexed on a fiber pair while maintaining a high sensitivity (1 $\mu rad/\sqrt{Hz}$) for all sensors with a moderate input pump power (<1 W).

Interferometric fiber optic acoustic sensors have achieved greater than 1 $\mu rad/\sqrt{Hz}$ sensitivity, which translates into better than 10 dB below the typical acoustic noise levels in the oceans. (See, for example, P. Nash, "Review of Interferometric Optical Fibre Hydrophone Technology," *IEE Proceedings—Radar, Sonar And Navigation*, Volume 143, June 1996, pp. 204–209; and A. D. Kersey, "A Review of Recent Developments in Fiber Optic Sensor Technology," *Optical Fiber Technology: Materials, Devices and Systems*, Volume 2, July 1996, pp. 291–317.) Many hydrophone applications, in particular seismic exploration for undersea oil deposits, require multiplexing a large number of such sensors onto a few fibers, and placing the sensors a long distance (1–50 km) from the receiving electronics. As set forth above, a time-domain multiplexed (TDM) sensor array involving multiple low-gain fiber amplifiers can support hundreds of interferometric sensors on a pair of fibers. This method maintains the large dynamic range (>120 dB/√Hz) inherent to existing fiber interferometric hydrophone sensors. As set forth above, an array which incorporates 10 rungs and 20 erbium-doped fiber amplifiers (EDFAs) can in principle support more than 100 sensors. Arrays comprising 64 sensors and employing two EDFAs have been experimentally demonstrated. (See, for example, A. D. Kersey, A. Dandridge, A. R. Davis, C. K. Kirdendall, M. J. Marrone, and D. G. Gross, "64-Element Time-Division Multiplexed Interferometric Sensor Array with EDFA Telemetry," in *OFC'96*, Volume 2, 1996 OSA Technical Digest Series, paper ThP5.)

As set forth above, a basic array configuration has each rung supporting one sensor. The following discussion is directed to array configurations in which several sensors are placed on each rung (using TDM). With proper selection of the array parameters, such array configurations yield improved performance over the one sensor per rung configuration. In particular, the signal-to-noise ratio (SNR) of all the sensors is improved, the total number of amplifiers (for a given total number of sensors) is reduced, and the total pump power required by the amplifiers is reduced. With this topology, only about 25 fiber amplifiers per bus can support 300 sensors on a pair of fibers, while all sensors exhibit substantially equal SNRs in excess of 120 dB. The pump power requirement of this type of array is subsequently discussed, and it is shown how with proper selection of the array parameters this requirement can be minimized without significantly changing the SNR.

Figure 10:
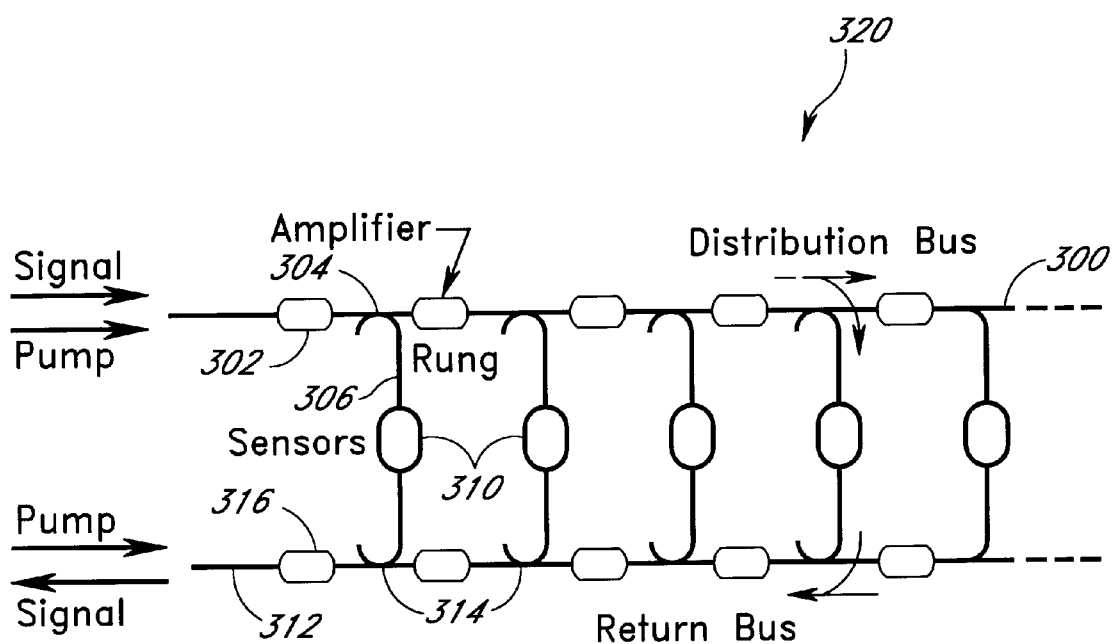
FIG. 10 illustrates a conceptual amplified sensor array with time division multiplexing.

Sensor arrays employing typical passive multiplexing methods are severely limited in the number of sensors that can be multiplexed onto a fiber pair because of the passive splitting losses associated with first distributing a signal from a first fiber to many sensors, and second recombining all of the signals onto a second fiber. As discussed above, one way to compensate for these passive splitting losses and increase the maximum number of sensors per fiber pair is to add an optical amplifier before each coupler on both buses, as shown in FIG. 10. A single signal pulse (i.e., an optical input signal) is launched into a distribution bus 300. The pulse is amplified by a first amplifier 302 with gain $G_d$, a first coupler 304 delivers a portion $C_d$ of the pulse to a first rung 306, and the remaining portion $(1-C_d)$ is transmitted to a subsequent amplifier 302. The gain of each amplifier 302 is set to exactly compensate for all subsequent losses (mostly coupler splitting losses and splice losses) before the next amplifier. The signal pulse proceeds along the distribution bus 300 in this fashion and all sensors 310 are provided an equal amount of signal power. Similarly, a signal pulse from each sensor 310 (i.e., an optical return signal) is coupled onto a return bus 312 via a coupler 314 of coupling ratio $C_r$. Signals already on the return bus 312 encounter a coupler, and the fraction $(1-C_r)$ of their power is transmitted to a subsequent amplifier having a gain $G_r$. Again, each amplifier exactly compensates for the losses between amplifiers and provides unity transmission of the signals along the return bus 312 to a detector (not shown). Each sensor returns a large and similar amount of signal power to the detector as an output signal, so that all sensors have the same SNR and thus identical sensitivities. With proper selection of the signal pulse width and distance between couplers, no two return signal pulses overlap on the return bus 300. (See, for example, J. L. Brooks, B. Moslehi, B. Y. Kim, and H. J. Shaw, "Time Domain Addressing of Remote Fiber Optic Interferometric Sensor Arrays," *Journal of Lightwave Technology*, Volume LT-5, July 1987, pp. 1014–1023.) The signal pulse returning from the first sensor arrives first, and the signal pulse returning from the last sensor arrives last. Subsequent signal pulses are launched into the distribution bus 300 such that the output signals generated by subsequent signal pulses do not overlap the output signals generated by previously launched signal pulses, thereby permitting the respective pulses to be temporally resolved. Signal pulses travel along both buses 300 and 312, gaining and losing power at every stage, but not experiencing overall gain or loss. By periodically regenerating the signal, the fundamental limitation of passive arrays is overcome.

All of the amplifiers are pumped remotely from the front end of array 320 by pump signals from one (or more) pump lasers (see FIG. 10). The couplers are wavelength division multiplexing (WDM) in design so that the pump propagates only along the buses 300 and 312 and is never coupled into the rungs 310. The pump power at the first amplifier 302 is much greater than the amplifier's pump threshold; therefore, the first amplifier is in a state of high pump saturation. It absorbs a small fraction of the incident pump power and transmits the large remaining power to downstream amplifiers which also operate in the high pump saturation regime. The pump power requirement is that enough pump power is launched into each bus so that the pump power at the last amplifier is still high enough for proper operation. The end result is that it is possible to pump tens of low-gain amplifiers from a remote location with a moderate amount of pump power (on the order of 1 W at 1480 nm).

In order to maintain a modular design for the array 320, all couplers 304 on the distribution bus 300 are preferably identical (same coupling ratio $C_d$) and all amplifiers preferably have the same length (same gain $G_d$). Similarly, the couplers 314 (coupling ratio $C_r$) and the amplifiers 316 (gain $G_r$) on the return bus 312 are preferably identical, although $C_d$ and $C_r$ may differ, and $G_d$ and $G_r$ may differ. The first amplifiers on each bus (i.e., the amplifiers closest to the respective pump sources) receive and absorb more pump power than the last ones, so the gains of the first amplifiers are greater than the gains of the last ones. However, these gain differences are small for high pump power and can be ignored. Thus all sensors return nearly identical amounts of signal power. To compare various configurations, the system noise figure (NF) defined previously is used:

$$NF_{system} = \frac{SNR_{into\ array}}{SNR_{out\ worst\ sensor}} \qquad (12)$$

Because each amplifier provides low gain, each one continuously adds only a small amount of noise in the form of amplified spontaneous emission (ASE). Also, as set forth above, since each sensor preferably returns the same signal power and is equally affected by the cw ASE, the SNR is identical for all sensors.

The configuration of FIG. 10 has 1 sensor per rung and a total of N sensors, and thus one pair of amplifiers per sensor, i.e., a total of 2N amplifiers for the array. The configuration of FIG. 10 produces a suitable noise figure, but it requires a large number of amplifiers (2 per sensor) and thus a large pump power budget. To reduce the number of amplifiers, multiple sensors may be placed on each rung by using star couplers 330, as shown in an array 331 of FIG. 11 having a distribution bus 344, a return bus 346 and a plurality of rungs 334. Using a pair of 1×j star couplers 330 to place j sensors 332 in each rung 334 reduces the number of distribution bus amplifiers 336 and the number of return bus amplifiers 337 by a factor j. This results in a lower pump power requirement and a different noise figure for the returning signals. Two antagonistic effects influence this noise figure. The first one is that as the numbers of amplifiers 336, 337 are reduced, the ASE returning to a detector (not shown) drops, and the noise figure improves. The second effect is that as j increases, the splitting loss of the star couplers 330 increases, so that the signal power returning from each sensor decreases by a factor of $j^2$ (two couplers per rung), and the noise figure worsens.

A further influence on the noise figure is the coupling ratio of the couplers 340 and 342, located on the distribution bus 344 and the return bus 346, respectively. The gain of each distribution and return bus amplifier 336 and 337 is directly related to these coupling ratios by the requirement that the distribution bus transmission $T_d$ and return bus transmission $T_r$ from one amplifier to the next is unity, $$T_d = G_d L_x (1-C_d) = 1 \tag{12a}$$

$$T_r = G_r L_x (1-C_r) = 1 \tag{12b}$$

where $L_x$ is the excess loss between amplifiers due to splices and the coupler. This requirement of unity transmission is necessary so that each sensor returns an equal amount of signal power. As the coupling ratios are increased, more signal power is delivered to each rung and returned to the detector, and the SNR improves. Increasing the coupling ratios partially compensates for the signal loss on each rung $L_{rung} = L_s \cdot L_j^2$, where $L_s$ is the transmission loss of a single sensor, and $L_j$ is the splitting loss of a 1×j star coupler. The transmission from the distribution bus 344 onto a rung 334, through a sensor 332, and onto the return bus 346 is:

$$T_{d-r} = G_d L_x C_d L_{rung} G_r L_x C_r = \frac{C_d}{1-C_d} L_{rung} \frac{C_r}{1-C_r} \tag{13}$$

in which use is made of Equations 12. The transmission is greater than $L_{rung}$ when $C_d > (1-C_d)$ and $C_r > (1-C_r)$, which is satisfied when, for example, $C_d > 50\%$ and $C_r > 50\%$. With this choice of coupling ratios, the signal experiences overall gain upon entering and leaving a rung, which tends to compensate for $L_{rung}$. Further, this choice increases the signal power returning to the detector and improves the noise figure. But increasing the coupling ratios and the amplifier gains also increases the pump power budget. Thus, some compromise must be made between noise figure and pump power requirement.

Figure 11:
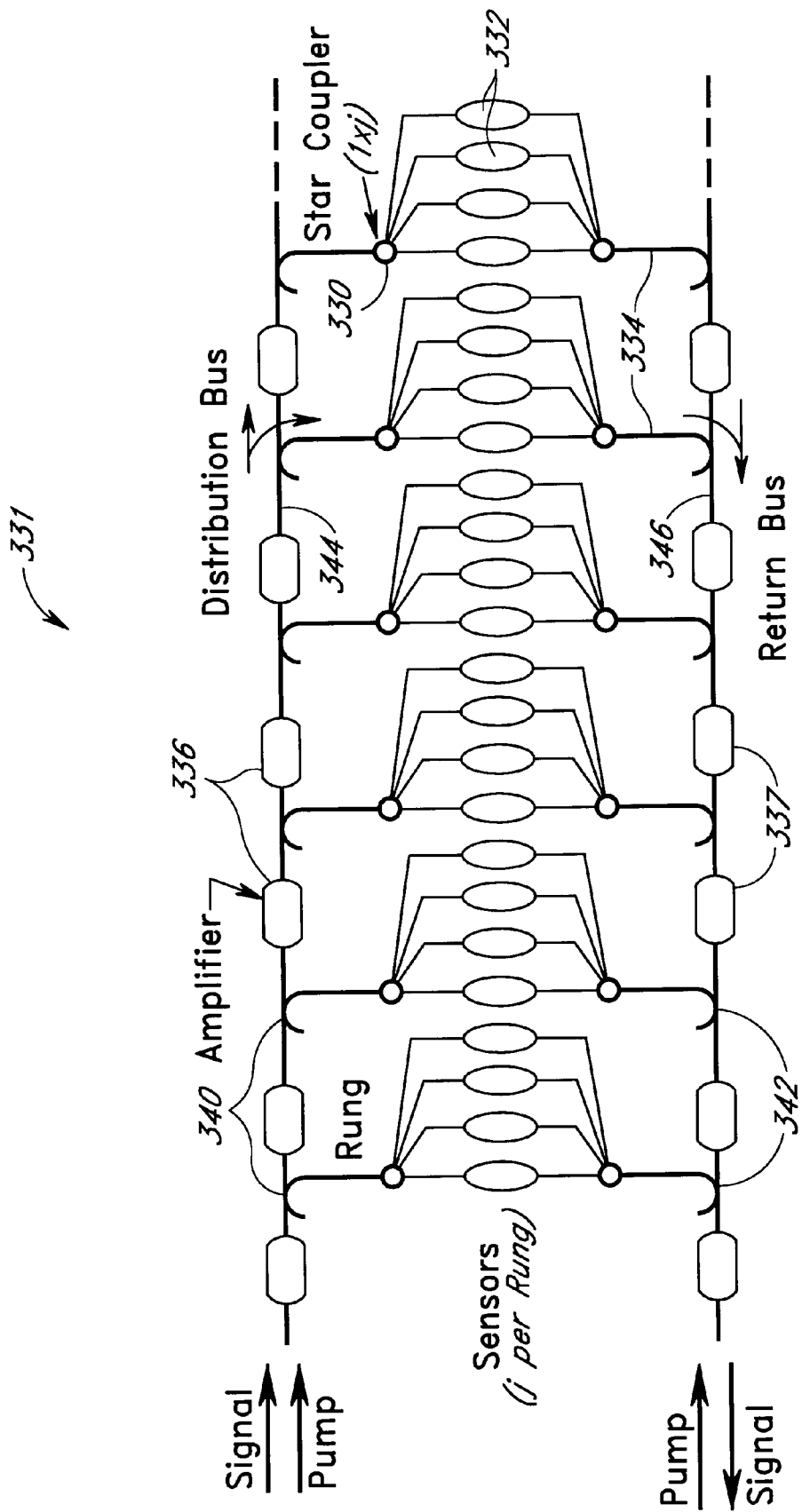
FIG. 11 illustrates a conceptual amplified sensor array in which multiple sensors (e.g., 4) are multiplexed on each rung by using two 1×j star couplers.

To analyze the noise performance of the new topology depicted in FIG. 11, it is necessary to determine the configuration (value of j and n, and the coupling ratios $C_d$ and $C_r$) which produce the lowest noise figure for a given total number of sensors N, while using reasonable signal and pump powers.

The three primary contributions to the noise figure for the array 331 in FIG. 11 are (1) the signal attenuation, (2) the accumulated ASE generated by the distribution bus amplifiers, which reaches the detector via the sensors and causes signal-ASE beat noise, and (3) the accumulated ASE generated by the return bus amplifiers, which reaches the detector and also causes signal-ASE beat noise. The accumulated ASE also produces ASE-ASE beat noise and ASE shot noise, but since the signal power is much larger than the ASE power, these noise terms are small and ignored. The ASE accumulates differently in the instant invention than in a typical point-to-point communication system with a single path, since there is a separate path through every sensor and the many ASE contributions all sum on the return bus. For example, considering only the ASE generated by the first amplifier 306 on the distribution bus 344 of FIG. 11, one portion of the ASE is coupled into the first sensor, and the remainder travels down the distribution bus 344. Because of the unity transmission along the distribution bus 344, an equal portion of the ASE is coupled into all other sensors. The ASE collected at the detector that originated only in the first distribution bus amplifier 336 increases with the number of rungs n in the array 331 The return bus amplifiers 337 also generate ASE signals that add incoherently (no interference effects) on the return bus 346. As set forth above, these various contributions can be added to obtain the total ASE power at the detector, from which the noise figure can be computed. Assuming the coefficients $C_d$ are identical for all distribution bus couplers, and likewise that the coefficients $C_r$ are identical for all return bus couplers, the gains $G_d$ are identical for all distribution bus amplifiers, and the gains $G_r$ are identical for all return bus amplifiers, and assuming that Equations 12 are satisfied throughout, the NF was shown above in Equation 8 to be the same for all sensors and equal to:

$$NF = \frac{j^2 L_x^2 (1-C_r)(1-C_d)}{C_d C_r L_s} + j[1-(1-C_d)L_x]n(n+1)n_{sp} + \frac{2j^2 L_x n(1-C_d)[1-(1-C_r)L_x]n_{sp}}{C_d C_r L_s} \tag{8}$$

where N=j·n is the total number of sensors per array, j is the number of sensors per rung, n is the number of rungs per array, and $n_{sp}$ is the amplifier inversion parameter, which approaches 1 from above with increasing pump power. The three NF terms are due to signal shot noise, signal-ASE beat noise for ASE originating in the distribution bus amplifiers, and signal-ASE beat noise for ASE originating in the return bus amplifiers, respectively. Other noise terms, such as ASE-ASE beat noise, ASE shot noise, detector electronic noise, signal laser relative intensity noise, phase noise converted to amplitude noise via sensor imbalances, etc., are typically much smaller and are not included.

Figure 12:
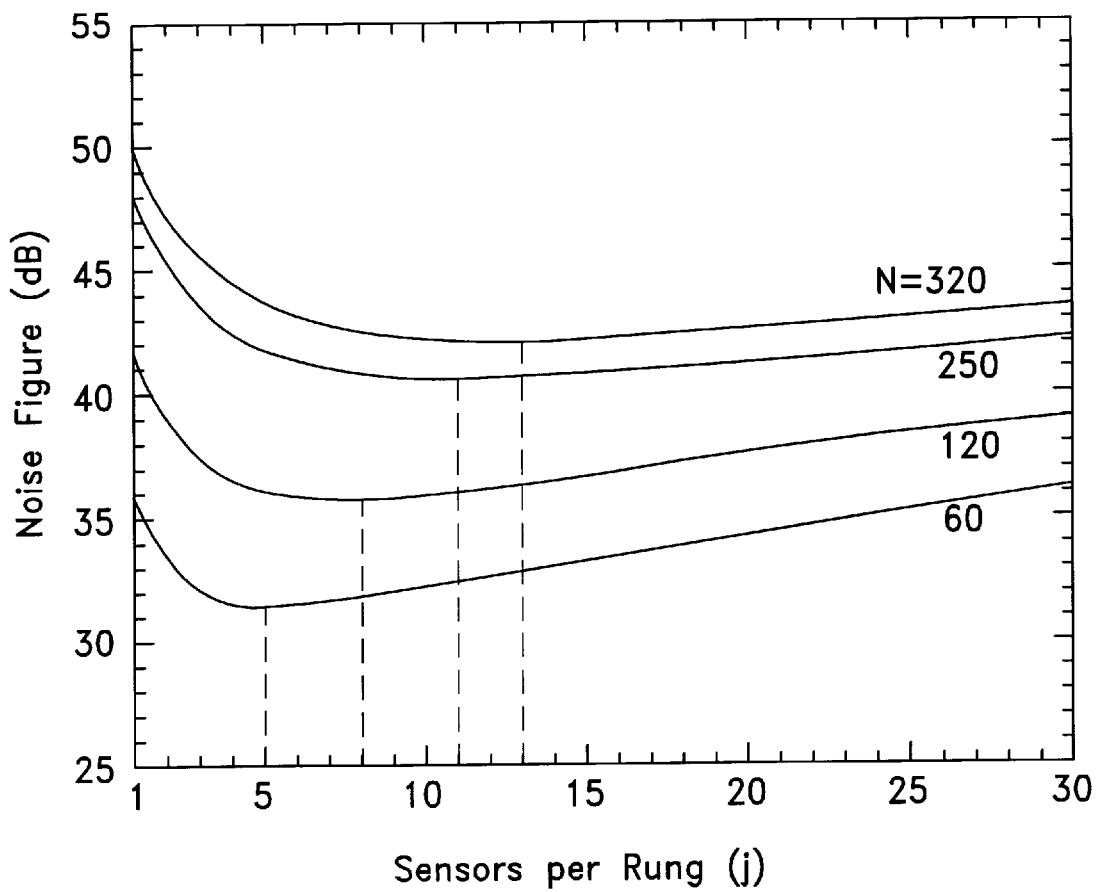
FIG. 12 illustrates the noise figure versus number of sensors per rung for arrays of 60, 120, 250 and 320 total sensors per fiber pair with parameter values of $C_d$=80%, $C_r$=50%, $L_s$=5 dB, and $L_x$=0.4 dB.

For a required total number of sensors, Equation 8 can be used to select an optimum combination of number of sensors per rung and number of rungs so as to minimize the noise figure. To do so, integer values of j and n having a product close to or equal to the required N are substituted into Equation 8 to calculate the noise figure for each combination. The combination {j, n} which produces the lowest noise figure is then selected as the optimum configuration. FIG. 12 shows four curves of NF versus number of sensors per rung j for arrays with different total numbers of sensors N, assuming $C_d = 80\%$, $C_r = 50\%$, $L_s = 5$ dB, and $L_x = 0.4$ dB. It is shown later that these values of the coupling ratios optimize the noise figure while maintaining a reasonable pump power budget. The value $L_s = 5$ dB arises from the 3 dB loss due to the interferometric sensor, which is biased at quadrature for maximum sensitivity, and fiber bending loss, which is typically 2 dB for a few hundred meters of fiber wrapped on a mandrel of diameter 3 cm or less. $L_x$ comprises the excess loss of a bus coupler (typically 0.3 dB) and the insertion losses of two splices between an Er-doped fiber and a standard single-mode fiber (typically 0.05 dB each). FIG. 12 shows that for a fixed number of sensors per rung, the noise figure increases as the total number of sensors per array increases. Each curve exhibits a minimum at some optimum number of sensors per rung. The minimum for each curve occurs when the two signal-ASE beat noise terms (second and third terms) of Equation 8 are equal. To the left of the minimum, ASE which originated on the distribution bus (second term) produces the dominant noise term at the receiver. To the right of the minimum, the dominant noise term is produced by ASE originating on the return bus (third term). Considering Equation 8, the second term is proportional to j·n·(n+1), which reduces to N·(n+1), and the third term is proportional to $j^2$·n, which reduces to N·j. On the left side of the minimum, there is sufficient signal returning to the detector, but there are too many amplifiers. At the detector, the accumulation of ASE from the distribution bus amplifiers is proportional to n·(n+1). Reducing the number of amplifiers n significantly reduces the returned ASE. On the right side of the minimum, as j increases, the attenuation of a rung $L_{rung}$ increases, which increasingly attenuates both the signal and the ASE from the distribution bus. In this case, the returning signal is not sufficient and the ASE generated by the return bus amplifiers produces signal-ASE beat noise that dominates the noise figure. The location of the minimum can be evaluated by taking the derivative with respect to j of Equation 8 (ignoring the small first term), which yields:

$$j = \sqrt{\frac{N \cdot C_d C_r L_s [1-(1-C_d)L_x]}{2(1-C_d)L_x[1-(1-C_r)L_x]}} \quad (14)$$

For an array of 60 sensors (FIG. 12, bottom curve), and a configuration containing one sensor per rung and thus 60 amplifiers per bus, a relatively high NF (35.7 dB) is predicted. If instead the number of sensors per rung is increased to 2 (i.e., 30 amplifiers per bus), the NF improves to 33.1 dB. For N=60, a minimum NF of 31.3 dB is achieved with j=5 sensors per rung. If j is again doubled to 10 and the number of amplifiers reduced by half to 6 (so that N still equals 60), the NF worsens (to 32.1 dB).

The minimum for each curve in FIG. 12 is quite broad, which in practice allows great design flexibility to optimize other parameters, such as the pump power budget, as described below. For an array with 320 sensors (FIG. 12, top curve), =27 amplifiers per bus. If instead, the array consisted of 18 sensors per rung and 320/18≈18 amplifiers per bus, the noise figure would worsen insignificantly by 0.25 dB. On the other hand, the pump power requirement would be significantly reduced, since the number of amplifiers is reduced from 27 to 18. Therefore, the pump power requirement can be significantly reduced from that for the optimum configuration by reducing the number of rungs and increasing the number of sensors per rung, with only a small penalty on the noise figure.

Figure 13:
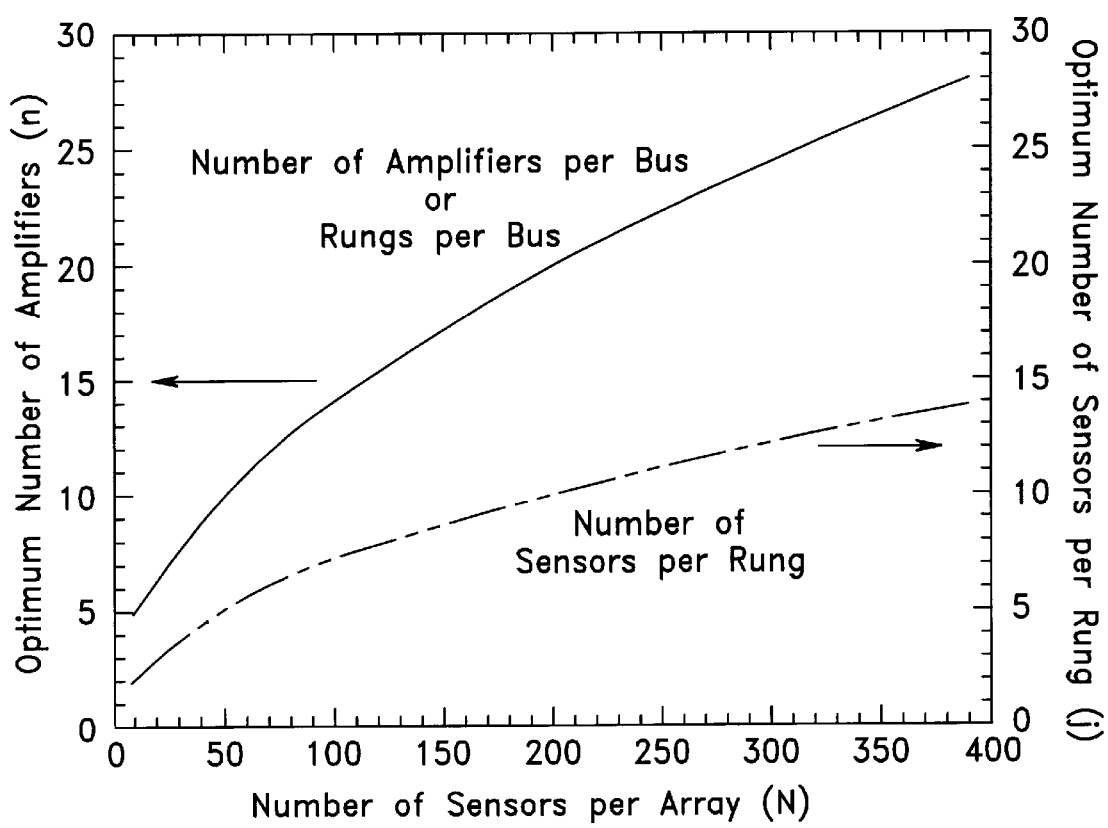
FIG. 13 illustrates, in a lower curve, an optimum number of sensors per rung versus total number of sensors in an array to minimize the noise figure (derived from the locus of minima of FIG. 12), and illustrates, in an upper curve, an optimum number of rungs per array (or equivalently the optimum number of amplifiers per bus) versus the total number of sensors per array.

The optimum number of sensors per rung (j) and the optimum number of amplifiers per bus (n) versus the total number of sensors per array (N) is shown in FIG. 13. The two curves in FIG. 13 are derived from the locus of the minima in FIG. 12. The lower curve is the complement of the upper curve. That is, for any value of the abscissa N in FIG. 13, the product of the ordinates of the two curves equals N. These curves give the optimum values for j and n to construct an array with minimum noise figure. For example, if an array of 200 sensors is required, the optimum configuration would consist of 10 sensors per rung (lower curve) and 20 rungs (upper curve). These curves are a function of the particular values chosen for $C_d$, $C_r$, $L_s$, and $L_x$. It should be understood in FIG. 13 that for most cases, the optimum value is a non-integer value. Thus, the number of sensors per rung is selected to be a near integer value to the optimum value, and the number of amplifiers (i.e., the number of rungs) is selected to provide approximately the desired number of sensors.

Figure 14:
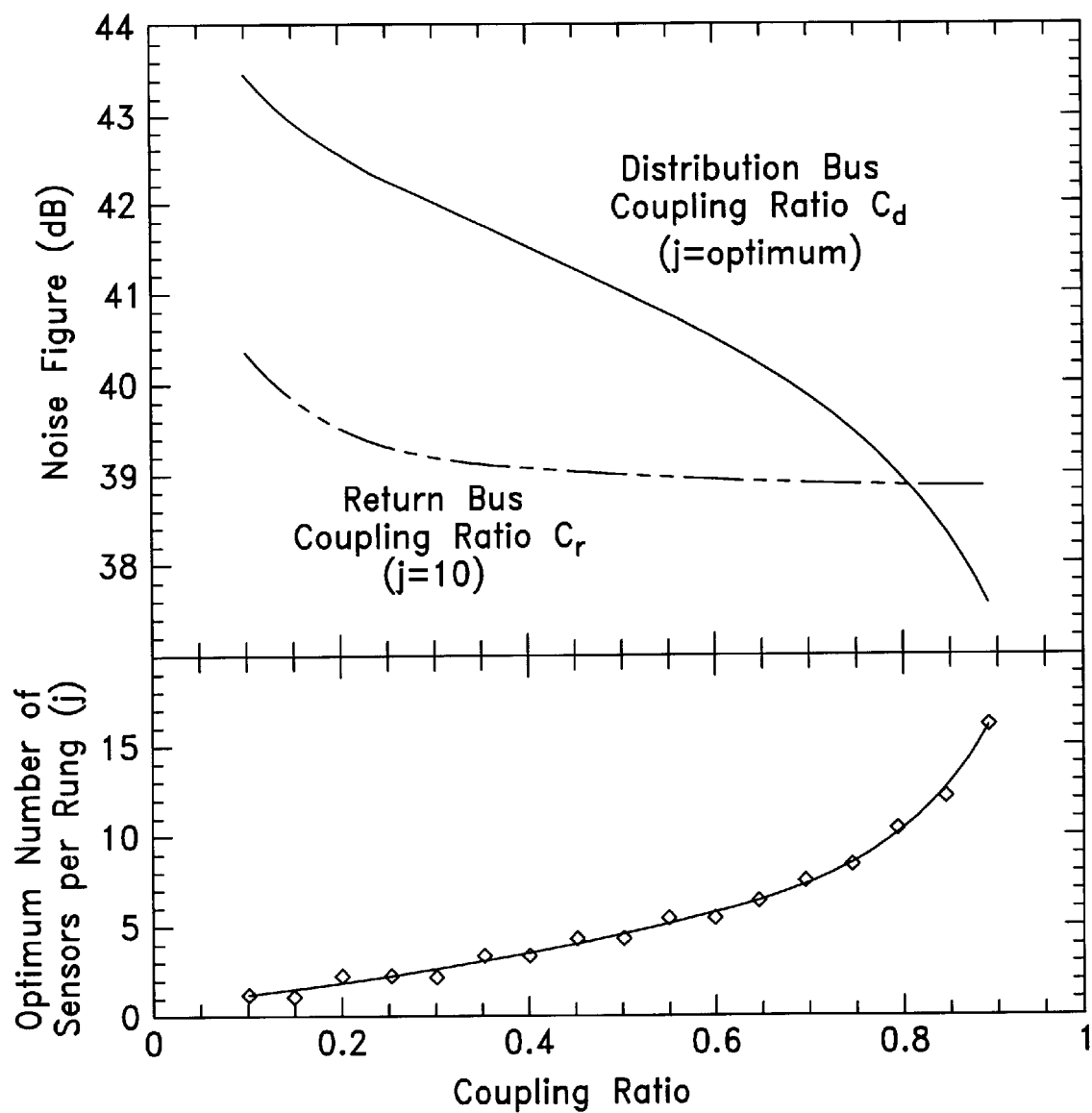
FIG. 14 illustrates, in upper curves, the noise figure (NF) versus distribution bus coupling ratio $C_d$ and return bus coupling ratio $C_r$ for a 200-sensor array, with NF versus $C_r$ represented by the dashed curve for $C_d$=80% and j=10, and with NF versus $C_d$ represented by a solid curve for $C_r$=50%, and illustrates in a bottom solid curve an optimum number of sensors per rung which minimizes NF for a particular $C_d$.

The second set of parameters to consider in optimizing the noise figure is the coupling ratio of the bus couplers ($C_d$ and $C_r$) and the corresponding gain of the amplifiers ($G_d$ and $G_r$). To determine the optimum coupling ratios for minimum noise figure and pump requirement, consider the dependence of the system noise figure on the distribution bus coupling ratio ($C_d$) and return bus coupling ratio ($C_r$) shown in FIG. 14, for an array of 200 sensors. To compute the dependence of NF on $C_d$ (solid curve), $C_r$ was set to 50% and the number of sensors per rung j was selected for each $C_d$ so as to minimize the noise figure. This optimum number of sensors per rung is shown in the lower part of FIG. 14 (the solid line is a smooth fit through the integer ordinates). To compute the dependence of NF on $C_r$ (dashed curve), $C_d$ was set to 80% and j to 10, which is the optimum number of sensors per rung for this value of $C_d$ from the lower part of FIG. 14. The noise figure improves significantly with increasing $C_d$, thus distribution bus amplifiers with $G_d$ as large as possible are desired. For $C_d$ less than approximately 30%, insufficient signal power is coupled into a rung to support more than one or two sensors per rung (bottom solid curve). With only a few sensors per rung, there are a large number of amplifiers in the array and the NF is high. By increasing $C_d$, more signal power is coupled into each rung and thus more sensors can be supported on each rung (bottom curve increasing) and the NF improves (upper curve decreasing). The total pump power requirement may be reduced by selecting $C_d$≈80% and an amplifier gain $G_d$≈7.4 dB. Amplifiers with significantly larger gains would not be compatible with the remote pumping scheme discussed here, since a single remote pump source cannot provide sufficient power for tens of larger gain amplifiers. On the other hand, the noise figure is fairly constant versus $C_r$ for $C_r$>40% (dashed curve). This broad constant region allows pump power budget considerations to be included in selecting the optimum $C_r$ value. As $C_r$ increases, $G_r$ increases correspondingly, thus increasing the pump power requirement. Therefore $C_r$ is preferably as small as possible without affecting the NF too strongly, which is the reason for selecting $C_r$=50% up to this point. If instead $C_r$ is taken to be 25% to further decrease the pump power requirement, the NF worsens by only 0.4 dB. With the selection of $C_d$=80% and $C_r$=50%, the optimum configuration of N=200 sensors for minimizing the NF is n=20 rungs of j=10 sensors each.

Figure 15:
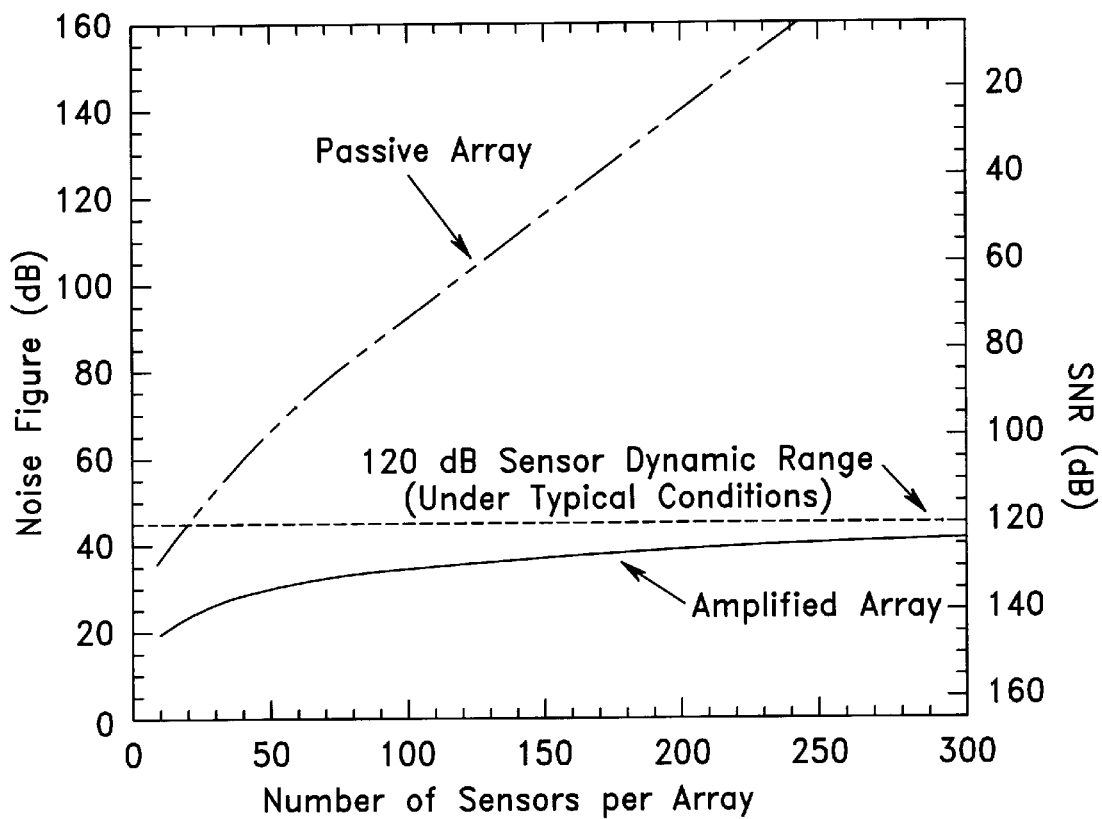
FIG. 15 illustrates the noise figure versus total number of sensors for an optimized amplified array (solid curve) and for an optimized passive array (dashed curve).

All of these effects are taken into consideration in FIG. 15, where noise figure versus total number of sensors is shown for the amplified array (solid curve). For a given total number of sensors N, the optimum number of sensors per rung and rungs per array (j, n) were chosen to yield the minimum NF, as in FIG. 13, and fixed coupling ratios of $C_d$=80% and $G_r$=50% were used. The noise figure for a typical passive ladder-type array (dashed curve) is shown for comparison. In order to maintain an SNR of 120 dB in a 1 Hz bandwidth with a moderate input signal power (5 mW), the system noise figure must be below the dotted horizontal line in FIG. 15 (NF<45 dB). With this optimized configuration, it is possible to support more than 300 sensors on a single pair of fibers, while a passive array can support only about 20 sensors.

While the curve in FIG. 15 has not crossed the 120 dB SNR line, it becomes increasingly difficult to support more sensors beyond a total of about 300, for two reasons. The first reason is that the duty cycle with which the sensors are sampled becomes too small. For a total of 300 sensors, the duty cycle is approximately 1/300 and this impacts the input signal. An average input signal power of 5 mW with this duty cycle requires a peak signal input power of 1.5 W. The signal power is limited approximately to this level by fiber nonlinear effects such as spontaneous Raman scattering and spontaneous Brillouin scattering. The second reason is that a margin should be allowed for the small differences in SNR along the array. Because of the approximations made, in particular the assumption that all amplifiers have equal gain even though the pump power is consumed along the array, a few dB difference in the SNR of the sensors may be expected. The mean SNR for all sensors is shown in FIG. 15. The mean SNR is preferably slightly higher than 120 dB so that the "worst" sensors are still better than 120 dB.

When constructing a practical array, the couplers will have an inherent distribution of coupling ratios around their nominal value. At a particular rung the coupling ratio $C_d$ and $C_r$ can be expected to differ, by a small amount, from their respective nominal value $C_d^0$ and $C_r^0$. This mismatch will have two effects, first on the transmission of the signal on each bus, and second on the transmission of the signal from the distribution bus through a rung to the return bus.

The first effect can be avoided simply by adjusting the gain of the corresponding amplifier so that the unity-gain conditions (Equations 12a and 12b) are still satisfied. On the distribution bus, if an individual coupler differs by a factor $(1+\delta_d)$ from its nominal coupling ratio, i.e., is equal to $C_d^0(1+\delta_d)$, the gain of the adjacent amplifier must be adjusted by a factor $(1+\epsilon_d)$ from the nominal gain $G_d^0$ to maintain unity transmission along the bus. Likewise, on the return bus, if a coupler differs by a factor $(1+\delta_r)$ from its nominal value, i.e., $C_r^0(1+\delta_r)$, the gain of the adjacent amplifier must be adjusted by a factor $(1+\epsilon_r)$ from its nominal gain $G_r^0$. Thus the distribution and return bus transmissions (Equations 12a and 12b) become $$T'_d = [G_d^0(1+\epsilon_d)]L_x[1-C_d^0(1+\delta_d)] = 1 \tag{15a}$$

$$T'_r = [G_r^0(1+\epsilon_r)]L_x[1-C_r^0(1+\delta_r)] = 1 \tag{15a}$$

Solving Equations 15a and 15b for in terms of $\delta$ yields $$\varepsilon_d = \frac{G_d^0 L_x C_d^0 \delta_d}{1 - G_d^0 L_x C_d^0 \delta_d} \approx \delta_d \frac{C_d^0}{1 - C_d^0} \tag{16}$$

and a similar expression for $\epsilon_r$. Note that $\delta$ and $\epsilon$ have the same sign. If a coupler couples a small additional signal into a rung, the corresponding amplifier needs to have a slightly higher gain to compensate for it.

The second effect is that the transmission from the distribution bus, through a rung, to the return bus (Equation 13) becomes $$T_{d-r}' = G_d^0(1+\epsilon_d)L_xC_d^0(1+\delta_d)L_{rung}G_r^0(1+\epsilon_r)L_xC_r^0(1+\delta_r) \tag{17}$$

Note that since $\delta$ and $\epsilon$ have the same sign, $T_{d-r}'$ is affected twice as much. This is because if a coupler's coupling ratio is slightly high, its corresponding amplifier will have a slightly higher gain and these two effects add up. However, by selecting pairs of couplers $C_d$ and $C_r$ which differ from their nominal values with opposite sign, the actual transmission (Equation 17) can be made equal to the nominal transmission (Equation 13). The condition that needs to be met to satisfy this equality is:

$$[G_d^0(1+\epsilon_d)L_xC_d^0(1+\delta_d)]\cdot L_{rung}\cdot[G_r^0(1+\epsilon_r)L_xC_r^0(1+\delta_r)] = G_d^0L_xC_d^0\cdot L_{rung}\cdot G_r^0L_xC_r^0 \tag{18}$$

for which an approximate solution for $\delta_r$ in terms of $\delta_d$ is:

$$\delta_r \approx -\delta_d \frac{1 - C_r^0}{1 - C_d^0} \tag{19}$$

Note that $\delta_d$ and $\delta_r$ are opposite in sign. When Equation 19 is satisfied, the difference in transmission from distribution bus to rung offsets the difference in transmission from rung to return bus. When every pair of couplers satisfies Equation 19, all sensors return the same amount of signal power and have the same SNR.

If, however, the amplifiers were all made too long, thus providing a small net gain along each bus, the signal power would grow slightly and thus slightly compress the gain of the amplifiers. On the other hand, if the amplifiers were all made too short, thus yielding a small net loss along each bus, the signal level would correspondingly drop along the bus. With the lower signal levels, the amplifiers would tend to provide slightly more gain and the signal level would not drop as quickly. The system is thus self regulating and the signal power will not grow unbounded.

The following describes how to minimize the pump power required for large-scale fiber sensor arrays employing erbium-doped fiber amplifier telemetry with respect to the number of amplifiers per bus, number of sensors per rung, and the gain per amplifier. For a large array, the pump power requirement is dominated by passive component losses along the array. Several methods (including alternative array topologies) are described herein for reducing the power requirement while minimizing the impact of this reduction on the signal-to-noise ratio. A pair of fiber buses can support 300 high sensitivity (1 μrad/√Hz) sensors with less than 1 W of 1480 nm pump power per bus, a requirement that is reasonable and attainable with laser diodes.

The widespread application of fiber hydrophones created a need for an efficient multiplexing scheme. To enable large-scale multiplexing, it has been shown above that the addition of optical amplifiers to ladder structures of fiber sensors can dramatically improve sensor array performance and increase array size to hundreds of sensors per fiber pair. It has also been demonstrated that this approach is a practical solution for multiplexing large numbers of sensors. As set forth above, an array can be optimized to provide excellent signal-to-noise ratio (SNR) while increasing the number of sensors per fiber pair. The remaining discussion is concerned with the pump power requirement of an amplified array. The first objective is to theoretically evaluate the power requirement of a practical array containing hundreds of sensors, with the demonstration that the pump power consumption of the array is dominated by the passive losses of the couplers and fibers, and that for a large array this requirement is reasonable and attainable with available laser diodes. The second objective is to reduce the power requirement, which calls for a compromise between pump power and the signal-to-noise ratio (SNR) of the signals returning from the sensors. Several methods, including alternative array topologies are discussed, to reduce the power requirement while minimizing the impact of this reduction on the SNR. With this approach and current fiber component technology, a pair of fiber buses can support 300 high sensitivity (1 μrad/√Hz) sensors with less than 1 W of 1480 nm pump power per bus.

Figure 16:
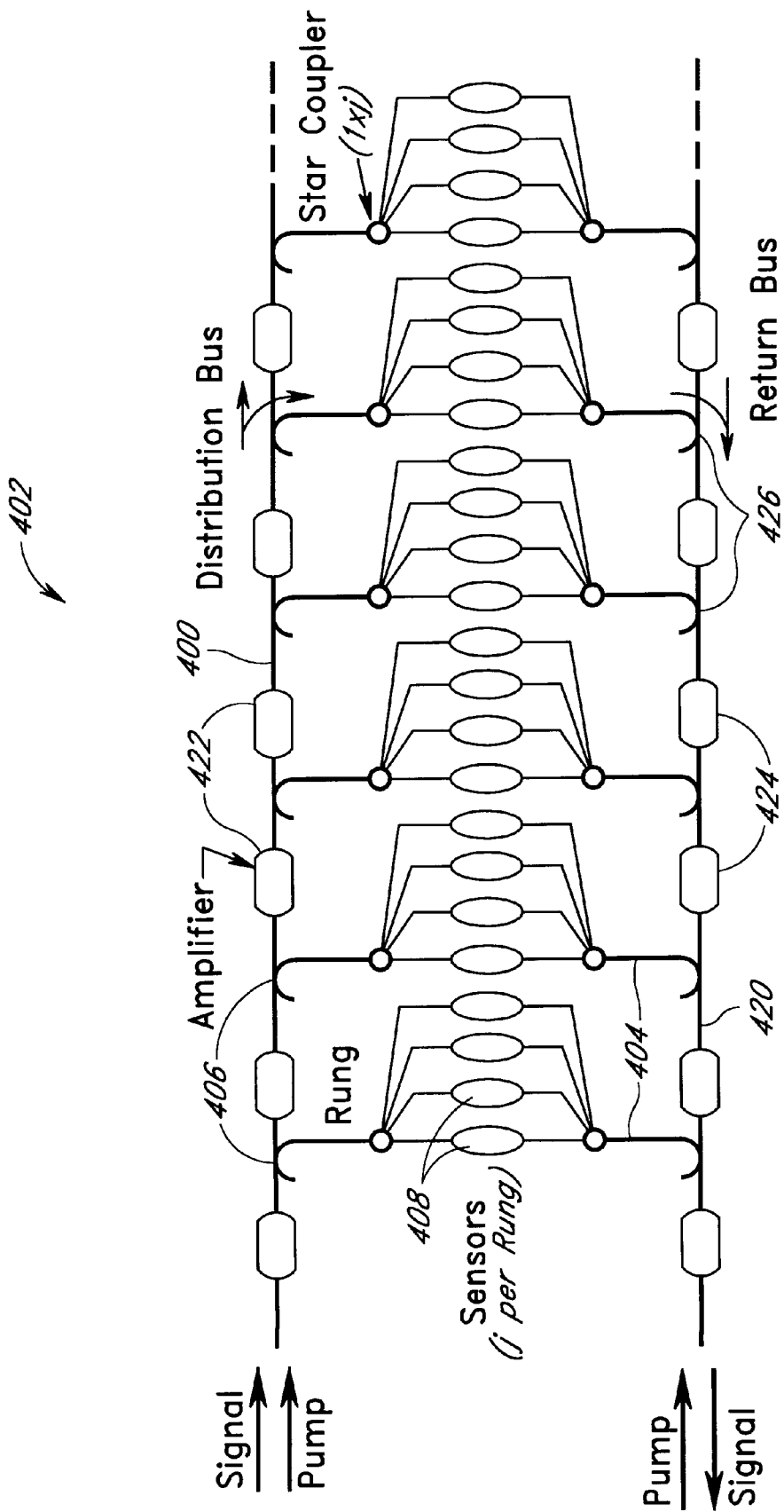
FIG. 16 illustrates a conceptual amplified sensor array with time division multiplexing and multiple sensors multiplexed on each rung.

A complete description of the operation of these time domain multiplexed (TDM) arrays, as shown in FIG. 16, was shown above. In addition, see, for example, J. L. Brooks, B. Moslehi, B. Y. Kim, and H. J. Shaw, "Time Domain Addressing of Remote Fiber Optic Interferometric Sensor Arrays," *Journal of Lightwave Technology*, Volume LT-5, July 1987, pp. 1014–1023. To sample all of the sensors, a signal pulse (i.e., an optical input signal) is launched into a distribution bus 400 of array 402, and a large fraction (typically >50%) of the signal pulse is periodically coupled into each rung 404 of the ladder using a fiber coupler 406. Each rung 404 supports one or several sensors 408. Each sensor 408 returns a signal (i.e., an optical return signal) pulse in its own time window, and all pulses are collected on a return bus 420 and transmitted to a receiver (not shown) as output signals. Optical amplifiers 422 and 424 distributed along the distribution and return buses 400 and 420 compensate for the splitting loss of couplers 406 and compensate for any additional dissipative losses. Thus, the amplifiers 422 and 424 provide unity transmission along each bus, deliver equal amounts of signal power to all sensors 408, and the array 402 returns equal amounts of signal power from all sensors to the receiver. The array 402 preferably operates with a signal wavelength in the 1550 nm region and uses erbium-doped fiber amplifiers (EDFAs). Because losses per amplifier stage are small (3–8 dB), low gain amplification is sufficient, and the amplifiers 422 and 424 are simply short segments of erbium-doped fiber (EDF) spliced into the buses 400 and 420. The gain of each of the amplifiers 422, 424 is set by the length of the EDF. All of the amplifiers on each bus are pumped by pump signals from a single remote source such as a laser. The couplers 406 and 426 are preferably wavelength division multiplexing (WDM) fused fiber couplers designed so that the pump is not coupled and remains solely on the buses 400 and 420, whereas the signal along the distribution bus 400 is partially coupled into a rung 404 and the remainder is transmitted to subsequent rungs. All of the amplifiers 422 and 424 are in a high state of pump saturation, so that (1) their noise figure is low, and (2) the pump power that is not consumed by one amplifier is transmitted to the subsequent amplifiers. The pump power budget is set by the requirement that the last amplifier in a chain must receive sufficient pump power. Remote pumping of a single, large-gain, EDFA has been demonstrated and implemented in a deployed communication system. (See, for example, E. Brandon, A. Gladston, A., and J.-P. Blondel, "Cayman-Jamaica Fiber System: The Longest 2.5 Gbit/s Repeaterless Submarine Link Installed," *OFC'97*, Volume 6, 1997 OSA Technical Digest Series, paper TuL1.) As discussed below, it is equally practical to remotely pump an array composed of tens of low-gain amplifiers with a moderate pump power.

One important operational requirement of an array is that it be modular, which impacts the design and the pump power requirement. For practical reasons, such as handling and maintaining an array on a ship, the array is preferably sectioned into lightweight segments and connectorized, making it possible to replace a defective segment rather than the entire array in case of a segment malfunction. Thus, all segments, including the amplifiers they contain, are preferably identical so that a standard segment can be substituted at any place along the array. However, amplifiers having identical lengths do not provide exactly identical gains since downstream amplifiers receive less pump power. Therefore, different amounts of signal power tend to be returned from different sensors, and the sensors have slightly non-uniform sensitivities. Several methods for equalizing the sensitivity of all sensors are described below.

Figure 17:
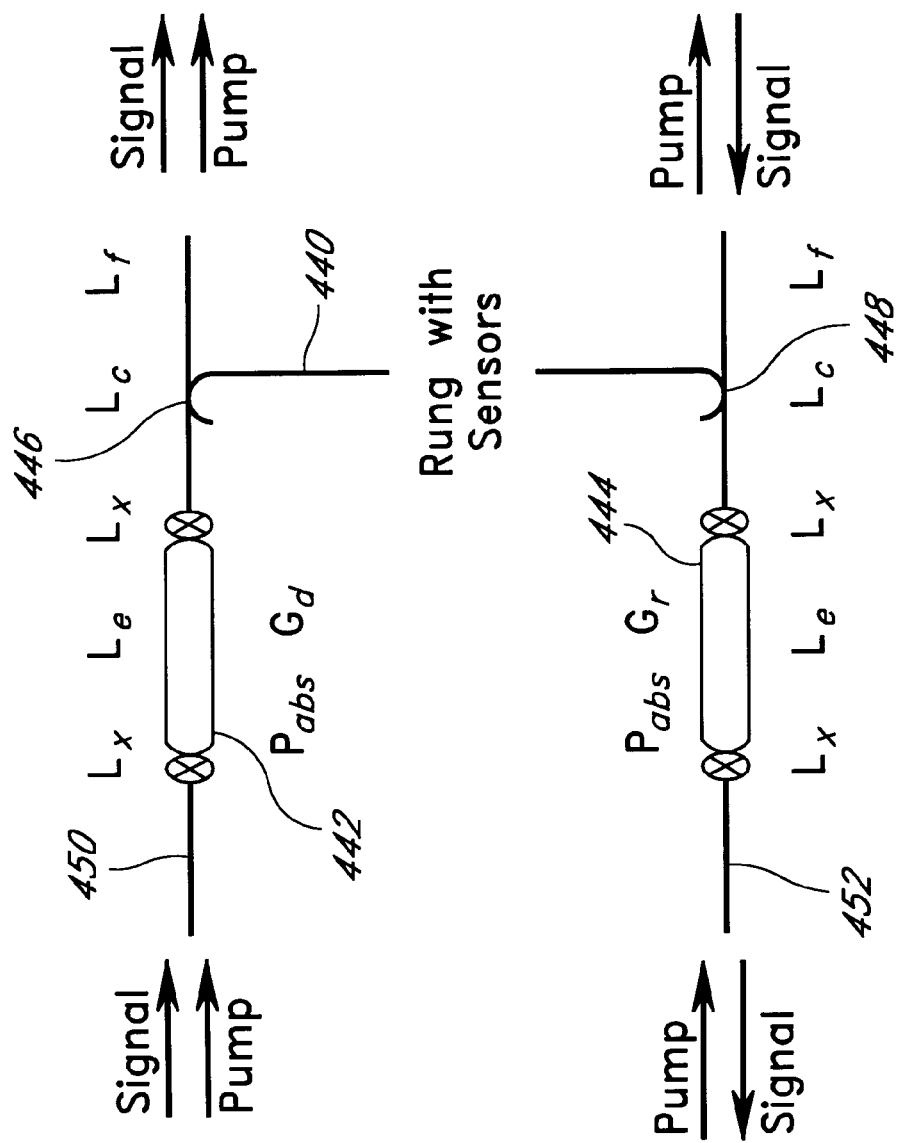
FIG. 17 illustrates a detail of single rung with amplifiers from FIG. 16, showing significant loss mechanisms for the pump power.

To calculate the pump power budget for an entire amplified array, such as the array shown in FIG. 16, the power consumption of a single amplifier stage must first be considered. FIG. 17 shows one stage of a typical amplified array, comprising one rung 440, a distribution amplifier 442 and a fiber coupler 446 on the distribution bus 450, and a return amplifier 444 and a fiber coupler 448 on the return bus 452. $L_x$ denotes the insertion loss of the splice between one erbium-doped fiber (EDF) and the single mode fiber (SMF). $L_e$ denotes the background loss of the EDF. $L_f$ denotes the transmission loss of the SMF. $L_c$ denotes the insertion loss of the coupler 446. All parameters are evaluated at the pump wavelength. The length of the EDFs on the distribution bus 450 is set to provide a gain $G_d$ that exactly compensates for the subsequent signal losses before the next amplifier, namely $G_d = 1/[L_x'^2 L_c'(1-C_d)L_f']$, in which $C_d$ is the distribution bus coupling ratio and the primed parameters are evaluated at the signal wavelength. A similar relationship holds for the return bus amplifier 444 of gain $G_r$, except that the coupler 448 has a different coupling ratio $C_r$.

Figure 18:
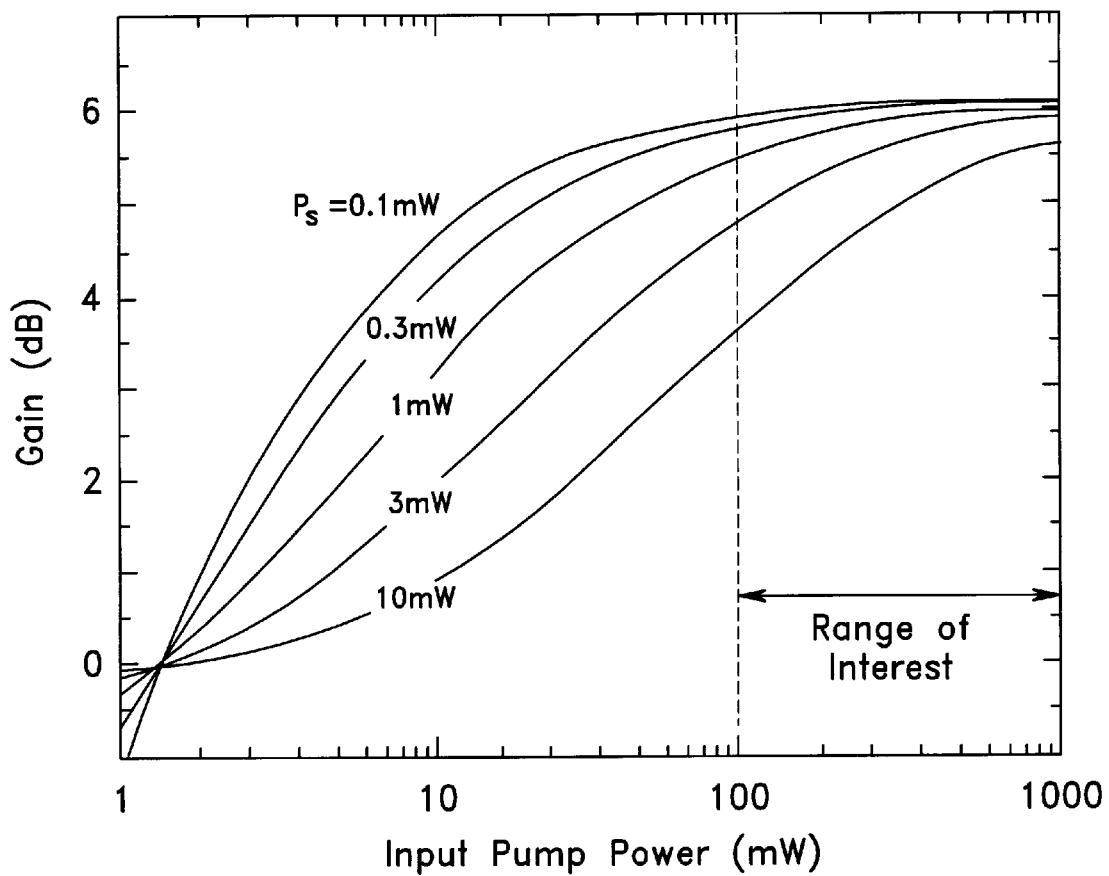
FIG. 18 illustrates the gain of a single short-length erbium-doped fiber amplifier (EDFA) versus pump power for various input signal powers within a range of interest for input pump powers bounded at a high end by fiber nonlinear effects and bounded at a low end by minimizing the difference in gain across the array.

The dependence of amplifier gain on pump power is shown in FIG. 18 for various input signal powers. These curves were obtained from a computer simulation of a single amplifier, made with an EDF that is typical of communication EDFAs. The simulated fiber has a core radius of 1.4 μm, a numerical aperture (NA) of 0.28, an $Er_2O_3$ concentration of 50 mole ppm, and a length of 3.5 m. A signal wavelength of 1536 nm and pump wavelength of 1480 nm were used. The input signal powers shown in FIG. 18 bracket the range of interest for these systems. The amplifier has a threshold input pump power of $P_p^{th}$=1.5 mW (G=0 dB), and it provides 6.1 dB of small signal gain for a large input pump power. The upper limit for the pump power (1 W) is set by practical considerations including the cost of pump lasers and nonlinear effects encountered when transmitting greater powers over several km of fiber downlead and buses. The downlead fibers are typically 1 to 10 km long, and typically have a transmission loss of 0.3 dB/km at 1480 nm and 1.5 dB/km at 980 nm. Therefore it is critical to use a 1480 nm pump source for remote pumping so that a significant amount of the pump power actually reaches the amplifiers.

With a high power pump at 1480 nm and a signal near 1550 nm propagating in the same downlead fiber, the signal will experience Raman amplification. In the downlead to the distribution bus, the pump and signal are co-propagating and this amplification would be very noisy. Thus, separate downlead fibers are preferably used. On the other hand, in the downlead fiber to the return bus, the pump and signal are counter-propagating and the Raman amplification is low-noise. Thus, one fiber can be used in the downlead for the return bus.

When designing an array, the average signal power on each bus must be determined, as well as the pump power budget for each bus, and the acceptable change in gain across all of the amplifiers as the pump power is consumed along the array. As set forth below, a pump loss of approximately 0.5 dB per rung is a reasonable estimate. As set forth above, an array of approximately 20 rungs is optimal. Thus, as a first estimate, a total pump loss budget of 10 dB is reasonable, i.e., the pump power decreases along the array from 1 W to 100 mW. For low signal powers (<1 mW), the gain of the amplifier decreases by less than 0.5 dB over this pump power range (see FIG. 18). As the average signal power is increased, this difference in gain increases, reaching 2 dB for a 10 mW signal. As the input pump power is increased, with a constant pump power budget, the difference in gain decreases. With a plot such as that given in FIG.

18, it is possible to determine the minimum input pump power required to keep the change in gain across all amplifiers below the desired limit.

A more accurate definition of the pump power budget for a single amplifier stage is now set forth. The loss mechanisms which act at the pump wavelength, discussed in relation to FIG. 17, include absorption of pump power ($P_{abs}$) by the amplifier's erbium ions, the insertion loss of the coupler, the insertion loss of the two splices, and the transmission losses of the EDF and bus fiber. In the strongly saturated regime, the amount of pump power exiting a given amplifier stage Pout is related to the pump power Pin launched into this stage by:

$$P_{out}=[(P_{in} \cdot L_x \cdot L_e)-P_{abs}] \cdot L_x \cdot L_c \cdot L_f \qquad (20)$$

This output pump power is used as the input pump power for the subsequent amplifier.

Figure 19:
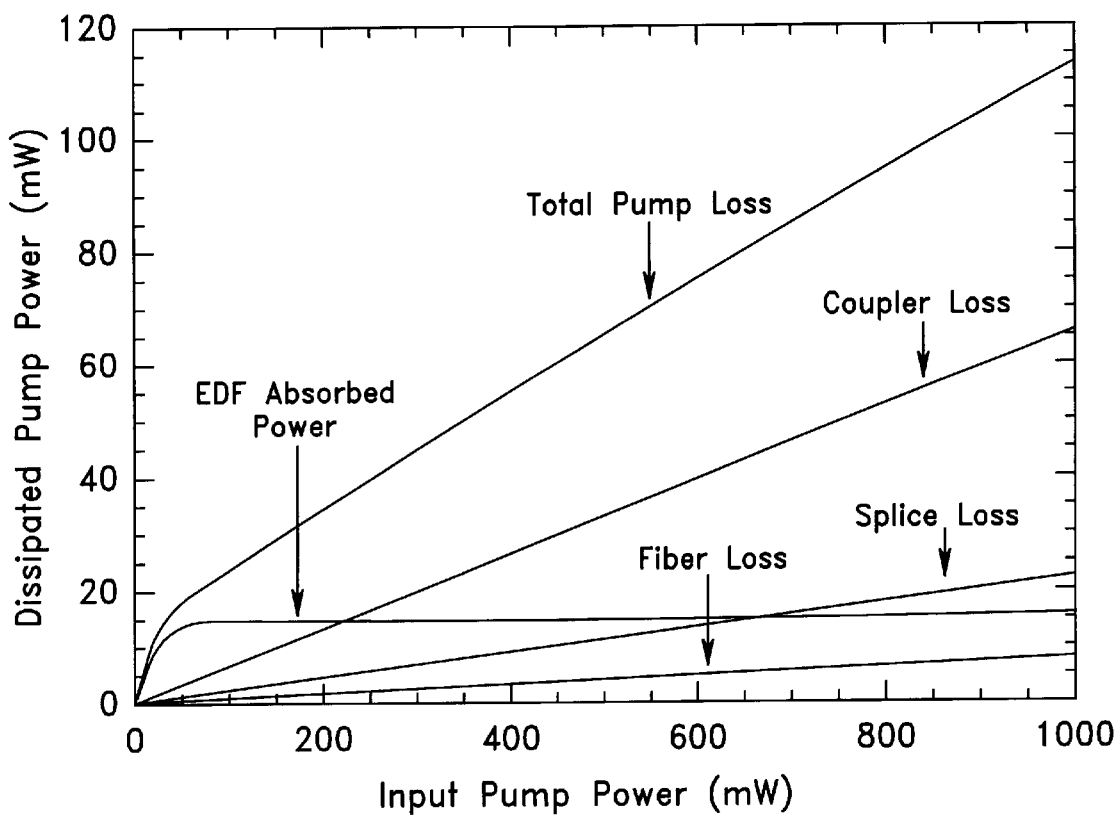
FIG. 19 illustrates pump power dissipated in a single amplifier stage versus incident pump power wherein coupler excess loss, splice insertion loss, and fiber transmission loss are all proportional to incident pump power, and the coupler loss typically dominates.

The pump power dissipated ($P_{in}-P_{out}$) by a single stage is shown in FIG. 19. These curves were obtained from computer simulations of the same amplifier as discussed above. Each of the pump power loss mechanisms can be considered individually, starting with the power absorbed by the amplifier for conversion to signal power. For an input signal with average power $P_s$, the EDFA adds an average power to the signal of $(G-1) \cdot P_s$, and consumes an amount of pump power equal to $(\lambda_s/\lambda_p)(G-1) \cdot P_s$, in which $\lambda_s$ is the signal wavelength and $\lambda_p$ is the pump wavelength. This conversion is independent of input pump power provided that the input pump power $P_p$ is much greater than both $P_p^{th}$ and $P_s$, so that the absorbed pump power is constant for $P_p$ greater than approximately 100 mW (see FIG. 18). Each amplifier also produces amplified spontaneous emission (ASE) and amplifies ASE originating in other amplifiers. Isolators, which would eliminate the ASE propagating in the direction opposite of the signal, are preferably not used because the generated ASE power levels are tolerable even with dozens of amplifiers and also because of the additional cost. Therefore, ASE propagates in both directions throughout the entire array. An individual amplifier adds 2–3 $\mu$W of new ASE power to the incident ASE in both directions and amplifies the total ASE. Along each bus, the ASE power accumulates linearly with the number of amplifiers, while the pump power converted to ASE power increases as the square of the number of amplifiers. In the pump power budget, typically less than a few mW of pump power are converted to ASE power in the entire array and is thus negligible.

With current technology ($L_c$=0.3 dB for a 1480/1550 nm WDM fused fiber coupler), the largest dissipative loss for the pump power is the WDM coupler insertion loss, as shown in FIG. 19. The small coupler loss dominates the large EDF absorption because $P_{abs}$ is independent of $P_p$ when $P_p$ is very large, while the dissipated power due to $L_c$ is proportional to $P_p$. The coupler loss tends to be inversely related to the separation of the two multiplexed wavelengths, so with the relatively small difference between the pump and signal wavelengths it would be challenging to significantly reduce $L_c$. Yet this is the most critical term to minimize. One way to do so is to reduce the number of couplers on each bus, i.e., to maximize the number of sensors per rung (j). But as j increases, the splitting loss suffered by the signal on each rung increases by a factor of $j^2$ (two star couplers per rung, see FIG. 16). A compromise must thus be found between the coupler insertion loss for the pump on the bus and the splitting losses for the signal on a rung.

The second largest dissipative pump loss arises from the two splices between the EDF and the bus fiber. Such splices tend to have a larger insertion loss than SMF-to-SMF splices because of the mode field diameter mismatch between EDF and SMF. The bus fiber is a standard SMF with low NA (typically 0.12) and a large mode area. This is critical for low transmission loss (a good SMF achieves a transmission loss of less than 0.2 dB/km at 1550 nm) and to minimize nonlinear effects. On the other hand, for the EDF a higher NA (typically greater than 0.20) is preferable to lower the amplifier pump power requirement. Presently, good commercial fusion splicers can produce EDF-to-SMF splices with a typical insertion loss of $L_x$=0.05 dB per splice at 1550 nm, compared to 0.02 dB for SMF-to-SMF splices. (See, for example, W. Zheng, O. Hultén, R. and Rylander, "Erbium-Doped Fiber Splicing and Splice Loss Estimation," *Journal of Lightwave Technology*, Volume 12, March 1994, 430–435.) The pump power dissipated by the two EDF-to-SMF splices (0.05 dB each) is shown in FIG. 19.

The third pump power loss mechanism is fiber transmission loss. The latter tends to increase exponentially with the fiber NA. (See, for example, L. B. Jeunhomme, *Single-Mode Fiber Optics*, 2nd ed., Marcel Dekker, New York, 1990, p. 101.) Thus, the background loss per km tends to be larger for an EDF than for a standard SMF. An EDF with a high NA (greater than 0.30) typically has a background loss greater than 3.5 dB/km at 1550 nm, compared to under 0.5 dB/km for an EDF with a low NA (less than 0.17). The bus fiber between amplifiers also contributes to the transmission loss. A sensor array typically has 2 to 4 m of fiber between sensors and 8 to 16 sensors per rung, or $L_f \approx 0.01$ dB. The lower curve in FIG. 19 was plotted for a background loss of $L_e$=0.01 dB (3 dB/km loss and 3.5 m of EDF) and $L_f$=0.01 dB. No downlead fiber is assumed here. However, when a downlead is used, which is typically 1–10 km long, the transmission loss of the downlead must be included.

Figure 20:
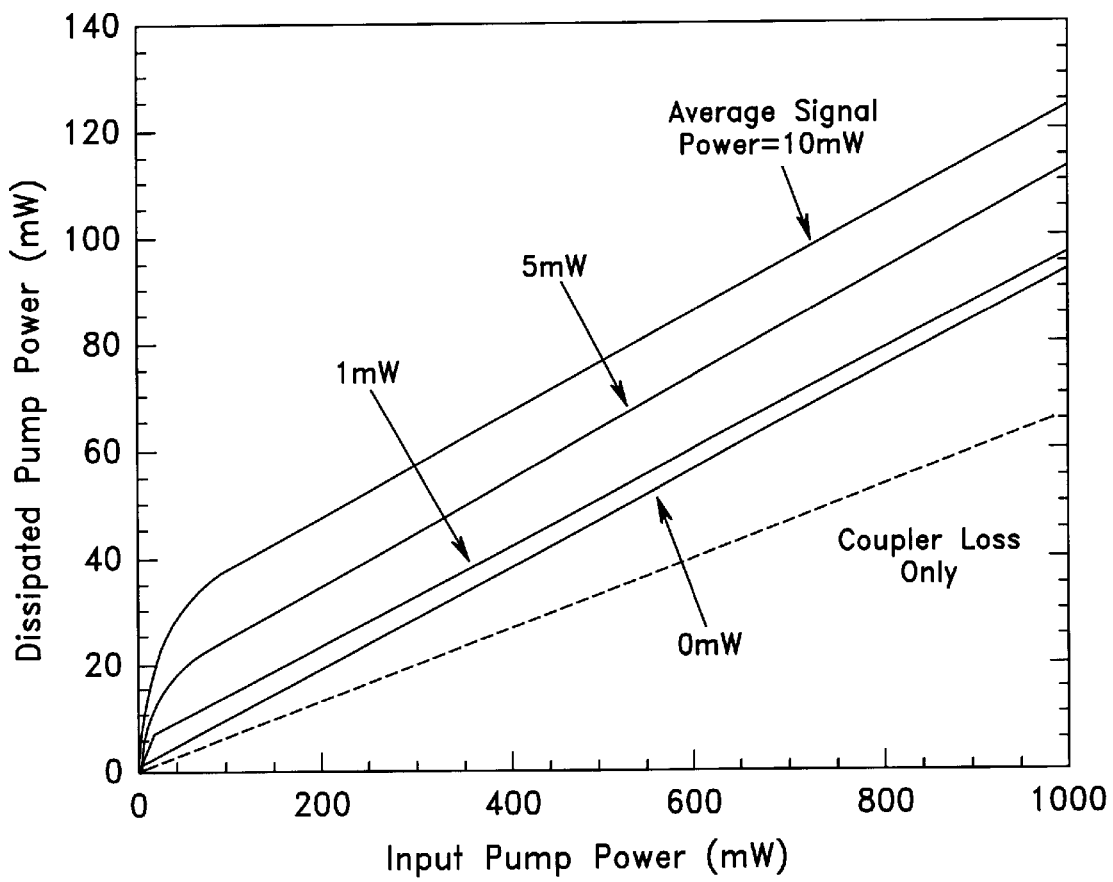
FIG. 20 illustrates total pump power loss for 0 mW, 1 mW, 5 mW, and 10 mW average input signal powers with the coupler loss shown for reference.

So far, a constant average signal power of 5 mW has been assumed. FIG. 20 shows the effect of the signal power on the total dissipated pump power. Curves are provided for each of four input signal powers. Each curve shows the total pump power dissipated versus the input pump power for a single amplifier stage. For comparison, the dashed curve shows the pump power dissipated by the coupler alone. Above 100 mW of input pump power, the solid curves are parallel, showing that the EDFA power conversion is independent of pump power above a certain level, and is proportional to the input signal power, as discussed earlier. For high average signal power (10 mW) and low input pump power (<300 mW), a comparison between the 10 mW curve and the 0 mW curve shows that the absorption of pump power by the amplifiers is larger than the sum of all other loss terms. To further reduce the pump power budget, the average signal power can be reduced, but this directly reduces the SNR.

The last loss mechanism to be considered arises from the connectors. As set forth above, the array is preferably segmented and connectorized, and the connectors are preferably robust in the harsh environment of typical applications (e.g., in the ocean). The pump power budget should be insensitive to significant and variable losses in the connectors. A good connector may have an insertion loss as low as 0.2 dB, and an array may be comprised of up to 50 segments. This adds a loss to the pump budget of up to 10 dB per array and increases the signal loss budget by up to 20 dB (round-trip).

In view of a pump power budget for a single amplifier, a budget for a large array of amplifiers can be constructed, all of which are pumped from a single source at the front end. From Equation 20, the pump power $P_k$ incident on the k-th amplifier is related to the pump power $P_k-1$ transmitted by the previous ((k−1)th) amplifier by:

$$P_k[(P_{k-1} \cdot L_x \cdot L_e) - P_{abs}] \cdot L_x \cdot L_c \cdot L_f \quad (21)$$

where $P_{abs}$ is a function of the signal power incident on the k-th amplifier. The input pump power $P_I$ must be large enough that the pump power $P_n$ that reaches the last amplifier is greater than some minimum value. The latter is set to ensure that the last amplifier provides enough gain, i.e., it is much larger than both $P_p^{th}$ and $P_s$. As $P_n$ is increased, all of the amplifiers receive more pump power and the gain across all of the amplifiers is more uniform (see FIG. 18), and thus the returned signal powers are more uniform across the array. Therefore, $P_n$ is set to keep the variation in gain among all of the amplifiers below some desired level. In turn, $P_n$ determines the pump power that must be supplied to the first amplifier $P_I$. In this analysis, $P_n$ is set equal to 100 mW, which is many times larger than either the amplifier threshold power or the average signal power.

Figure 21:
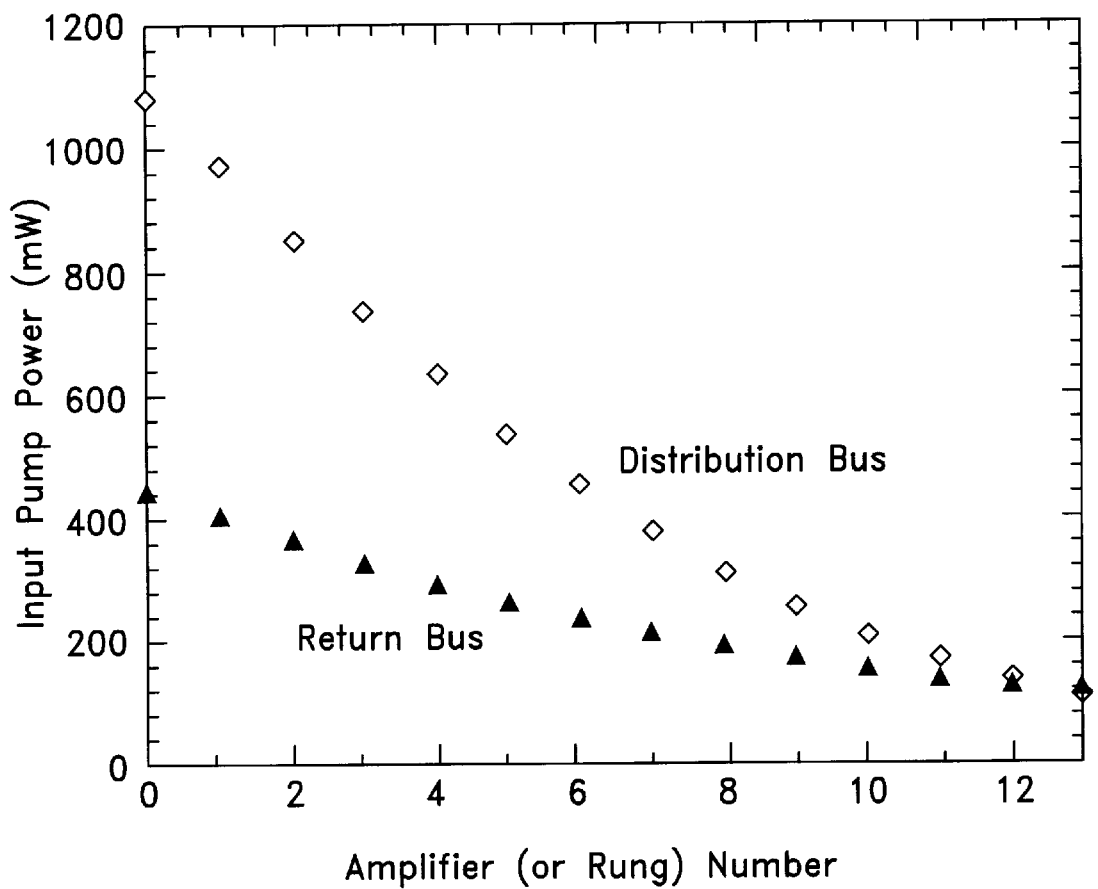
FIG. 21 illustrates pump power incident at each amplifier for an array with 13 amplifiers per bus and 15 sensors per rung (i.e., 195 total sensors), and with parameter values of $C_d$=80%, $C_r$=50%, $L_s$=5 dB, and $L_x$=0.4 dB, and with input pump power selected such that 100 mW is incident on the last amplifier.

FIG. 21 shows the evolution of the pump power incident on each amplifier along an array of 13 amplifiers using Equation 21 and the loss budget given in detail in FIG. 19. The parameters used for FIG. 21 are an input signal power of 5 mW, a signal wavelength of 1536 nm, a pump wavelength of 1480 nm, 15 sensors per rung, a 5-dB insertion loss per sensor, a distribution bus coupling ratio $C_d$ of 80%, and a return bus coupling ratio $C_r$ of 50%. The last two values were selected to minimize the noise figure, as set forth above. Both curves are dominated by coupler insertion loss. The required input pump power is 1100 mW for the distribution bus, and 450 mW for the return bus (see FIG. 21). The difference in these two requirements is the greater conversion of pump power to signal power on the distribution bus, because of the larger average signal power and larger coupling ratio on this bus. The combined input pump power required is about 1.5 W, which is a reasonable value readily available from cladding-pumped, cascaded-Raman fiber lasers. (See, for example, S. G. Grubb, T. Strasser, W. Y. Cheung, W. A. Reed, V. Mizrahi, T. Erdogan, P. J. Lemaire, A. M. Vengsarkar, D. J. DiGiovanni, D. W. Peckham, and B. H. Rockney, "High-Power 1.48 μm Cascaded Raman Laser in Germanosilicate Fibers, *Technical Digest Optical Amplifiers and Their Applications*, 1995, pp. 197–199.)

Figure 22:
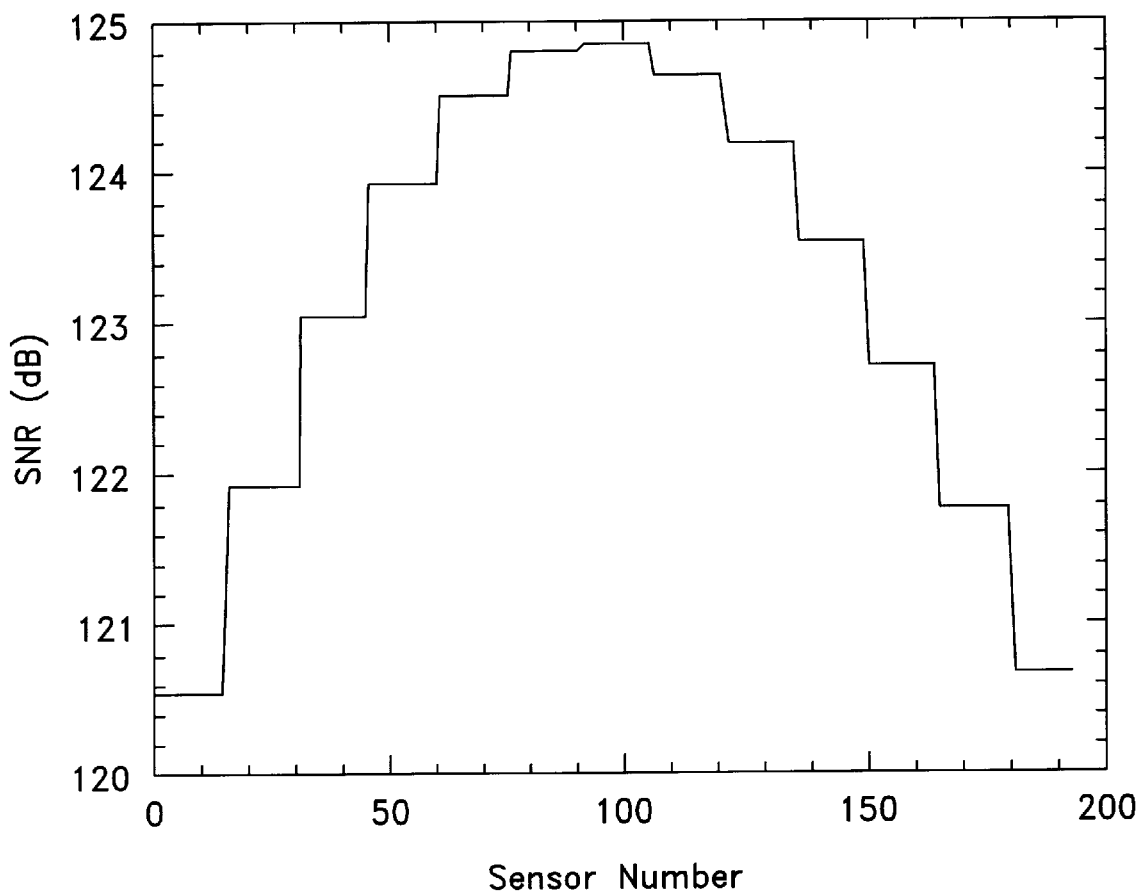
FIG. 22 illustrates the signal-to-noise ratio versus sensor number for the array of FIG. 21.

FIG. 22 shows the SNR versus sensor number for the array modeled in FIG. 21. The SNR for all sensors is greater than 120 dB. The sensors at either end of the array return the least amount of signal power, and the sensors in the middle return the greatest. Thus, the sensors at either end have the lowest SNR, and the sensors in the middle have the highest. The difference in SNR between the best and worst sensor is only 4.3 dB, which should be sufficient for most applications. However, several ways of providing greater uniformity in SNR across the array are set forth below.

If using a large pump power is not practical to minimize the variation in gain across the array, then some additional method must be employed. One such method is to add a fiber Bragg grating at the far end of each bus to reflect the pump. (See, FIG. 23b, discussed below.) This will recycle any pump power that is not consumed by the last amplifier on each bus and increase the amount of pump power incident on the last few amplifiers. While this is an effective and economical scheme, it provides only a small improvement towards equalizing the SNR of all sensors.

A second method is to use slightly longer amplifier lengths for successive EDFAs. The length of each amplifier is adjusted to give the correct gain according to the predicted incident pump power. This method does achieve the lowest variation in gain with respect to pump power across the array and the greatest uniformity in sensitivity per sensor across the array, but at the cost of losing full modularity.

Figure 23A:
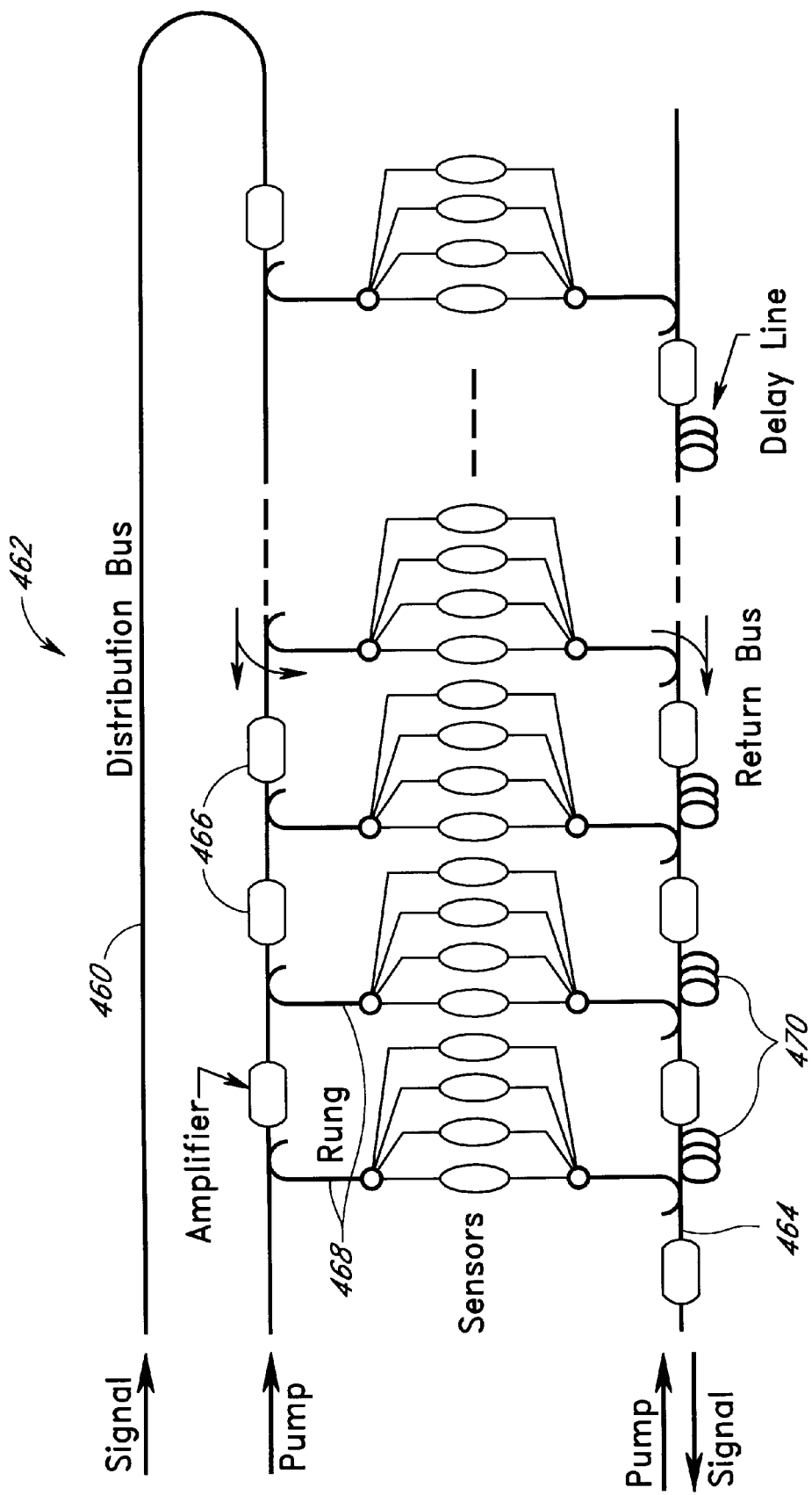
FIG. 23a illustrates a sensor array having an amplified feed forward topology which tends to equalize the signal power returned from all sensors, with the cost of an additional bus fiber and fiber delay lines on one bus.

A third method is to use the feed forward topology shown in FIG. 23a. (See, for example, K. P. Jackson, and H. J. Shaw, "Fiber-Optic Delay-Line Signal Processing," in *Optical Signal Processing*, J. L. Homer, ed., Academic Press, San Diego, Calif., 1987, pp. 431–476; and A. D. Kersey, A. Dandridge, A. R. Davis, C. K. Kirdendall, M. J. Marrone, and D. G. Gross, "64-Element Time-Division Multiplexed Interferometric Sensor Array with EDFA Telemetry," *OFC'96*, Volume 2, 1996 OSA Technical Digest Series, paper ThP5.) The primary difference with FIG. 16 is that the optical input signal is launched into the back end of a distribution bus 460 and propagates forward, toward the front of array 462, on both the distribution bus 460 and a return bus 464, in which the two buses are linked by rungs 468. If there are n amplifiers 466 per bus, then a signal traveling through rung k propagates through k amplifiers on the distribution bus 460 and (n−k+1) amplifiers on the return bus 462, i.e., a total of (n+1) amplifiers. Thus all signals travel through the same number of amplifiers. In the previous topology, referred to herein as feed backward (FIG. 16), signals from the first rung sensors travel through only 2 amplifiers while signals from the last rung sensors travel through all of the amplifiers on both buses (i.e., 2n amplifiers). For both array topologies, the ASE accumulates at the same rate, and thus Equation 13 holds for the feed forward topology as well. For both topologies, pump power for the amplifiers is supplied from the front end so that the amplifiers at the front receive the greatest amount of pump power and the amplifiers at the back receive the least amount of pump power. The pump power is consumed along each bus in the same way, and the gain of each amplifier varies with pump power in the same way. However, for the feed backward case, the variations in amplifier gains tend to accumulate, and the returned signal power from each sensor is not the same. In contrast, for the feed forward case, any small net gains or small net losses per rung tend to cancel, so that the cumulative gain or loss for any optical path in the optical sensor is greatly reduced. Thus, the power returned from all sensors tends to be more uniform across the array.

There are two disadvantages to the feed forward array. The first one is that an additional bus fiber is required to bring the signal to the far end of the array. Thus, there are three bus fibers per array, and every connector requires an additional fiber connection, which increases its size, weight, and cost. The second disadvantage is that delay lines 470 must be added to one bus, as shown in FIG. 23a. For both topologies, the maximum time available for interrogating one sensor is equal to the difference in path length for the signal traveling through one sensor compared to the adjacent sensor. In the feed backward topology (FIG. 16), the spacing of the sensors provides an inherent path difference. In the feed forward topology (FIG. 23a), there is no inherent path difference between sensors. Therefore, delay fiber must be added to one (and only one) bus to create a path length difference and provide a time window for sampling one sensor (as shown on the return bus in FIG. 23a). For example, if a time window of 14.6 ns is required, 3 m of additional fiber must be added. Both disadvantages result in the signal having a longer path length so that $L_f$ is greater and nonlinear effects are larger.

Figure 23B:
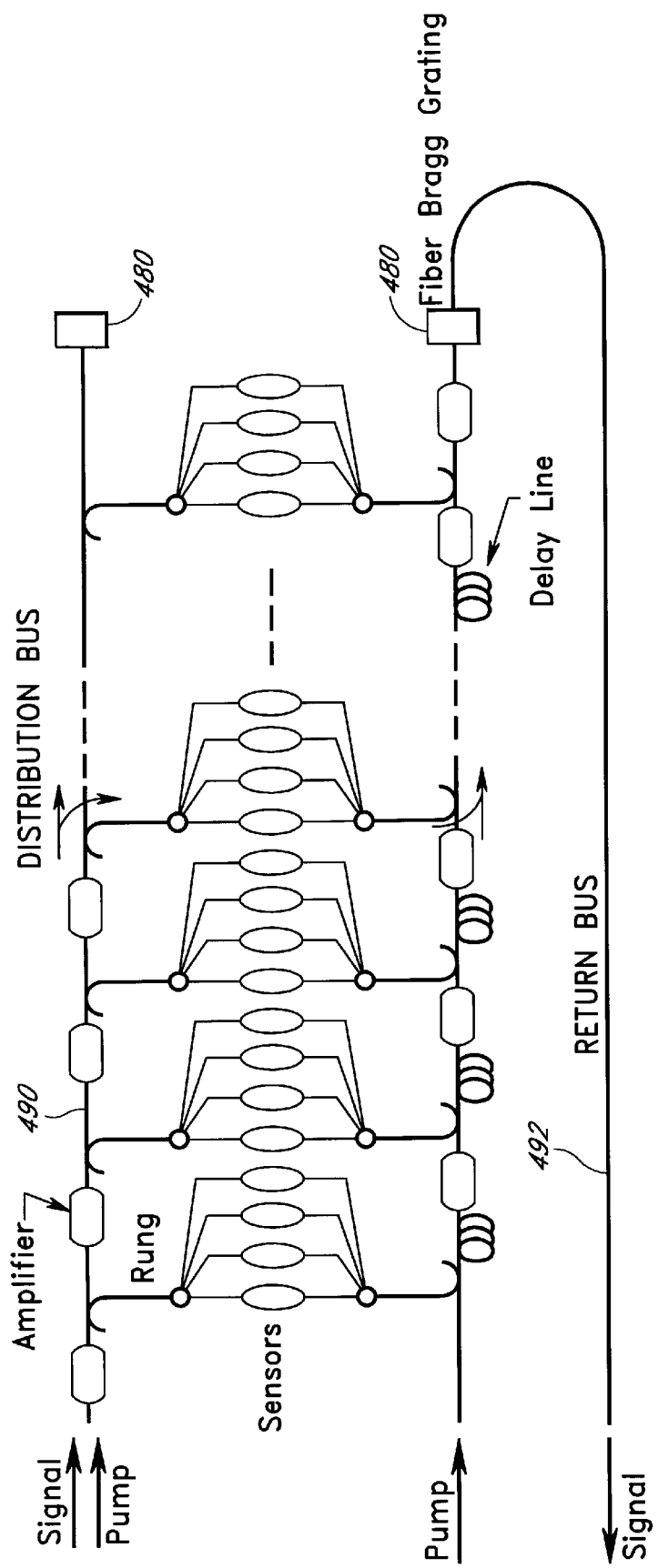
FIG. 23b illustrates a sensor array which also tends to equalize the signal power returned from all sensors, with fiber Bragg gratings added at the end of each bus to reflect unused pump power.

FIG. 23b shows a sensor array that is similar to FIG. 23a in the sense that all signals travel through the same number of amplifiers. Pump power for both the distribution bus 490 and return bus 492 as well as an input signal enter the front of the device. In addition, fiber Bragg gratings 480 are included to reflect unused power at the end of each bus 490 and 492.

Figure 24:
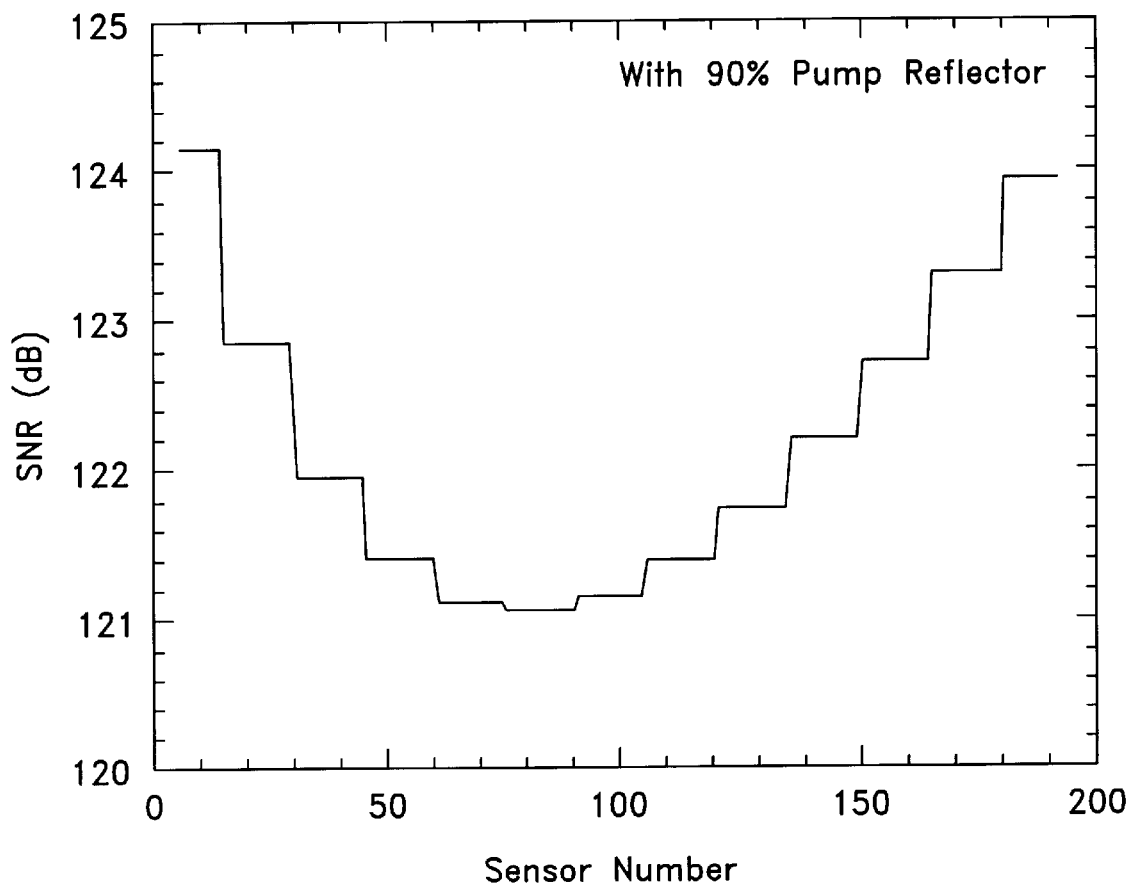
FIG. 24 illustrates the signal-to-noise ratio versus sensor number for the feed forward topology.

FIG. 24 shows the SNR versus sensor number for the array of FIG. 23a, but including 90% pump reflectors at the far end of each bus such as those shown in FIG. 23b, and using the same array parameters as in FIGS. 21 and 22, except significantly less pump power, specifically $P_p$=700 mW (distribution bus) and $P_p$=300 mW (return bus). The SNR for all sensors is greater than 120 dB. All sensors return nearly identical amounts of signal power, and thus provide nearly identical SNRs. The difference in SNR between the best and worst sensors is only 3.1 dB, which is smaller than the difference in SNR in FIG. 22.

Figure 25:
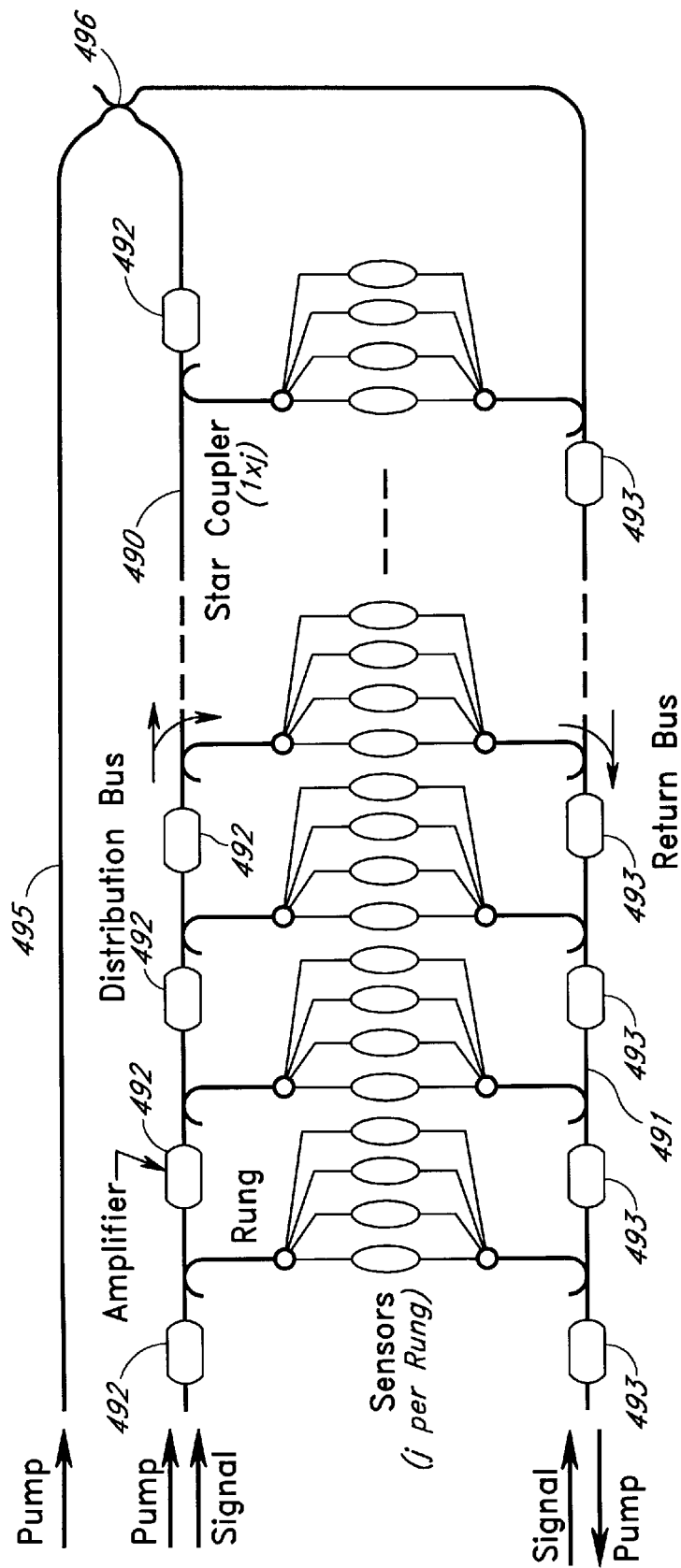
FIG. 25 illustrates a conceptual amplified sensor array similar to FIG. 16, with bi-directional pumping of the amplifiers to reduce the range of pump power incident at each amplifier across the array, to equalize the signal powers returned from all sensors.

A fourth method for reducing the variation in gain per amplifier along the array is bidirectional pumping, as shown in FIG. 25 for the feed forward topology. The array comprises a distribution bus 490 having a plurality of distribution bus amplifiers 492 and a return bus 491 having a plurality of return bus amplifiers 493. A plurality of rungs 494 are disposed between the two buses 490, 491. A similar bidirectional pumping scheme can be implemented with the feed backward topology. By pumping from both ends of a distribution bus 490, amplifiers 492 at both the near and far ends receive the highest pump power, while the amplifiers in the middle receive the lowest pump power. Furthermore, the difference in pump power between the end and middle amplifiers is much lower than in unidirectional pumped arrays (FIGS. 16 and 23a), and the difference in gain per amplifier between end and middle amplifiers is thus reduced. This method also tends to reduce the overall pump power budget. The cost of bidirectional pumping is an additional bus fiber to transmit pump power to the far end of the array and a 3 dB coupler to split the pump power into both buses, i.e., three bus fibers per array for feed backward or four bus fibers for feed forward. In every connector, there is an additional fiber connection, which again increases the size, weight, and cost. Also, the pump has a longer path length so transmission losses and nonlinear effects for the pump are larger.

Figure 26:
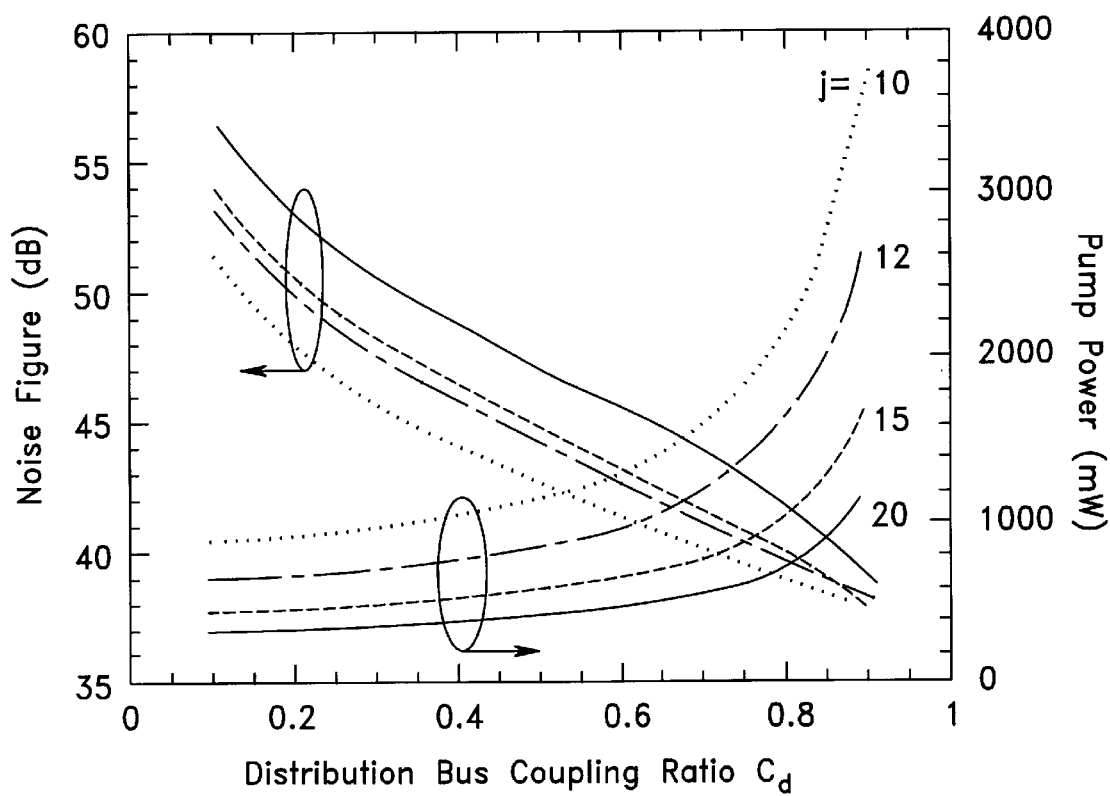
FIG. 26 illustrates the noise figure and distribution bus input pump power requirement versus distribution bus coupling ratio for arrays with 10, 13, 17, and 20 amplifiers per bus and correspondingly 20, 15, 12, 10 sensors per rung (i.e., N≈200 total sensors per array) and with the return bus coupling ratio set to 50%.

To optimize the performance of these arrays, the pump power requirement is preferably minimized while maximizing the SNR of all sensors. The main parameters that control both the power requirement and the noise figure are the coupling ratios $C_d$ and $C_r$ and the number of sensors per rung j, or its complement, which is the number of amplifiers per bus or rungs per array n, as set forth above. FIG. 26 shows the calculated dependence of the noise figure (NF) and input pump power requirement ($P_p$) on $C_d$. The four pairs of curves model various combinations of n and j such that the total number of sensors is approximately constant (N≈200). The return bus coupling ratio $C_r$ was set to 50%, which nearly minimizes the NF, as set forth above. As $C_d$ increases, the NF steadily decreases while $P_p$ increases. This increase is rapid when $C_d$ is large. For j=10 and n=20, which is the optimum configuration identified as set forth above, the noise figure is better but the pump power is higher than in all other cases. Conversely, for j=20 and n=10, the noise figure is higher but the pump power is lower than in all other cases. Thus, for a fixed $C_d$, by increasing the number of sensors per rung and decreasing the number of amplifiers per bus, the pump power requirement improves at the cost of a degraded noise figure. By increasing $C_d$ slightly, it is possible to compensate for the increase in noise figure and still reduce the pump power requirement.

FIG. 26 shows that for a 200-sensor array with the optimum configuration set forth above (j=10 and n=20), the NF is 39 dB for $C_d$=80%, but the distribution bus pump power requirement is greater than 2 W. By contrast, with j=15 and n=13, the NF increases by 1 dB but the distribution bus pump power requirement drops to 950 mW, which is a reasonable amount and available from cladding pumped fiber lasers. If $C_d$ is increased to 85%, the NF penalty is eliminated, the gain $G_d$ must be increased by 1.25 dB, and the pump power requirement becomes 1.2 W. As the number of sensors per rung j is increased beyond the optimum discussed above (j=10 and n=20), the noise figure increases (see FIG. 12), for fixed $C_d$. And as j increases, the pump power requirement decreases, for fixed $C_d$. The minimum pump power requirement occurs with one amplifier per bus (n=1 and j=N), but the noise figure grows unacceptably large.

Figure 27:
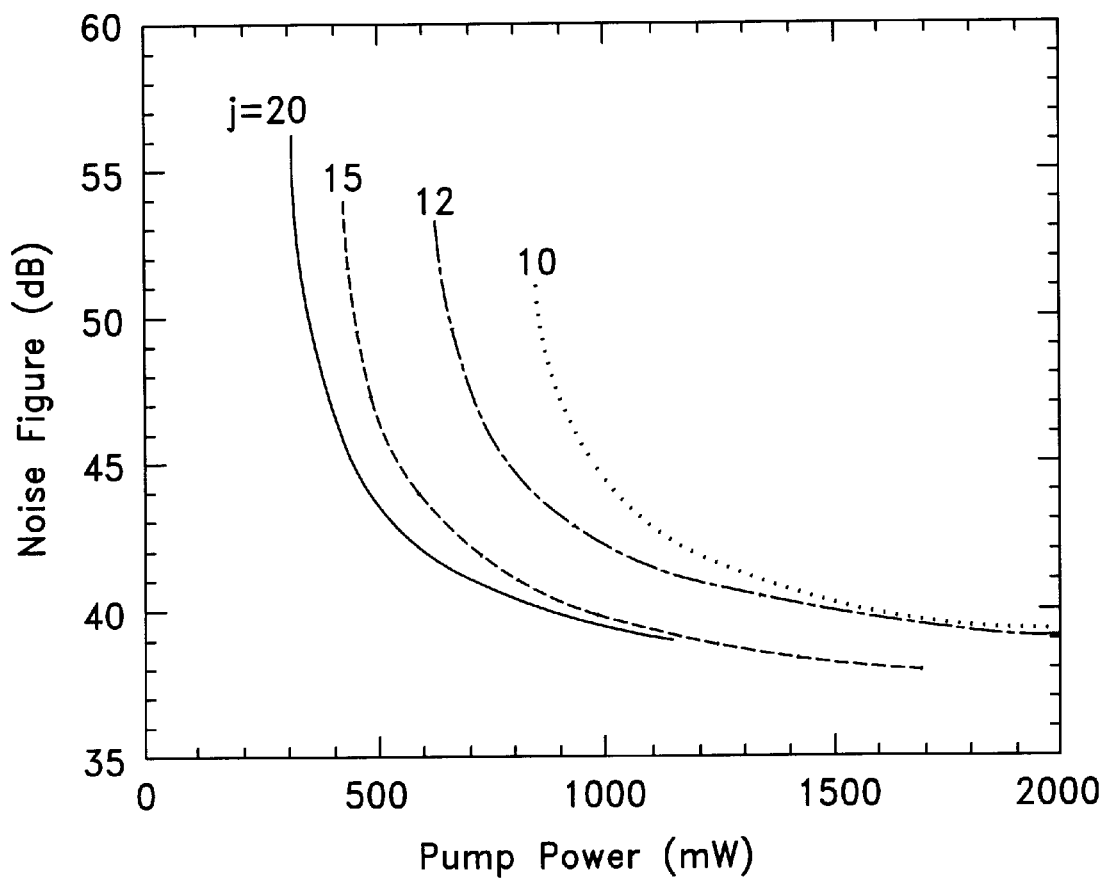
FIG. 27 illustrates noise figure versus pump power, with curves derived from FIG. 26, wherein $C_d$ varies along the individual curves while j and n are maintained constant.

To further aid in comparing the compromise between noise figure and pump power requirement, FIG. 27 shows the NF versus the required pump power. These curves were derived directly from FIG. 26, where $C_d$ increases along each curve and the various curves are for the same combinations of j and n stated above. These curves show that the pump power requirement continues to decrease as the number of sensors per rung increases. Thus, the number of amplifiers per bus is also minimized. Also, the noise figure continues to decrease as $C_d$ increases (see FIG. 26), so the gain of each amplifier should be maximized. But the pump power requirement increases quickly for large $C_d$, as greater amounts of pump power are converted to signal power. Thus, with the remote pumping scheme, there is a limit to how large $C_d$ can be. If remote pumping is not critical and if the operational requirement of having no electrical connections to the array can be relaxed, each amplifier could be powered with its own pump laser diode. Thus, each amplifier could have larger gain than is practical with the remote pumping scheme and a lower NF could be achieved.

Figure 28:
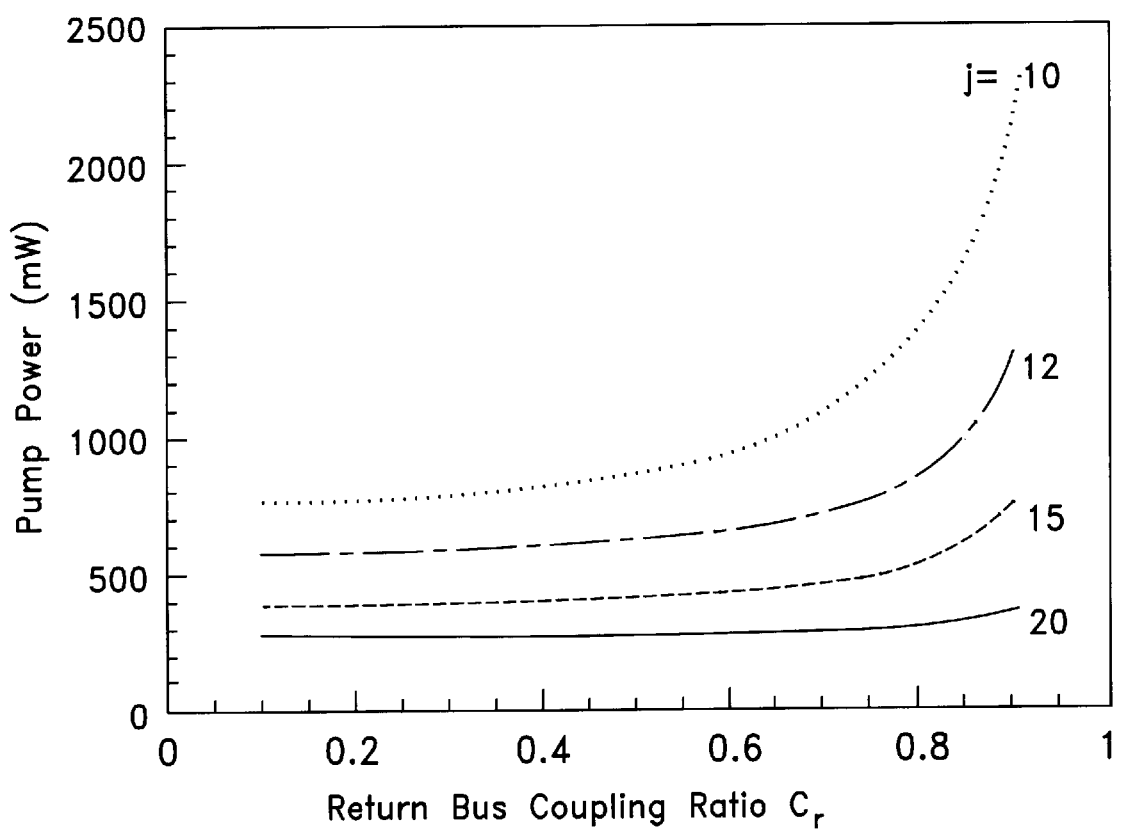
FIG. 28 illustrates the return bus input pump power requirement versus return bus coupling ratio for arrays with 10, 13, 17, and 20 amplifiers per bus and correspondingly 20, 15, 12, 10 sensors per rung (i.e., N≈200 total sensors per array), where the distribution bus coupling ratio is set such that NF=40 dB for $C_r$=50%.

In the second set of curves shown in FIG. 28, NF and $P_p$ are plotted versus $C_r$. The four pairs of curves model the same combinations of n and j as in FIG. 26, again with N≈200. For each curve the value of $C_d$ is selected (from FIG. 26) so that NF=40 dB for all curves when $C_r$=50%. Similar to the distribution bus, as $C_r$ increases, $P_p$ also increases. For j=10 and n=20, the pump power is worse than in the other cases, as was also true in FIG. 26. For j=20 and n=10, the pump power is lower than in the other cases, just as it was in FIG. 26. For j=15 and n=13, the return bus pump power requirement is 400 mW, which is a very reasonable amount.

FIGS. 26 and 28 show two regions of interest for the pump power requirement behavior. In the first region, where the coupling ratio is low, the pump power requirement is fairly constant. The passive component losses at the pump wavelength dominate the pump power budget, i.e., dissipative losses consume significantly more pump power than the erbium ions. In the second region, where the coupling ratio is high, the pump power requirement increases rapidly. The consumption of pump power by the amplifiers dominates the pump budget as the amplifiers convert significant amounts of pump power to signal power, compensating for the couplers.

In order to reduce the power requirement, a compromise must be made between the pump power budget and the signal-to-noise ratio. By reducing the number of amplifiers per bus by approximately ⅓ over the optimum configurations set forth earlier (j=10 and n=20), the pump budget can be reduced by more than 50%, bringing it down to practical levels while increasing the NF only slightly (1.5 dB). However, increasing the signal power supplied to a rung by increasing the distribution bus coupling ratio mitigates the rise in NF and raises the pump power requirement slightly. A pair of fiber buses can thus support 300 high sensitivity (1 $\mu$rad/$\sqrt{Hz}$) sensors with approximately 1 W pump power.

Figure 29:
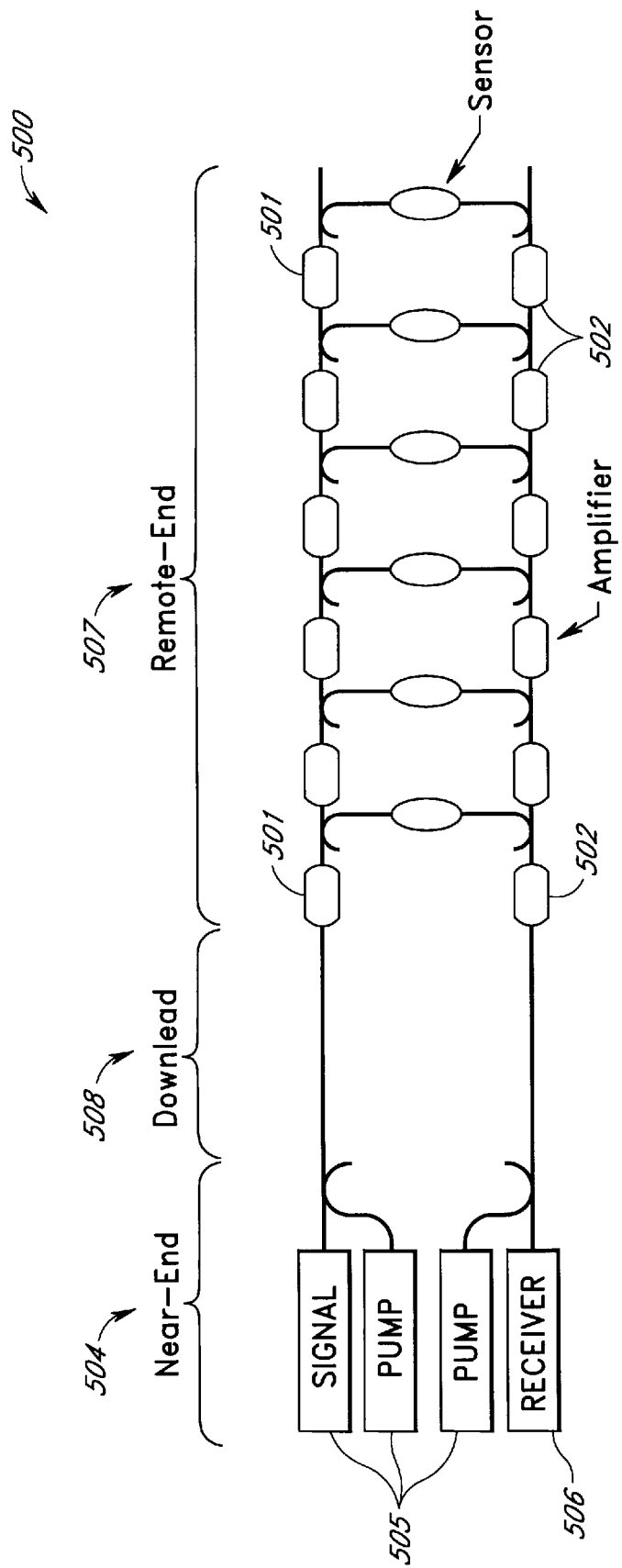
FIG. 29 illustrates one application of the invention in which a dry end, comprising optical sources and a receiver, is on land or on board a vessel, and in which a wet end portion, comprising the sensor array, is under water.

The invention is now described in the context of its most general applications. FIG. 29 shows a generic sensor array 500 for remote use having amplifiers 501, 502 and sensors 503. A near end 504 (portion of the system on land or ship) comprises optical sources 505 and a receiver 506. A remote end 507 (in the water) comprises the sensors 503 and the amplifiers 502. A downlead 508 connects the near end 504 and the remote end 507 together.

Figure 30:
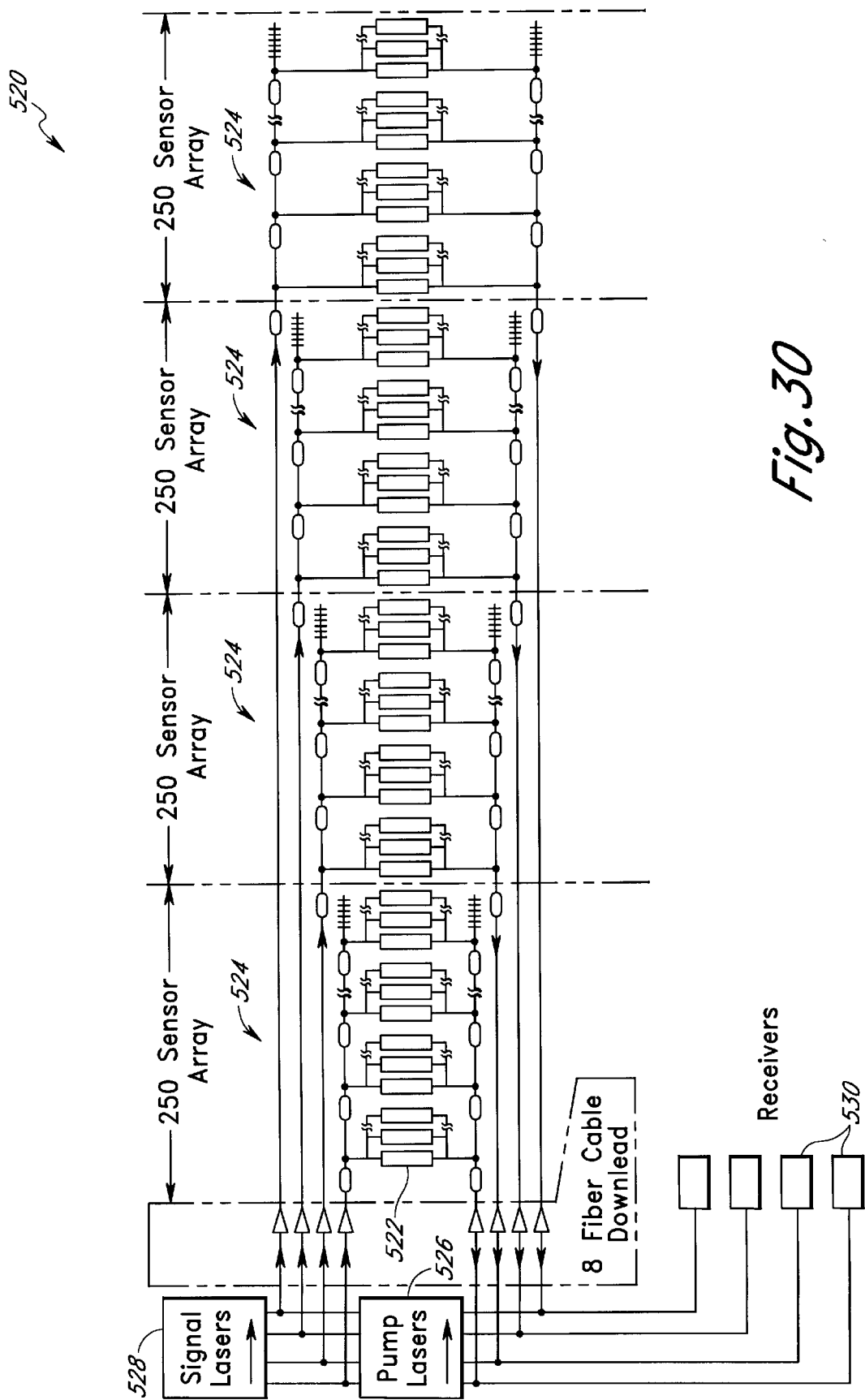
FIG. 30 illustrates a hydrophone array comprising 1000 sensors arranged in four arrays of 250 sensors each.

FIG. 30 shows a full scale hydrophone array 520 with 1000 sensors 522 comprising arrays 524 of 250 sensors each. All 1000 sensors 522 are supported on an 8-fiber cable, which can be less than 3 cm in diameter. Eight pump lasers 526 and four signal lasers 528 are required. Alternatively, it is possible to share one signal laser among the four sensor arrays 524. Four receivers 530 are used, which is a significant savings in cost, premium floor space and volume (e.g., onboard a ship) compared to the hundreds of receivers involved in a passive system.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. An optical sensor array architecture comprising:

at least one distribution bus which receives and distributes an optical input signal, said at least one distribution bus also receiving and propagating at least one distribution bus pump signal;

at least one return bus which receives a plurality of optical return signals and provides said optical return signals as output signals, said at least one return bus also receiving and propagating at least one return bus pump signal;

a plurality of rungs coupled between said at least one distribution bus and said at least one return bus, each of said rungs comprising at least one sensor which receives a respective portion of said optical input signal and which generates one of said optical return signals;

a plurality of input optical amplifiers in said at least one distribution bus responsive to said at least one distribution bus pump signal, said input optical amplifiers amplifying said optical input signal, said input optical amplifiers having a plurality of gains which maintain said optical input signal at a selected signal level for each of said rungs; and a plurality of output optical amplifiers in said at least one return bus responsive to said at least one return bus pump signal, said output optical amplifiers amplifying said return signals generated by said sensors in said rungs, said output optical amplifiers having a plurality of gains selected to substantially equalize the magnitudes of said optical return signals resulting from optical signals propagating through a plurality of combinations of input optical amplifiers, rungs and output optical amplifiers.

2. The architecture of claim 1, wherein:

the gains of said amplifiers are greater when pumped by greater pump energy, and said distribution bus pump signal and said return bus pump signal enter respective ends of said distribution bus and said return bus, said distribution pump signal causing unequal pumping of said input optical amplifiers and differences in the respective gains of said input optical amplifiers, said return bus pump signal causing unequal pumping of said output optical amplifiers and differences in the respective gains of said output optical amplifiers, said input optical amplifiers, said output optical amplifiers and said rungs located such that said architecture defines a plurality of optical paths which include different combinations of said input optical amplifiers and said output optical amplifiers which have respective cumulative gains, said input optical amplifiers and said output optical amplifiers having gains selected such that differences in said cumulative gains between said optical paths are reduced, thereby reducing the noise figure of said architecture.

3. The architecture of claim 2, in which said amplifiers are positioned along said buses such that said optical paths include an equal number of amplifiers.

4. The architecture of claim 3, wherein said optical input signal enters said distribution bus at an end opposite said respective end of said distribution bus, and said optical return signals exit said respective end of said return bus.

5. The architecture of claim 3, wherein said optical input signal enters said respective end of said distribution bus, and said optical return signals and said return bus pump signal exit an end opposite said respective end of said return bus.

6. The architecture of claim 3, in which the respective gains of said amplifiers are adjusted to compensate for losses within said optical sensor architecture to maintain near unity transmission along said buses.

7. The architecture of claim 2, in which at least one of said distribution and return bus pump signals enters its respective bus at more than one end.

8. The architecture of claim 2, in which multiple sensors are multiplexed on said rungs using star couplers.

9. The architecture of claim 2, further comprising a plurality of delay lines situated along at least one of said buses to permit the resolution and detection of each of said optical return signals.

10. The architecture of claim 2, wherein at least one of said buses further comprises a fiber Bragg grating at one end to reflect any unused power.

11. A method of reducing the noise figure of an optical sensor architecture, comprising:

providing distribution and return buses through which pump energy propagates to optical amplifiers positioned along said distribution and return buses, said pump energy pumping said optical amplifiers to cause said optical amplifiers to have optical gain;

providing a plurality of rungs and a plurality of couplers, said couplers connecting each of said rungs to said distribution and return buses, each of said rungs comprising at least one sensor which receives a respective portion of an optical input signal launched into said distribution bus, said sensors generating respective optical return signals which enter said return bus; and selecting the number of said rungs and the number of sensors in each rung to provide a total number of said sensors approximately equal to a desired number of total sensors, said number of rungs and said numbers of sensors in said rungs selected to reduce the noise figure of said optical sensor architecture.

12. The method of claim 11, wherein said number of said rungs and said numbers of said sensors in said rungs are selected to reduce, but not minimize, the noise figure, so that the distribution and return pump power requirements are also reduced.

13. The method of claim 11, wherein the fraction of said optical input signal coupled into said rungs by said couplers in said distribution bus is selected to reduce the noise figure of said optical sensor architecture for certain levels of optical input signal and distribution and return pump signals.

14. The method of claim 11, wherein said numbers of sensors in said rungs are equal for each rung.

15. A method of reducing the noise figure of an optical sensor architecture, comprising:

providing distribution and return buses through which pump energy propagates to optical amplifiers positioned along said distribution and return buses, said pump energy pumping said optical amplifiers to cause said optical amplifiers to have optical gain;

providing a plurality of rungs and a plurality of couplers, said couplers connecting each of said rungs to said distribution and return buses, each of said rungs comprising at least one sensor which receives a respective portion of an optical input signal launched into said distribution bus, said sensors generating respective optical return signals which enter said return bus; and selecting respective fractions of said optical input signal coupled into said rungs by said couplers in said distribution bus and respective fractions of said optical return signals coupled into said return bus by said couplers in said return bus to reduce the noise figure of said optical sensor architecture for a total number of said sensors approximately equal to a desired number of total sensors.

16. The method of claim 15, wherein the number of said rungs and the number of said sensors in each rung are selected to reduce the noise figure of said optical sensor architecture.

17. The method of claim 16, wherein said numbers of sensors in said rungs are equal.

18. The method of claim 16, wherein said number of said rungs, said numbers of said sensors in said rungs, and said coupling fractions are selected to reduce, but not minimize, the noise figure, so that the distribution and return pump power requirements are also reduced.

19. The method of claim 16, wherein said distribution bus coupling fractions for said rungs are all substantially equal.

20. The method of claim 16, wherein said return bus coupling fractions are all substantially equal.

21. The method of claim 16, wherein said selecting step includes the step of selecting a desired level of input optical signal and desired levels of distribution pump signal and return pump signals.

22. An optical sensor architecture, comprising:

a distribution bus and a return bus, both of which propagate pump energy to optical amplifiers positioned along said distribution and return buses, said pump energy pumping said optical amplifiers to cause said optical amplifiers to have optical gain; and a plurality of rungs and a plurality of couplers, said couplers connecting each of said rungs to said distribution and return buses, each of said rungs comprising at least one sensor which receives a respective portion of an optical input signal launched into said distribution bus, said sensors generating respective optical return signals which enter said return bus;

the number of said rungs and the number of sensors in each rung providing a total number of said sensors approximately equal to a desired number of total sensors, said number of rungs and said numbers of sensors in said rungs selected to reduce the noise figure of said optical sensor architecture.

23. The architecture of claim 22, wherein said number of said rungs and said numbers of said sensors in said rungs reduce, but not minimize, the noise figure, to reduce the distribution and return pump power requirements.

24. The architecture of claim 22, wherein the fraction of said optical input signal coupled into said rungs by said couplers in said distribution reduces the noise figure of said optical sensor architecture for certain levels of optical input signal and distribution and return pump signals.

25. The architecture of claim 22, wherein said numbers of sensors for said rungs are equal for each rung.

26. An optical sensor architecture, comprising:

a distribution bus and a return bus, both of which propagate pump energy to optical amplifiers positioned along said distribution and return buses, said pump energy pumping said optical amplifiers to cause said optical amplifiers to have optical gain; and a plurality of rungs and a plurality of couplers, said couplers connecting each of said rungs to said distribution and return buses, each of said rungs comprising at least one sensor which receives a respective portion of an optical input signal launched into said distribution bus, said sensors generating respective optical return signals which enter said return bus;

the respective fractions of said optical input signal coupled into said rungs by said couplers in said distribution bus and the respective fractions of said optical return signals coupled into said return bus by said couplers in said return bus selected to reduce the noise figure of said optical sensor architecture for a total number of said sensors approximately equal to a desired number of total sensors.

27. The architecture of claim 26, the number of said rungs and the number of said sensors in each rung selected to reduce the noise figure of said optical sensor architecture.

28. The architecture of claim 27, wherein said numbers of sensors in said rungs are equal.

29. The architecture of claim 27, said number of said rungs, said numbers of said sensors in said rungs, and said coupling fractions reduce, but not minimize, the noise figure, so that the distribution and return pump power requirements are also reduced.

30. The architecture of claim 27, wherein said distribution coupling fractions are equal.

31. The architecture of claim 27, wherein said return bus coupling fractions for said rungs are equal.

32. An optical sensor array architecture comprising:

a distribution bus which receives and distributes an optical input signal, said distribution bus also receiving and propagating a distribution bus pump signal;

a return bus which receives a plurality of optical return signals and provides said optical return signals as output signals, said return bus also receiving and propagating a return bus pump signal;

a plurality of rungs coupled between said distribution bus and said return bus, each of said rungs comprising at least one sensor which receives a respective portion of said optical input signal and which generates one of said optical return signals;

a plurality of input optical amplifiers in said distribution bus responsive to said distribution bus pump signal, said input optical amplifiers amplifying said optical input signal and having gains which maintain said optical input signal at a selected signal level for each of said rungs; and a plurality of output optical amplifiers in said return bus responsive to said return bus pump signal, said output optical amplifiers amplifying said return signals generated by said sensors in said rungs and having gains which substantially equalize the magnitudes of said optical return signals; and at least one fiber Bragg grating positioned at an end of at least one of said buses to reflect any unused power in said at least one of said buses.

33. A method for reducing a noise figure level in a signal returning from a sensor architecture to generate an optical output comprising the steps of:

using a plurality of sensors to generate output signals, said plurality of sensors are arranged as an array of sub-arrays;

transmitting an input optical signal through at least one bus coupled to said sensors;

coupling the output signals from said sensors into a return signal carried via said at least one bus;

amplifying the input optical signal at multiple stages along said at least one bus to increase a signal to noise ratio within said sensor architecture; and selecting an optimum number of sub-arrays and an optimum number of sensors for each sub-array to provide a total number of sensors approximately equal to a desired number of sensors, said optimum number of sub-arrays and said optimum number of sensors for each sub-array selected to reduce the noise figure of the sensor architecture.

34. The method as defined in claim 33, wherein said at least one bus includes at least one distribution bus that transmits said input optical signal and at least one return bus that returns said return signal, said method further comprising amplifying the return signal at multiple stages along said at least one return bus to increase the signal to noise ratio within said sensor architecture.

35. The method as defined in claim 34, wherein the signal to noise ratio is further improved by optimizing a coupling ratio between each of said sensors and said at least one distribution bus.

36. The method as defined in claim 35, wherein the signal to noise ratio is further improved by optimizing a coupling ratio between each of said sensors and said at least one return bus.

37. The method as defined in claim 35, wherein the signal to noise ratio is further improved by optimizing a coupling ratio between each sensor and said at least one return bus.

38. A method for optimizing an array of optical sensors comprising:

providing an array of optical sensors positioned between at least one distribution fiber which propagates an input optical signal from a source and at least one return fiber which returns perturbed optical signals to a detector, each optical sensor coupled to said at least one distribution fiber by a respective input coupler and coupled to said at least one return fiber by a respective output coupler, each sensor providing a respective perturbed optical signal;

interposing a plurality of amplifiers at selected locations on said at least one distribution fiber, said amplifiers compensating for losses in said array; and selecting coupling ratios for said couplers and gains for said amplifiers to optimize a system noise figure, said system noise figure being the ratio of a signal to noise ratio of the input optical signal to a signal to noise ratio of the perturbed optical signal having a lowest signal to noise ratio.

39. The method as defined in claim 38, further comprising interposing a plurality of amplifiers at selected locations on said at least one return fiber, said return fiber amplifiers compensating for losses in said array.

40. The method as defined in claim 38, wherein said array comprises a plurality of sub-arrays coupled between said at least one distribution fiber and said at least one return fiber, and wherein said method further includes the step of selecting an optimum number of sensors for each sub-array.

* * * * *